(12) United States Patent
Poon et al.

(10) Patent No.: US 6,859,495 B1
(45) Date of Patent: Feb. 22, 2005

(54) DIGITAL VIDEO FORMAT CONVERTER AND METHOD THEREFOR

(75) Inventors: Tommy C. Poon, Murray Hill, NJ (US); Huifang Sun, Cranbury, NJ (US); Jay Bao, Plainsboro, NJ (US); Anthony Vetro, Staten Island, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 08/741,714

(22) Filed: Oct. 31, 1996

(51) Int. Cl.$^7$ ................................................. H04N 7/12
(52) U.S. Cl. ................... 375/240.21; 382/298; 348/445
(58) Field of Search ................................ 348/426, 398, 348/441, 342, 445, 420, 402, 392, 639, 413, 443, 427, 431, 437, 438, 408.1, 397, 395, 845.2, 403, 454; 358/141; 360/81; 375/240.21, 240.05, 240.2; 382/298

(56) References Cited

U.S. PATENT DOCUMENTS

| | | | |
|---|---|---|---|
| 5,136,376 A | * 8/1992 | Yagasaki et al. ............. 358/133 |
| 5,235,421 A | * 8/1993 | Yang ........................... 358/141 |
| 5,262,854 A | 11/1993 | Ng |
| 5,311,310 A | 5/1994 | Jozawa et al. |
| 5,377,051 A | * 12/1994 | Lane et al. ..................... 360/81 |
| 5,408,274 A | 4/1995 | Chang et al. |
| 5,459,514 A | * 10/1995 | Sakamoto et al. .......... 348/398 |
| 5,491,561 A | * 2/1996 | Fukuda ........................ 358/342 |
| 5,504,530 A | * 4/1996 | Obikane et al. ............. 348/413 |
| 5,557,332 A | * 9/1996 | Koyanagi et al. ........... 348/402 |
| 5,576,765 A | 11/1996 | Cheney et al. |
| 5,614,952 A | * 3/1997 | Boyce et al. ................. 348/392 |
| 5,621,478 A | * 4/1997 | Demmer ...................... 348/639 |
| 5,623,312 A | 4/1997 | Yan et al. |
| 5,629,736 A | 5/1997 | Haskell et al. |
| 5,666,164 A | * 9/1997 | Kondo et al. ................ 348/441 |
| 5,708,732 A | 1/1998 | Merhav et al. |
| 5,796,434 A | * 8/1998 | Lempel ........................ 348/403 |
| 5,835,151 A | * 11/1998 | Sun et al. .................... 348/403 |
| 5,966,470 A | * 10/1999 | Miyashita et al. ........... 348/403 |

OTHER PUBLICATIONS

Final Technical Report, Federal Comm. Commision, Advisory Committee on Advanced Television Services, Oct. 31, 1995.
"Hierarchical Decoder for MPEG Compressed Video Data," IEEE Trans. on Cons. Electronics, Aug. 1993, vol. 39, pp. 559–562, H. Sun.
"An SDTV Decoder with HDTV Capability: An All–format ATV Decoder," SMPTE Fall Conf., New Orleans, 1995, Boyce et al.
"Manipulation and Compositing of MC–DCT Compressed Video," Chang et al., IEEE, vol. 13, No. 1, Jan. 1995.
Interframe Video Coding Using Overlapped Motion Compensation and Perfect Reconstruction Filter Banks—Hiroshisa Jozawa et al.—IEEE Trans. 1992, pp. IV–649–IV–652.
Frequency–Domain Motion Estimation Using a Complex Lapped Transform—Robert W. Young and Nick G. Kingsbury, Member, IEEE, IEEE Transaction on Image Processing vol. 2, No. 1 Jan. 1993.

* cited by examiner

*Primary Examiner*—Gims Philippe
(74) *Attorney, Agent, or Firm*—Dirk Brinkman; Andrew J. Curtin

(57) ABSTRACT

A digital video format converter and method therefor includes a first and second converter. The first converter receives a digital video signal and converts, in the frequency domain, inter-coded pictures in the digital video signal into intra-coded pictures. The first converter performs motion compensation in the frequency domain on the inter-coded pictures in the digital video signal to convert the inter-coded pictures into intra-coded pictures. The second converter down converts output of the first converter. Further signal processing then completes placing the digital video signal output by the second converter in a format acceptable to standard lower definition digital decoders.

4 Claims, 11 Drawing Sheets

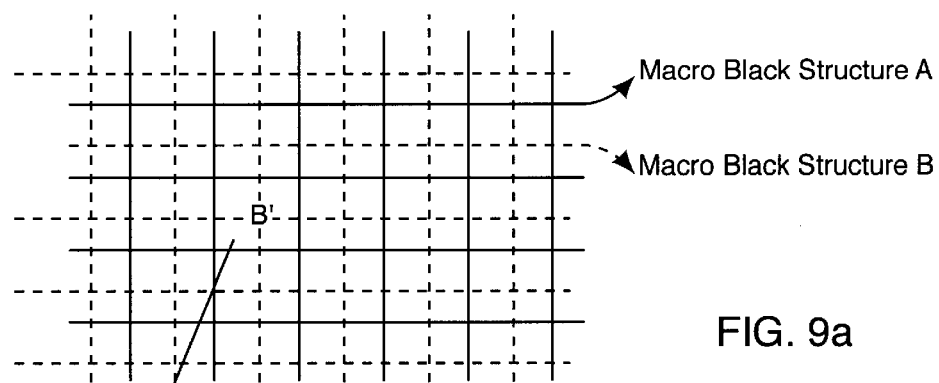
FIG. 9a
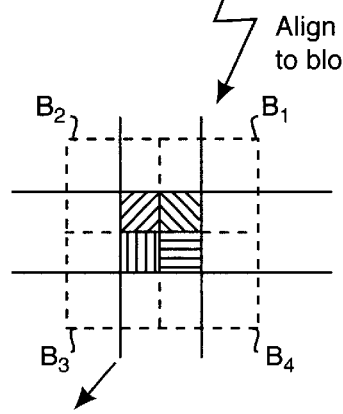
FIG. 9b
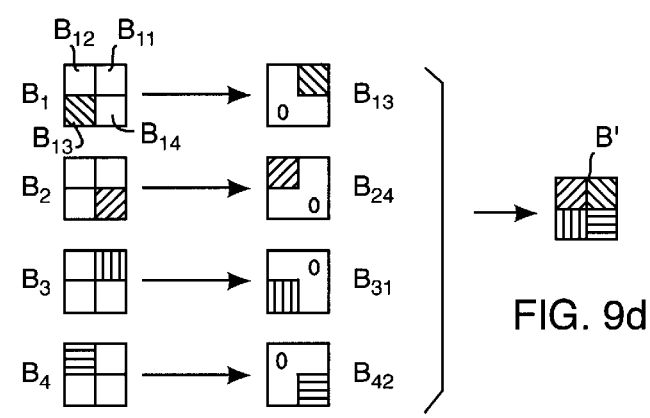
FIG. 9c
FIG. 9d

DIGITAL VIDEO FORMAT CONVERTER AND METHOD THEREFOR

BACKGROUND OF THE INVENTION

1. Field of the Invention

The present invention relates to a method and apparatus for converting the format of a digital video signal; and more particularly, to a method and apparatus for down-converting a digital video signal.

2. Description of the Related Art

Digital video signal processing is an area of science and engineering that has developed rapidly over the past decade. The maturity of the Moving Picture Expert Group (MPEG) video coding standard represents a very important achievement for the video industry and provides strong support for digital transmission of video signals. With advancements in digital compression and other techniques such as digital modulation and packetization, as well as VLSI technology, the fundamentals of television have been reinvented for the digital age.

The first U.S. digital television transmission standard developed for broadcast of high and low definition television by a Grand Alliance of companies has been proposed to the Federal Communications Commission (FCC). High definition digital television broadcasts are typically referred to as HDTV, while low definition digital television broadcasts are generally referred to as SDTV. These terms will be used throughout this application, but are not tied to a particular format or standard. Instead, these terms are used to cover the high and low definition digital television of any coding standard (e.g., such as for VTRs and television).

In 1994 SDTV broadcasts became a reality when the first digital television services, broadcasted via satellite, went on the air. The Digital Satellite Service (DSS) units developed by Thomson Consumer Electronics, etc. have been distributed to more than 1 million homes. The highly sophisticated methods of transmitting and receiving digital television not only produce higher-quality television broadcasts, but also create new services, such as movies on demand, interactive programming, multimedia applications as well as telephone and computer services through the television.

Soon, HDTV will become a reality and join SDTV. Accordingly, in the near future, expect advanced television (ATV) broadcasts which include co-existent broadcasts of HDTV and SDTV. The problem, however, arises in that the HDTV signal can not be decoded by current SDTV decoders or NTSC decoders. (NTSC is the current analog broadcast standard in the U.S.) Several efforts have been reported to address this problem. U.S. Pat. No. 5,262,854 to S. Ng proposes a hierarchical decoder structure to provide a hierarchical representation of a decoded video sequence such that multiple video resolution can be reconstructed from the compressed MPEG bit stream. A modified version of this structure has been proposed by H. Sun, an inventor of the subject application, "Hierarchical Decoder for MPEG Compressed Video Data," IEEE Trans. on Consumer Electronics, August, 1993, Vol. 39, Number 3, pp. 559–562. Furthermore, a detailed investigation of an all-format ATV decoder has been reported by Jill Boyce, John Henderson and Larry Pearlstein, "An SDTV Decoder with HDTV Capability: An All-format ATV Decoder," SMPTE Fall Conference, New Orleans, 1995.

Conventionally, the spatial domain down-sizing in converting from HDTV to SDTV was achieved by cutting DCT domain coefficients and performing the inverse DCT with the remaining coefficients. First, the image is filtered by an anti-aliasing low pass filter. The filtered image is then down-sampled by a desired factor in each dimension. For the DCT based coded image (such as MPEG video coding) the conventional method requires converting the compressed image to the spatial domain by inverse DCT and then filtering and down-sampling or down-converting the inverse DCT. Alternatively, both the filtering and down-sampling operations are combined in the DCT domain by cutting frequencies and taking the inverse DCT with a lesser number of DCT coefficients.

When performing, for example, MPEG video encoding of HDTV, image blocks of 8×8 pixels in the spatial domain are converted into 8×8 DCT (discrete cosine transform) blocks of DCT coefficients in the DCT or frequency domain. Specifically, in most coding formats such as MPEG, the HDTV signal is divided into a luminance component (Y) and two chroma components (U) and (V). Furthermore, instead of U and V chroma blocks, some standards use color difference signal chroma blocks. For the purposes of discussion only, U and V chroma blocks will be used. Most formats such as MPEG specify different encoding sequences. In each encoding sequence a sequence header identifies the encoding sequence. Furthermore, in each encoding sequence, macro blocks of 8×8 DCT blocks of DCT coefficients are formed.

Encoding sequences for HDTV typically include the 4:2:0 encoding sequence, the 4:2:2 encoding sequence, and the 4:4:4 encoding sequence. In the 4:2:0 encoding sequence a macro block consists of four 8×8 luminance DCT blocks, one 8×8 U chroma DCT block, and one 8×8 V chroma DCT block. In the 4:2:2 encoding sequence a macro block consists of four 8×8 luminance DCT blocks, two 8×8 U chroma DCT blocks, and two 8×8 V chroma DCT blocks. Finally, in the 4:4:4 encoding sequence a macro block consists of four 8×8 luminance DCT blocks, four 8×8 U chroma DCT blocks, and four 8×8 V chroma DCT blocks. SDTV includes similar coding sequences, but the DCT blocks are 4×4 DCT blocks.

Unfortunately, the conventional conversion techniques produce SDTV signals having a significant amount of block edge effect and other distortions. Additionally, these conventional techniques do not offer high processing speeds, and fail to produce an SDTV signal acceptable to conventional SDTV digital video decoders. Furthermore, when motion compensation must be performed, the conventional down converters require storing two complete anchor pictures in the spatial domain. Consequently, the memory requirements for conventional down converters are quite large. Because memory requirements of down converters account for a large part of the overall device cost, the large memory requirements of conventional down converters adversely impacts the cost of such devices.

SUMMARY OF THE INVENTION

An object of the present invention is to provide a method and apparatus for down-converting an HDTV signal into an SDTV or NTSC signal which performs filtering and down-sampling in the DCT domain.

Another object of the present invention is to provide a method and apparatus for down-converting an HDTV signal into an SDTV or NTSC signal which performs filtering and down-sampling in the DCT domain and reduces block edge effects and other distortions.

A further object of the present invention is to provide a method and apparatus for down-converting an HDTV signal into an SDTV or NTSC signal which performs filtering and down-sampling in the DCT domain and provides high processing speeds.

An additional objective of the present invention is to provide a method and apparatus for down converting a digital video signal which produces a down converted digital video signal acceptable to standard lower definition digital decoders.

A still further objective of the present invention is to provide a method and apparatus for down converting a digital video signal which reduces the frequency and inverse frequency conversion required to down convert the digital video signal.

Another objective of the present invention is to provide a method and apparatus for down converting a digital video signal having significantly lower memory capacity requirements.

These and other objects are achieved by a method for down-converting a digital video signal which includes the steps of receiving the digital video signal including at least first and second DCT blocks of DCT coefficients; synthesizing the first and second DCT blocks into a single synthesized DCT block having dimensions equal to the first and second DCT blocks; and converting the synthesized DCT block from the DCT domain to the spatial domain to produce and output digital video signal.

These and other objects are further achieved by an apparatus for down-converting a digital video signal which includes synthesizing means for receiving the digital video signal including at least first and second DCT blocks of DCT coefficients, and for synthesizing the first and second DCT blocks into a single synthesized DCT block having dimensions equal to the first and second DCT blocks; and converting means for converting the synthesized DCT block from the DCT domain to the spatial domain to produce an output digital video signal.

The objectives of the present invention are also achieved by providing an apparatus for down-converting a digital video signal, comprising: synthesizing means for receiving a digital video signal including at least first and second DCT blocks of DCT coefficients, and for synthesizing said first and second DCT blocks into a single synthesized DCT block having dimensions equal to said first and second DCT blocks; a quantizer quantizing output of said converting means; and a variable length coder variable length coding output of said quantizer.

The objectives of the present invention are additionally achieved by providing a method for down-converting a digital video signal, comprising: (a) receiving a digital video signal including at least first and second DCT blocks of DCT coefficients; (b) synthesizing said first and second DCT blocks into a single synthesized DCT block having dimensions equal to said first and second DCT blocks; (c) quantizing output of said step (b); and (d) variable length coding output of said step (c).

The objectives of the present invention are further achieved by providing an apparatus for down converting a digital video signal, comprising: motion compensation means for receiving a digital video signal and performing motion compensation on said digital video signal in the frequency domain; and a down converter down converting said motion compensated digital video signal.

The objectives of the present invention are also achieved by providing a method for down converting a digital video signal, comprising: (a) receiving a digital video signal; (b) performing motion compensation on said digital video signal in the frequency domain; and (c) down converting said digital video signal output by said step (b).

The objectives of the present invention are still further achieved by providing an apparatus for down converting a digital video signal, comprising: a first converter receiving a digital video signal and converting, in the frequency domain, inter-coded pictures in said digital video signal into intra-coded pictures; and a second converter down converting output of said first converter.

The objectives of the present invention are additionally achieved by providing a method for down converting a digital video signal, comprising: (a) receiving a digital video signal; (b) converting, in the frequency domain, inter-coded pictures in said digital video signal into intra-coded pictures; and (c) down converting output of said step (b).

As discussed above, the method and apparatus of the present invention does not utilize the conventional frequency cutting technique. Instead, the method and apparatus of the present invention employs a frequency synthesis technique which results in reduced block edge effects and other distortions, as well as, high processing speeds.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

FIGS. 9A–9D illustrate the formation of a composite macro block in the spatial domain.

DETAILED DESCRIPTION OF THE PREFERRED EMBODIMENTS

Figure 1:
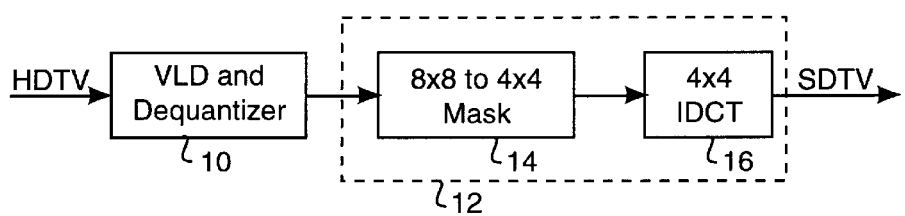
FIG. 1 illustrates a conventional apparatus for performing HDTV down-converting wherein filtering and down-sampling are performed in the DCT domain.

More particularly, with respect to the prior art, FIG. 1 illustrates a conventional apparatus for performing HDTV down-converting according to the conventional techniques discussed above wherein the filtering and down-sampling procedures are performed in the DCT domain. As shown in FIG. 1, a variable length decoder (VLD) and dequantizer 10 receives the HDTV bit stream generated, for example, according to MPEG video coding standards. The VLD and dequantizer 10 variable length decodes and dequantizes the HDTV signal in the well known manner. A down-converter 12, including a mask 14 and DCT inverter (IDCT) 16, down-converts the HDTV signal output by the VLD and dequantizer 10. The mask 14 masks the 8×8 blocks of DCT coefficients output by the VLD and dequantizer 10 to produce 4×4 blocks of DCT coefficients, thus, frequency cutting the 8×8 DCT blocks. The IDCT 16 takes the inverse DCT of the 4×4 DCT blocks and converts the 4×4 DCT blocks output by the mask 14 into 4×4 spatial blocks. Depending on the encoding scheme of the HDTV signal, the output of the IDCT 16 produces a bit stream in a corresponding SDTV sequence. For instance, the 4:2:0, 4:2:2 and 4:4:4 HDTV encoding sequences are down-converted to 4:2:0, 4:2:2 and 4:4:4 SDTV encoding sequences, respectively. An NTSC signal can be obtained from the SDTV signal using any well known conversion technique for that purpose.

As alluded to above, whether the output of the IDCT 16 produces a bit stream in SDTV format depends on the encoding scheme of the HDTV signal. Besides variable length encoding, many standards such as MPEG provide for intra- and inter-coding. Intra-coding is where a field or frame of the HDTV signal, referred to as a picture, is encoded based on the pixels therein. Several well known techniques exist for intra-coding. An intra-coded picture is typically referred to as an I-picture. Consequently, the apparatus of FIG. 1 is capable of producing an SDTV signal when the HDTV signal includes only I-pictures.

Inter-coding, sometimes referred to as predictive encoding, is where a picture is encoded based on a reference picture, referred to as an anchor picture. In inter-coding, each macro block (i.e., related luminance and chroma blocks) of the picture being encoded is compared with the macro blocks of the anchor picture to find the macro block of the anchor picture providing the greatest correlation therewith. The vector between the two macro blocks is then determined as the motion vector. The inter-coded HDTV signal for the macro block being encoded will then include the motion vector and the differences between the macro block being encoded and the corresponding macro block of the anchor picture providing the greatest correlation.

For example, a series of pictures may have the display order $I_1B_1B_2P_1B_3B_4P_2B_5B_6P_3B_7B_8I_2$ ... The transmitted HDTV signal, however, will have the pictures arranged in the order of encoding as follows: $I_1P_1B_1B_2P_2B_3B_4P_3B_5B_6I_2B_7B_8$. P-pictures are encoded using the previous I-picture or P-picture as the anchor picture. In the above example, P-pictures $P_1$, $P_2$, and $P_3$ were encoded using I-picture $I_1$, P-picture $P_1$, and P-picture $P_2$, respectively, as the anchor picture.

The B-pictures may be forward encoded, backward encoded, or bi-directionally encoded. For instance, if B-picture $B_1$ was encoded using I-picture $I_1$ as the anchor picture, then B-picture $B_1$ is backward or back encoded. Alternatively, if B-picture $B_1$ was encoded using P-picture $P_1$ as the anchor picture, then B-picture $B_1$ is forward encoded. If B-picture $B_1$ was encoded using both I-picture $I_1$ and P-picture $P_1$ (typically a weighted average thereof) as anchor pictures, then B-picture $B_1$ is bi-directionally encoded.

The headers in the HDTV signal indicate whether pictures are I, B, or P-pictures and the direction of encoding. These headers also indicate the group of picture (GOP) size N and the distance between anchor pictures M. The GOP size indicates the distance between I-pictures, which in the above example would be N=12. Since I-pictures and P-pictures are anchor pictures, the distance between anchor pictures in the above example would be M=3. Based on the information provided in the headers, the HDTV signal can be properly decoded.

Therefore, if inter-coding was used to encode a picture, the IDCT 16 outputs only the difference between the present picture and a previous picture. To produce a complete picture requires additional structure such as shown in FIG. 2.

Figure 2:
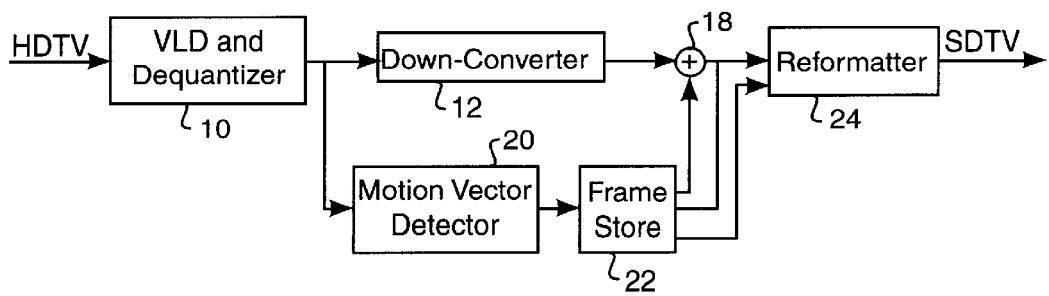
FIG. 2 illustrates another conventional apparatus for performing HDTV down-converting wherein filtering and down-sampling are performed in the DCT domain.

In FIG. 2 the same reference numerals as in FIG. 1 have been used to designate like components. Accordingly, these components will not be described in detail. In FIG. 2, the output of the VLD and dequantizer 10 is also received by a motion vector detector 20. The motion vector detector 20 identifies the motion vectors for inter-coded pictures. Due to the down conversion operation of the down-converter 12, however, the motion vector detector 20 scales down the identified motion vectors by a factor of two. The motion vectors are then output to a frame store 22. The frame store 22 stores the two previous anchor pictures (e.g., I or P-pictures). The frame store 22 will then output the macro blocks of an anchor picture pointed to by the motion vectors. These macro blocks are received by an adder 18. The adder 18 also receives the output of the down-converter 12. Consequently, when a B or P-picture is being down converted, a complete picture can be obtained by adding the output of the down-converter 12, which represents the differences between the picture and an anchor picture, with the anchor picture to create a complete picture. When an I-picture is output from the down-converter 12, there is no need to add anchor picture information thereto, consequently the frame store 22 will not send output to the adder 18, and the output of the adder 18 will be the output of the down-converter 12.

As discussed above, when B-pictures are bi-directionally encoded, a weighted average of two anchor frames is used to inter-code these pictures. The weighting is encoded into the motion vectors by the original encoder. When the frame store 22 receives the two motion vectors, the anchor frame macro blocks pointed thereby are averaged by the frame store 22 to form a weighted average macro block. The frame store 22 then outputs the weighted average macro block to the adder 18.

The frame store 22 also monitors the output of the output of the adder 18. When the frame store 22 determines that the adder 18 outputs an I or P-picture, the frame store 22 replaces the oldest stored anchor frame with the I or P-picture output by the adder 18.

The operation of forming I-pictures from B and P-pictures is referred to as motion compensation. When the pictures are frames, frame motion compensation is performed. When the pictures are fields, field motion compensation is performed. During original encodation, inter-coded even and odd fields are encoded independently based on either the even or odd fields of a previous frame. Consequently, four cases of encodation exist for field motion compensation.

Besides the frame store 22, the output of the adder 18 is also received by a reformatter 24. The reformatter 24 is also connected to the frame store 22. Since the transmission, and therefore, reception order of the pictures is not in the proper display order, the reformatter 24 operates to reformat the order of the pictures into the proper display order.

To better understand the operation of the apparatus illustrated in FIG. 2, assume that an HDTV signal such as discussed above is received. The reformatter 24 determines what output should be sent as the SDTV signal according to the following rules: (1) if the picture received is the first anchor picture received then no output will be sent; (2) if the picture received is an anchor picture but not the first anchor picture received, then the previously received anchor picture will be output; and (3) if the picture received is a B-picture, then the B-picture will be immediately output.

Therefore, upon receipt of I-picture $I_1$, the reformatter 24 will not send any output. The next picture received will be P-picture $P_1$. The adder 18 will then receive the output of the down-converter 12 and macro blocks from the I-picture $I_1$ pointed to by the motion vectors detected by motion vector detector 20. Consequently, the adder 18 will generate a complete picture. Since this complete picture is an anchor picture, the frame store 22 will then store the complete picture $P_1$. According to the rules discussed above, the reformatter 24 will then output from the frame store 22 the I-picture I, (i.e., the previous anchor picture).

The next two pictures received are B-pictures $B_1$ and $B_2$. Complete pictures will be formed from these B-pictures in the same manner as discussed above with respect to P-picture $P_1$, except that, depending on the direction of encoding, either the I-picture $I_1$ and/or the P-picture $P_1$ will be used as the anchor picture. Since the adder 18 outputs a B-picture, the reformatter 24 will immediately output the B-picture. Consequently, the output from the reformatter 24 will be $I_1B_1B_2$.

Next, the P-picture $P_2$ is received and processed in the same manner as P-picture $P_1$. When the adder 18 outputs the complete P-picture $P_2$, the frame store 22 will replace the I-picture $I_1$ with the P-picture $P_2$. The reformatter 24, according to the rules discussed above, will then output the P-picture $P_1$. In this manner, the reformatter 24 will output the pictures in the proper display order.

In another technique, the 4×4 IDCT of FIG. 1 is replaced with an 8×8 IDCT. Accordingly, the 4×4 DCT blocks output by the mask 14 are padded with zeros to produce 8×8 DCT blocks. Then, after performing the 8×8 IDCT, each 8×8 spatial block is down-sampled in each dimension according to conventional techniques to produce 4×4 spatial blocks.

The conventional conversion techniques discussed above with respect to FIGS. 1 and 2 produce SDTV signals having a significant amount of block edge effects and other distortion. Additionally, these down conversion techniques do not offer high speed processing, and fail to produce an SDTV signal acceptable to conventional decoders. Furthermore, the down converter of FIG. 2 must store two anchor pictures in the spatial domain to perform motion compensation. Consequently, the memory requirements for the down converter of FIG. 2 are quite large. Because memory requirements of down converters account for a large part of the overall device cost, the large memory requirements of the down converter illustrated in FIG. 2 adversely impacts the cost of such a device.

First Embodiment

Figure 3A:
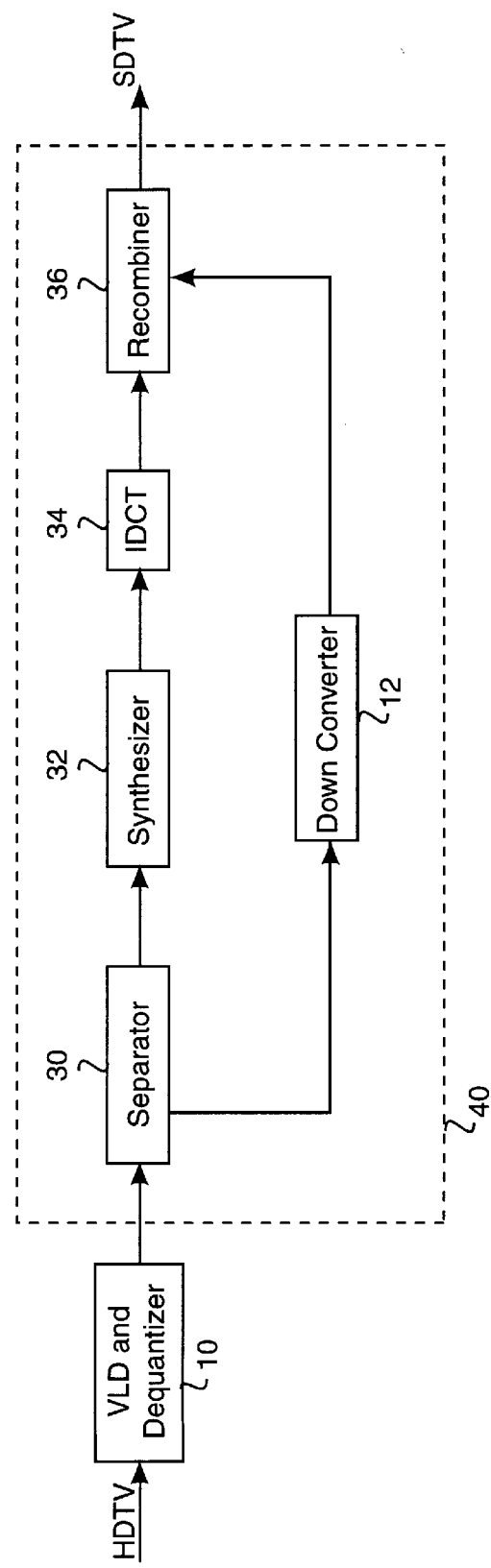
FIGS. 3A and 3B illustrate apparatuses, according to the present invention, for performing HDTV down-converting wherein filtering and down-sampling are performed in the DCT domain.

FIG. 3A illustrates an apparatus, according to the present invention, for performing HDTV down-converting wherein filtering and down-sampling are performed in the DCT domain. As shown in FIG. 3A, the apparatus includes VLD and dequantizer 10 such as described above which receives an HDTV signal of any particular format. For the purposes of discussion only, it will be assumed that the HDTV signal was encoded according to the 4:2:0 encoding sequence and includes U and V chroma DCT blocks. A separator 30 receives the output of the VLD and dequantizer 10, and separates the luminance DCT blocks from the V chroma DCT blocks and the U chroma DCT blocks. The luminance DCT blocks are output to a synthesizer 32, and the U and V chroma DCT blocks are output to a down-converter 12.

The down-converter 12 operates on the U and V chroma DCT blocks in the same manner as discussed above with respect to FIG. 1. The synthesizer 32 synthesizes the luminance DCT blocks. An IDCT 34 performs inverse DCT and converts the output of the synthesizer from the DCT or frequency domain into the spatial domain. A recombiner 36 receives the bit stream from the IDCT 34 and the down-converter 12, and recombines these two bit streams to obtain a bit stream in SDTV format. The separator 30, the synthesizer 32, the IDCT 34, the down-converter 12, and the recombiner 36 form the down-converter 40 of HDTV converter according to the present invention illustrated in FIG. 3A.

Operation of the First Embodiment

Next, the operation of the HDTV converter according to the present invention illustrated in FIG. 3A will be described. The separator 30 receives the output of the VLD and dequantizer 10, and based on the sequence header, identifies the sequence of the HDTV signal. When the 4:2:0 sequence has been identified, the separator 30 sends the four 8×8 luminance DCT blocks to the synthesizer 32, and sends the 8×8 U chroma DCT block and the 8×8 V chroma DCT block to the down-converter 12. When the 4:2:2 sequence has been identified, the separator 30 sends the four 8×8 luminance DCT blocks to the synthesizer 32, and sends the two 8×8 U chroma DCT blocks and the two 8×8 V chroma DCT blocks to the down-converter 12. When, however, the separator identifies the 4:4:4 sequence, the separator sends the four 8×8 luminance DCT blocks, the four 8×8 U chroma DCT blocks, and the four 8×8 V chroma DCT blocks to the synthesizer 32.

The synthesizer 32 synthesizes four 8×8 DCT blocks into one 8×8 DCT block. Accordingly, when the synthesizer 32 receives four 8×8 luminance DCT blocks, the synthesizer outputs one 8×8 luminance DCT block. To better explain the operation of the synthesizer 32, the operating principal will first be described for a one-dimensional case, and then the two-dimensional approach used in the synthesizer 32 will be described. Two different techniques for performing the synthesis operation will also be described.

In the one-dimensional case, an 8 element array is obtained from two 8 element arrays (e.g., a 16 element array). Assume that $a_i$ (i=0, 1, . . . , 15) represents the 16 element array in the spatial domain, and two one-dimensional arrays in the spatial domain are defined as $b_i = a_i$ and $c_i = a_{i+8}$ (i=0, 1, . . . , 7). Expressions (1) and (2) represent one-dimensional 8 element arrays b and c as 8×1 DCT arrays B and C, respectively.

$$B_k = \frac{g(k)}{2} \sum_{i=0}^{7} b_i \cos\left(\frac{(2i+1)k\pi}{16}\right) \quad k = 0, 1, \ldots 7. \tag{1}$$

and $$C_k = \frac{g(k)}{2} \sum_{i=0}^{7} c_i \cos\left(\frac{(2i+1)k\pi}{16}\right) \quad k = 0, 1, \ldots 7. \tag{2}$$

$$\text{where } g(k) = \begin{cases} \frac{1}{\sqrt{2}}, & \text{if } k = 0; \\ 1, & \text{otherwise.} \end{cases}$$

In this one-dimensional case, the function of the frequency synthesis operation is to produce an 8×1 DCT array A' from the two one-dimensional 8×1 DCT arrays B and C. Accordingly, A' represented in the spatial domain as 8 element array a' can be defined in terms of 8×1 DCT arrays B and C, and/or 8 element arrays b and c. Expression (3) below shows the relationship between A' and a'.

$$A'_k = \frac{g(k)}{2} \sum_{i=0}^{7} a'_i \cos\left(\frac{(2i+1)k\pi}{16}\right) \quad k = 0, 1, \ldots 7. \tag{3}$$

The first synthesis technique involves an average smoothing and down-sampling operation. According to the average smoothing operation, a, is obtained from b and c using operators $S_b$ and $S_c$ as shown in expression (4).

$$a' = S_b b + S_c c \tag{4}$$

For example, expression (4) may take the form shown in expression (5) below; wherein $S_b$ and $S_c$ are both set to $$a' = \begin{bmatrix} 0.5\ (b_0 + b_1) \\ 0.5\ (b_2 + b_3) \\ 0.5\ (b_4 + b_5) \\ 0.5\ (b_6 + b_7) \\ 0.5\ (c_0 + c_1) \\ 0.5\ (c_2 + c_3) \\ 0.5\ (c_4 + c_5) \\ 0.5\ (c_6 + c_7) \end{bmatrix} \tag{5}$$

In accordance with expression (5), the transformation of a' to A' in expression (3) can be represented as shown in expression (6) below.

$$\begin{aligned}
A'_k &= \frac{g(k)}{2} \sum_{i=0}^{7} a'_i \cos\frac{(2i+1)k\pi}{16} \\
&= \frac{g(k)}{2} \left( \sum_{i=0}^{3} \frac{1}{2}(b_{2i} + b_{2i+1}) \cos\frac{(2i+1)k\pi}{16} + \sum_{i=4}^{7} \frac{1}{2}(c_{2(i-4)} + c_{2(i-4)+1}) \cos\frac{(2i+1)k\pi}{16} \right) \\
&= \frac{g(k)}{4} \left( \sum_{i=0}^{3} \cos\frac{(2i+1)k\pi}{16} \left( \sum_{p=0}^{7} \frac{g(p)}{2} B_p \left( \cos\frac{(4i+1)p\pi}{16} + \cos\frac{(4i+3)p\pi}{16} \right) \right) + \right. \\
&\quad \left. \sum_{i=4}^{7} \cos\frac{(2i+1)k\pi}{16} \left( \sum_{p=0}^{7} \frac{g(p)}{2} C_p \left( \cos\frac{(4(i-4)+1)p\pi}{16} + \cos\frac{(4(i-4)+3)p\pi}{16} \right) \right) \right)
\end{aligned} \tag{6}$$

$$\begin{aligned}
&= \sum_{p=0}^{7} B_p \left( \frac{g(k)g(p)}{8} \sum_{i=0}^{3} \cos\frac{(2i+1)k\pi}{16} \left( \cos\frac{(4i+1)p\pi}{16} + \cos\frac{(4i+3)p\pi}{16} \right) \right) + \\
&\quad \sum_{p=0}^{7} C_p \left( \frac{g(k)g(p)}{8} \sum_{i=4}^{7} \cos\frac{(2i+1)k\pi}{16} \left( \cos\frac{(4(i-4)+1)p\pi}{16} + \cos\frac{(4(i-4)+3)p\pi}{16} \right) \right) \\
&= \sum_{p=0}^{7} M_k(p) B_p + \sum_{p=0}^{7} N_k(p) C_p
\end{aligned}$$

where $M_k(p)$ and $N_k(p)$ are the matrices represented in expressions (7a) and (7b) below.

$$M_k(p) = \frac{g(k)g(p)}{8} \sum_{i=0}^{3} \cos\frac{(2i+1)k\pi}{16} \left( \cos\frac{(4i+1)p\pi}{16} + \cos\frac{(4i+3)p\pi}{16} \right) \tag{7a}$$

$$N_k(p) = \tag{7b}$$
$$\frac{g(k)g(p)}{8} \sum_{i=4}^{7} \cos\frac{(2i+1)k\pi}{16} \left( \cos\frac{(4(i-4)+1)}{16} + \cos\frac{(4(i-4)+3)p\pi}{16} \right)$$

As one skilled in the art will readily note, matrices M and N do not include the DCT coefficients, and are thus independent therefrom. As expression (6) demonstrates, the 8×1 DCT array $A_1$ can be synthesized from the two 8×1 DCT arrays B and C. The 8 element array a' in the spatial domain can then be obtained by an inverse DCT transformation.

Depending on the desired synthesis characteristics, the smoothing an filtering operations can be modified by modifying $S_b$ and $S_e$ in expression (4), which results in changes to matrices M and N.

Having demonstrated the one-dimensional case, one skilled in the art can readily determine the expressions (8)–(15d) below to implement the two-dimensional case, wherein All represents the synthesized 8×8 DCT block; all represents the spatial transformation of A"; B, C, D, and E each represent one of the four 8×8 DCT blocks; and b, c, d, and e represent the spatial transformation of the 8×8 DCT blocks, respectively.

$$B_{kl} = \frac{g(k)g(l)}{4} \sum_{i=0}^{7} \sum_{j=0}^{7} b_{ij} \cos\frac{(2i+1)k\pi}{16} \cos\frac{(2j+1)l\pi}{16} \tag{8}$$

$$C_{kl} = \frac{g(k)g(l)}{4} \sum_{i=0}^{7} \sum_{j=0}^{7} c_{ij} \cos\frac{(2i+1)k\pi}{16} \cos\frac{(2j+1)l\pi}{16} \tag{9}$$

$$D_{kl} = \frac{g(k)g(l)}{4} \sum_{i=0}^{7} \sum_{j=0}^{7} d_{ij} \cos\frac{(2i+1)k\pi}{16} \cos\frac{(2j+1)l\pi}{16} \tag{10}$$

$$E_{kl} = \frac{g(k)g(l)}{4} \sum_{i=0}^{7} \sum_{j=0}^{7} e_{ij} \cos\frac{(2i+1)k\pi}{16} \cos\frac{(2j+1)l\pi}{16} \tag{11}$$

where k=0,1, ..., 7; and $$g(k) = g(l) = \begin{cases} \frac{1}{\sqrt{2}}, & \text{if } k = 0; \\ 1, & \text{otherwise.} \end{cases} \quad 5$$

$$a'' = S_b b + S_c c + S_d d + S_e e \quad (12)$$

$$a_{i,j} = \frac{1}{4}\begin{bmatrix} (b_{0,0}+b_{1,0}+b_{0,1}+b_{1,1})\ldots(b_{0,4}+b_{1,6}+b_{0,7}+b_{1,7}) & (c_{0,0}+c_{1,0}+c_{0,1}+c_{1,1})\ldots(c_{0,6}+c_{1,6}+c_{0,7}+c_{1,7}) \\ (b_{2,0}+b_{3,0}+b_{2,1}+b_{3,1})\ldots(b_{2,6}+b_{3,6}+b_{2,7}+b_{3,7}) & (c_{2,0}+c_{3,0}+c_{2,1}+c_{3,1})\ldots(c_{2,0}+c_{3,0}+c_{2,1}+c_{3,1}) \\ \vdots & \vdots \\ (b_{4,0}+b_{7,0}+b_{6,2}+b_{7,2})\ldots(b_{6,6}+b_{7,6}+b_{6,7}+b_{7,7}) & (c_{2,0}+c_{3,0}+c_{2,1}+c_{3,1})\ldots(c_{6,6}+c_{7,6}+c_{6,7}+c_{7,7}) \\ (d_{0,0}+d_{1,0}+d_{0,1}+d_{1,1})\ldots(d_{0,6}+d_{1,6}+d_{0,7}+d_{1,7}) & (e_{0,0}+e_{1,0}+e_{0,1}+e_{1,1})\ldots(e_{0,6}+e_{1,4}+e_{0,7}+e_{1,7}) \\ (d_{2,0}+d_{3,0}+d_{2,1}+d_{3,1})\ldots(d_{2,6}+d_{3,6}+d_{2,7}+d_{3,7}) & (e_{2,0}+e_{3,0}+e_{2,1}+e_{3,1})\ldots(e_{2,0}+e_{3,0}+e_{2,1}+e_{3,1}) \\ \vdots & \vdots \\ (d_{6,0}+d_{7,0}+d_{6,2}+d_{7,1})\ldots(d_{6,6}+d_{7,6}+d_{6,7}+d_{7,7}) & (e_{6,0}+e_{7,0}+e_{6,2}+e_{7,1})\ldots(e_{6,6}+e_{7,6}+e_{6,7}+e_{6,6}) \end{bmatrix} \quad (13)$$

where $S_b = S_c = S_d = S_e = 0.25$ $$A''_{kl} = \frac{g(k)g(l)}{4} \sum_{i=0}^{7} \sum_{j=0}^{7} a''_{ij} \cos\frac{(2i+1)k\pi}{32} \cos\frac{(2j+1)l\pi}{32} \quad (14)$$

$$= \frac{g(k)g(l)}{4} \sum_{i=0}^{3} \sum_{j=0}^{3} \frac{1}{4}(b_{2i,2j} + b_{2i+1,2j} + b_{2i,2j+1} + b_{2i+1,2j+1})\cos\frac{(2i+1)k\pi}{32}\cos\frac{(2j+1)l\pi}{32} +$$

$$\sum_{i=4}^{7} \sum_{j=0}^{3} \frac{1}{4}(c_{2(i-4),2j} + c_{2(i-4)+1,2j} + c_{2(i-4),2j+1} + c_{2(i-4)+1,2j+1})\cos\frac{(2i+1)k\pi}{32}\cos\frac{(2j+1)l\pi}{32} + \sum_{i=0}^{3} \sum_{j=4}^{7} \frac{1}{4}(d_{2i,2(j-4)} + d_{2i+1,2(j-4)} + d_{2i,2(j-4)+1} +$$

$$d_{2i+1,2(j-4)+1})\cos\frac{(2i+1)k\pi}{32}\cos\frac{(2j+1)l\pi}{32} + \sum_{i=4}^{7} \sum_{j=4}^{7} \frac{1}{4}(e_{2(i-4),(j-4)} + e_{2(i-4)+1,2(j-4)} + e_{2(i-4),2(j-4)+1} + e_{2(i-4)+1,2(j-4)+1})\cos\frac{(2i+1)k\pi}{32}\cos\frac{(2j+1)l\pi}{32}$$

$$= \frac{g(k)g(l)}{4} \Biggl( \sum_{i=0}^{3} \sum_{j=0}^{3} \frac{1}{4}\Biggl( \sum_{p=0}^{7} \sum_{q=0}^{7} \frac{g(p)g(q)}{4} B_{pq} \Bigl( \cos\frac{(4i+1)p\pi}{32}\cos\frac{(4j+1)q\pi}{32} +$$

$$\cos\frac{(4i+3)p\pi}{32}\cos\frac{(4j+3)q\pi}{32} + \cos\frac{(4i+1)p\pi}{32}\cos\frac{(4j+3)q\pi}{32} + \cos\frac{(4i+3)p\pi}{32}\cos\frac{(4j+3)q\pi}{32} \Bigr) \Biggr) +$$

$$\sum_{i=4}^{7} \sum_{j=0}^{3} \frac{1}{4}\Biggl( \sum_{p=0}^{7} \sum_{q=0}^{7} \frac{g(p)g(q)}{4} C_{pq}\Bigl(\cos\frac{(4i-15)p\pi}{32}\cos\frac{(4j+1)q\pi}{32} + \cos\frac{(4i-13)p\pi}{32}\cos\frac{(4j+3)q\pi}{32} + \cos\frac{(4i-15)p\pi}{32}\cos\frac{(3j+3)p\pi}{32} +$$

$$\cos\frac{(4i-13)p\pi}{32}\cos\frac{(4j+3)q\pi}{32} \Bigr) \Biggr) + \sum_{i=0}^{3} \sum_{j=-}^{7} \frac{1}{4}\Biggl(\sum_{p=0}^{7} \sum_{q=0}^{7} \frac{g(p)g(q)}{4} D_{pq}\Bigl(\cos\frac{(4i+1)}{32}\cos\frac{(4j-15)q\pi}{32} +$$

$$\cos\frac{(4i+3)p\pi}{32}\cos\frac{(4j-15)q\pi}{32} + \cos\frac{(4i+3)p\pi}{32}\cos\frac{(4j-13)q\pi}{32}\Bigr)\Biggr) + \sum_{i=4}^{7}\sum_{j=4}^{7} \frac{1}{4}\Biggl(\sum_{p=o}^{7}\sum_{q=0}^{7}\frac{g(p)g(q)}{4}E_{pq}\Bigl(\cos\frac{(4i-15)p\pi}{32}\cos\frac{(4j+13)q\pi}{32} +$$

$$\cos\frac{(4i-13)p\pi}{32}\cos\frac{(4j-15)q\pi}{32} + \cos\frac{(4i-15)p\pi}{32}\cos\frac{(4j-13)q\pi}{32} + \cos\frac{(4i-13)p\pi}{32}\cos\frac{(4j-13)q\pi}{32}\Bigr)\Biggr)\Biggr)\cos\frac{(2i+1)k\pi}{32}\cos\frac{(2j+1)l\pi}{32}$$

$$= \sum_{p=0}^{7} \sum_{q=0}^{7} \frac{1}{4}[W_{kl}(p,q)B_{pq} + X_{kl}(p,q)C_{pq} + Y_{kl}(p,q)D_{pq} + Z_{kl}(p,q)E_{pq}]$$

where $$W_{kl}(p,q) = \frac{g(k)g(l)g(p)g(q)}{16} \sum_{i=0}^{3}\sum_{j=0}^{3}\left[\cos\frac{(4i+1)p\pi}{32}\cos\frac{(4j+1)q\pi}{32} + \cos\frac{(4i+3)p\pi}{32}\cos\frac{(4j+1)q\pi}{32} + \cos\frac{(4i+1)p\pi}{32}\cos\frac{(4j+3)q\pi}{32} + \cos\frac{(4i+3)p\pi}{32}\cos\frac{(4j+3)q\pi}{32}\right] \quad (15a)$$

$$X_{kl}(p,q) = \frac{g(k)g(l)g(p)g(q)}{16}\cdot\sum_{i=4}^{7}\sum_{j=0}^{3}\left[\cos\frac{(4i-15)p\pi}{32}\cos\frac{(4j+1)q\pi}{32} + \cos\frac{(4i-13)p\pi}{32}\cos\frac{(4j+1)q\pi}{32} + \cos\frac{(4i-15)p\pi}{32}\cos\frac{(4j+3)q\pi}{32} + \cos\frac{(4i-13)p\pi}{32}\cos\frac{(4j+3)q\pi}{32}\right] \quad (15b)$$

$$Y_{kl}(p,q) = \frac{g(k)g(l)g(p)g(q)}{16}\cdot\sum_{i=0}^{3}\sum_{j=4}^{7}\left[\cos\frac{(4i+1)p\pi}{32}\cos\frac{(4j-15)q\pi}{32} + \cos\frac{(4i+3)p\pi}{32}\cos\frac{(4j-15)q\pi}{32} + \cos\frac{(4i+1)p\pi}{32}\cos\frac{(4j-13)q\pi}{32} + \cos\frac{(4i+3)p\pi}{32}\cos\frac{(4j-13)q\pi}{32}\right] \quad (15c)$$

$$Z_{kl}(p,q) = \frac{g(k)g(l)g(p)g(q)}{16}\cdot\sum_{i=4}^{7}\sum_{j=4}^{7}\left[\cos\frac{(4i-15)p\pi}{32}\cos\frac{(4j-15)q\pi}{32} + \cos\frac{(4i-13)p\pi}{32}\cos\frac{(4j-15)q\pi}{32} + \cos\frac{(4i-15)p\pi}{32}\cos\frac{(4j-13)q\pi}{32} + \cos\frac{(4i-13)p\pi}{32}\cos\frac{(4j-13)q\pi}{32}\right] \quad (15d)$$

In the expressions above for the two-dimensional case, expressions (8)–(11), (12), (13), (14), and (15a)–(15d) correspond to expressions (1)–(2), (4), (5), (6) and (7a)–(7b) for the one-dimensional case. Therefore, as discussed above with the one-dimensional case, matrices W, X, Y and Z are independent of the DCT coefficients, and the smoothing and filtering operation can be modified by modifying Sb, Sc, Sd and Se in expression (12), which results in changes to matrices W, X, Y and Z.

The second technique involves low-pass filtering and smoothing. In this technique, an ideal low-pass filter, serving as an anti-aliasing filter, removes high-frequencies before down-sampling. The process of ideal low-pass filtering is equivalent to the convolution of the input array with a sin function in the spatial domain. Again, using a to designate a 16 element array, the one-dimensional case will be described. A 16×1 DCT array A is obtained from a using expression (16) below.

$$A_k = \frac{g(k)}{2}\sum_{k=0}^{15}a_k\cos\frac{(2i+1)k\pi}{32}\quad k=0,1,\ldots,15. \quad (16)$$

Implementing ideal low-pass filtering, an 8×1 DCT array A' is obtained according to expression (17) below.

$$A'_k = A_k, k=0,1,\ldots,7 \quad (17)$$

Next, to obtain synthesis, A' must be characterized in terms of B and C. Expression (18) shows the relationship between A' and 8 element arrays b and c for even coefficients of A'.

$$A'_{2k} = \frac{g(k)}{2}\sum_{i=0}^{15}a_i\cos\left(\frac{(2i+1)2k\pi}{32}\right) \quad (18)$$

$$= \frac{g(k)}{2}\left(\sum_{i=0}^{7}a_i\cos\left(\frac{(2i+1)k\pi}{16}\right) + \sum_{i=0}^{7}a_{i+8}\cos\left(\frac{2(i+8)+1)k\pi}{16}\right)\right)$$

$$= \frac{g(k)}{2}\left(\sum_{i=0}^{7}b_i\cos\left(\frac{(2i+1)k\pi}{16}\right) + (-1)^k\sum_{i=0}^{7}c_i\cos\left(\frac{(2i+1)k\pi}{16}\right)\right), k=0,1,\ldots 3.$$

From expressions (18), (1) and (2), expression (19) is obtained.

$$A''_{2k}=B_k(-1)^kC_k, k=0,1,\ldots 3, \quad (19)$$

Expression (20) shows the relationship between A' and 8 element arrays b and c for odd coefficients of A'.

$$A'_{2k+1} = \frac{g(k)}{2}\left(\sum_{i=0}^{7}b_i\cos\left(\frac{(2i+1)\left(k+\frac{1}{2}\right)\pi}{16}\right) + (-1)^k\sum_{i=0}^{7}c_i\cos\left(\frac{(2i+1)\left(k+\frac{1}{2}\right)\pi}{16} + \left(k+\frac{1}{2}\right)\pi\right)\right) \quad (20)$$

$$= \frac{g(k)}{2}\left(\sum_{i=0}^{7}b_i\cos\left(\frac{(2i+1)\left(k+\frac{1}{2}\right)\pi}{16}\right) + (-1)^k\sum_{i=0}^{7}c_i\sin\left(\frac{(2i+1)\left(k+\frac{1}{2}\right)\pi}{16}\right)\right), k=0,1,\ldots 3.$$

Unfortunately, the odd coefficients can not be reduced to a simple expression as with the even coefficients. Accordingly, a matrix operation is required to express the odd coefficients of A' in terms of 8×1 matrices B and C. Expression (21) and (22a)–(22b) below shows the relationship between the odd coefficients of A' and 8×1 matrices B and C.

$$A'_{2k+1} = \frac{g(k)}{2}\left(\sum_{i=0}^{7}\cos\frac{(2i+1)\left(k+\frac{1}{2}\right)\pi}{16}\left(\sum_{p=0}^{7}\frac{g(p)}{2}B_p\cos\frac{(2i+1)p\pi}{16}\right) + (-1)^k\left(\sum_{i=0}^{7}\sin\frac{(2i+1)\left(k+\frac{1}{2}\right)\pi}{16}\left(\sum_{p=0}^{7}\frac{g(p)}{2}C_p\cos\frac{(2i+1)p\pi}{16}\right)\right)\right) \quad (21)$$

$$= \sum_{p=0}^{7}B_p\left(\frac{g(k)g(p)}{4}\sum_{i=0}^{7}\cos\frac{(2i+1)p\pi}{16}\cos\frac{(2i+1)\left(k+\frac{1}{2}\right)\pi}{16}\right) + (-1)^k\sum_{p=0}^{7}C_p\left(\frac{g(k)g(p)}{4}\sum_{i=0}^{7}\cos\frac{(2i+1)p\pi}{16}\sin\frac{(2i+1)\left(k+\frac{1}{2}\right)\pi}{16}\right)$$

-continued $$= \sum_{p=0}^{7} B_p U_k(p) + (-1)^k \sum_{p=0}^{7} C_p V_k(p), k = 0, 1, \ldots, 3.$$

where $U_k(p)$ and $V_k(p)$ are the conversion matries with:

$$U_k(p) = \frac{g(k)g(p)}{4} \sum_{i=0}^{7} \cos\frac{(2i+1)p\pi}{16} \cos\frac{(2i+1)\left(k+\frac{1}{2}\right)\pi}{16}, \quad (22a)$$

$k = 0, 1, \ldots 3.$ $$V_k(p) = \frac{g(k)g(p)}{4} \sum_{i=0}^{7} \cos\frac{(2i+1)p\pi}{16} \sin\frac{(2i+1)\left(k+\frac{1}{2}\right)\pi}{16}, \quad (22b)$$

$k = 0, 1, \ldots 3.$

As with matrices M and N in the first technique matrices U and V are independent from the DCT coefficients.

Based on expressions (19) and (21), the synthesized 8×1 DCT array A' can be obtained. Then, the spatial domain representation of A', a', can be obtained by inverse DCT.

As with the first technique, having demonstrated the one-dimensional case for the second technique, one skilled in the art can readily determine expressions (23)–(26d) below to implement the two-dimensional case of the second technique, A" represents the synthesized 8×8 DCT block; a" represents the spatial transformation of A"; B, C, D, and E each represent one of the four 8×8 DCT blocks; and b, c, d, and 3 represent the spatial transformation of the 8×8 DCT blocks, respectively.

$$A''_{2k,2l} = \frac{g(k)g(l)}{4} \sum_{i=0}^{15} \sum_{j=0}^{15} a_{ij} \cos\frac{(2i+1)2k\pi}{32} \cos\frac{(2j+1)2k\pi}{32} \quad (23)$$

$$= \frac{g(k)g(l)}{4}\left(\sum_{i=0}^{7}\sum_{j=0}^{7} a_{ij}\cos\frac{(2i+1)k\pi}{16}\cos\frac{(2j+1)l\pi}{16} + \sum_{i=0}^{7}\sum_{j=0}^{7} a_{i+8,j}\cos\frac{(2i+8+1)k\pi}{16}\cos\frac{(2j+1)l\pi}{16} + \right.$$

$$\left. \sum_{i=0}^{7}\sum_{j=0}^{7} a_{i,j+8}\cos\frac{(2i+1)k\pi}{16}\cos\frac{(2j+8+1)l\pi}{16} + \sum_{i=0}^{7}\sum_{j=0}^{7} a_{i+8,j+8}\cos\frac{(2i+8+1)k\pi}{16}\cos\frac{(2j+8+1)l\pi}{16}\right)$$

$$= \frac{g(k)g(l)}{4}\left(\sum_{i=0}^{7}\sum_{j=0}^{7} b_{ij}\cos\frac{(2i+1)k\pi}{16}\cos\frac{(2j+1)l\pi}{16} + (-1)^k \sum_{i=0}^{7}\sum_{j=0}^{7} c_{ij}\cos\frac{(2i+1)k\pi}{16}\cos\frac{(2j+1)l\pi}{16} + \right.$$

$$\left. (-1)^l \sum_{i=0}^{7}\sum_{j=0}^{7} d_{ij}\cos\frac{(2j+1)k\pi}{16}\cos\frac{(2j+1)l\pi}{16} + (-1)^{k+l}\sum_{i=0}^{7}\sum_{j=0}^{7} e_{ij}\cos\frac{(2i+1)l\pi}{16}\cos\frac{(2j+1)k\pi}{16}\right)$$

$$= B_{ij} + (-1)^k C_{ij} + (-1)^l D_{ij} + (-1)^{k+l} E_{ij}$$

$$A''_{2k+1,2l+1} = \frac{g(k)g(l)}{4}\left(\sum_{i=0}^{7}\sum_{j=0}^{7} b_{i,j}\cos\frac{(2i+1)k\pi}{16}\cos\frac{(2j+1)l\pi}{16} + \right. \quad (24)$$

$$(-1)^k \sum_{i=0}^{7}\sum_{j=0}^{7} c_{ij}\cos\left(\frac{(2i+1)\left(k+\frac{1}{2}\right)\pi}{16} + \left(k+\frac{1}{2}\right)\pi\right)\cdot\cos\left(\frac{(2i+1)\left(l+\frac{1}{2}\right)\pi}{16} + \left(l+\frac{1}{2}\right)\pi\right) + (-1)^l \sum_{i=0}^{7}\sum_{j=0}^{7} d_{ij}\cos\left(\frac{(2i+1)\left(k+\frac{1}{2}\right)\pi}{16} + \left(k+\frac{1}{2}\right)\pi\right)\cdot$$

$$\cos\left(\frac{(2j+1)\left(l+\frac{1}{2}\right)\pi}{16} + \left(l+\frac{1}{2}\right)\pi\right) + (-1)^{k+l}\sum_{i=0}^{7}\sum_{j=0}^{7} e_{ij}\cos\left(\frac{(2i+1)\left(k+\frac{1}{2}\right)\pi}{16} + \left(k+\frac{1}{2}\right)\pi\right)\cdot\cos\left(\frac{(2j+1)\left(l+\frac{1}{2}\right)\pi}{16} + \left(l+\frac{1}{2}\right)\pi\right)\right)$$

$$= \frac{g(k)g(l)}{4}\sum_{i=0}^{7}\sum_{j=0}^{7}\left(b_{ij}\cos\frac{(2i+1)\left(k+\frac{1}{2}\right)\pi}{16}\cos\frac{(2j+1)\left(l+\frac{1}{2}\right)\pi}{16} + (-1)^k c_{ij}\sin\frac{(2i+1)\left(k+\frac{1}{2}\right)\pi}{16}\sin\frac{(2j+1)\left(l+\frac{1}{2}\right)\pi}{16} + \right.$$

$$\left. (-1)^l d_{ij}\cos\frac{(2i+1)\left(k+\frac{1}{2}\right)\pi}{16}\cos\frac{(2j+1)\left(l+\frac{1}{2}\right)\pi}{16} + (-1)^{k+l} e_{ij}\sin\frac{(2i+1)\left(k+\frac{1}{2}\right)\pi}{16}\sin\frac{(2j+1)\left(l+\frac{1}{2}\right)\pi}{16}\right)$$

$$A''_{2k+1,2l+1} = \sum_{p=0}^{7} \sum_{q=0}^{7} \frac{1}{4}[Q_{kl}(p,q)B_{pq} + (-1)^k R_{kl}(p,q)C_{pq} + \quad (25)$$
$$(-1)^l S_{kl}(p,q)D_{pq} + (-1)^{k+l} T_{kl}(p,q)E_{pq}]$$

where, $$Q_{kl}(p,q) = \frac{g(k)g(l)g(p)g(q)}{8} \sum_{i=0}^{7} \sum_{j=0}^{7} \cos\frac{(2i+1)p\pi}{16} \cos\frac{(2j+1)p}{16} \cdot \quad (26a)$$
$$\cos\frac{(2i+1)\left(k+\frac{1}{2}\right)\pi}{16} \cos\frac{(2j+1)\left(1+\frac{1}{2}\right)\pi}{16}$$

$$R_{kl}(p,q) = \frac{g(k)g(l)g(p)g(q)}{8} \sum_{i=0}^{7} \sum_{j=0}^{7} \cos\frac{(2i+1)p\pi}{16} \cos\frac{(2j+1)p}{16} \cdot \quad (26b)$$
$$\sin\frac{(2i+1)\left(k+\frac{1}{2}\right)\pi}{16} \sin\frac{(2j+1)\left(1+\frac{1}{2}\right)\pi}{16}$$

$$S_{kl}(p,q) = \frac{g(k)g(l)g(p)g(q)}{8} \sum_{i=0}^{7} \sum_{j=0}^{7} \cos\frac{(2l+1)k\pi}{16} \cos\frac{(2j+1)q}{16} \cdot \quad (26c)$$
$$\cos\frac{(2i+1)\left(k+\frac{1}{2}\right)\pi}{16} \cos\frac{(2j+1)\left(1+\frac{1}{2}\right)\pi}{16}$$

$$T_{kl}(p,q) = \frac{g(k)g(l)g(p)g(q)}{8} \sum_{i=0}^{7} \sum_{j=0}^{7} \cos\frac{(2l+1)p\pi}{16} \cos\frac{(2j+1)q}{16} \cdot \quad (26d)$$
$$\sin\frac{(2i+1)\left(k+\frac{1}{2}\right)\pi}{16} \sin\frac{(2j+1)\left(1+\frac{1}{2}\right)\pi}{16}$$

In the expressions above for the two-dimensional case, expressions, (23)–(26d) correspond to expressions (19)–(22b) for the one-dimensional case. Therefore, as discussed above with the one-dimensional case, matrices Q, R, S, and T are independent of the DCT coefficients.

Accordingly, using either expressions (14)–(15d) according to the first technique or expressions (21)–(26d) according to the second technique, the synthesizer 32 synthesizes the four 8×8 luminance DCT blocks into a single 8×8 luminance DCT block.

When the separator 30 identifies either the 4:2:0 or the 4:2:2 sequence, the synthesizer 32 synthesizes the four 8×8 luminance DCT blocks into one 8×8 luminance DCT block according to one of the two techniques discussed above. If, however, the separator 30 identifies the 4:4:4 sequence, the synthesizer 32 synthesizes the four 8×8 luminance DCT blocks into one 8×8 luminance DCT block, synthesizes the four 8×8 U chroma DCT blocks into one 8×8 U chroma DCT block, and synthesizes the four 8×8 V chroma DCT blocks into one 8×8 V chroma DCT block. The IDCT 34 converts the DCT blocks output from the synthesizer 32 into spatial blocks.

During the synthesis operation, the down-converter 12 receives the output of the separator 30 as discussed above, and operates in the same manner as described in the Background of the Invention section. The recombiner 36 also identifies the HDTV sequence based on the sequence header, and recombines the spatial luminance blocks output by the IDCT 34 with the spatial chroma blocks output by the down-converter 12 when the 4:2:0 or 4:2:2 sequence have been identified. Otherwise, when the 4:4:4 sequence has been identified, the recombiner 36 merely passes the output of the IDCT 36. The output of the recombiner 36 is an SDTV bit stream unless as discussed above, the HDTV signal was predictive or inter-coding encoded.

Second Embodiment

Figure 4A:
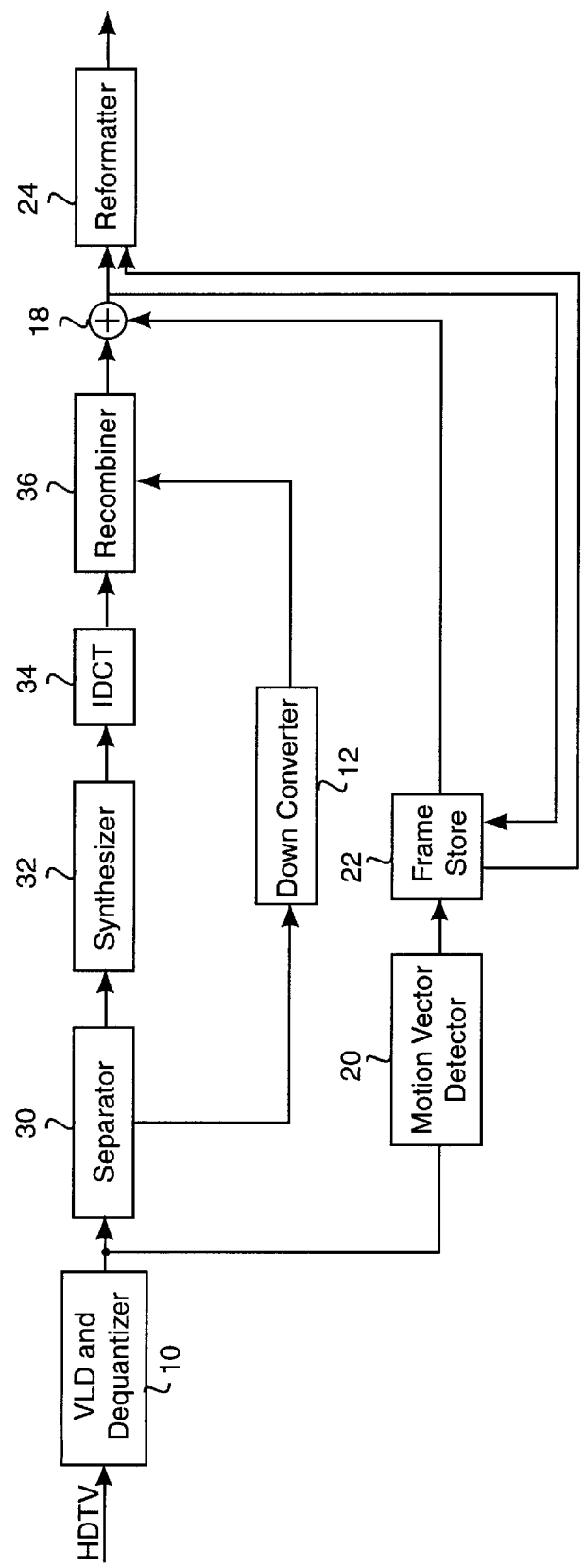
FIGS. 4A and 4B illustrate other apparatuses, according to the present invention, for performing HDTV down-converting wherein filtering and down-sampling are performed in the DCT domain.

If inter-coding was used, the output of the recombiner 36 will not represent spatial data in SDTV format. Accordingly, the adder 18, the motion vector detector 20, the frame store 22, and the reformatter 24 will have to be connected to the converting apparatus of FIG. 3A such as shown in FIG. 4A. Specifically, the motion vector detector 20 is connected to receive the output of the VLD and dequantizer 10. The frame store 22 is connected to the output of the motion vector detector 20, and the adder 18 receives and adds the output of the recombiner 36 and the frame store 22. The frame store 22 also receives the output of the adder 18. The reformatter 24 is connected to both the adder 18 and the frame store 22, and outputs either the output from the adder 18 or a picture stored by the frame store 22. Since the operation of these additional components was described with respect to FIG. 2, that description will not be repeated.

As with the conventional art, once a digital signal in SDTV format is obtained, the SDTV signal can be converted to an NTSC signal using well-known techniques.

Computer simulations were run to compare the converter of the present invention illustrated in FIG. 3A with the prior art technique discussed above with respect to FIG. 1. Furthermore, a prior art technique wherein the HDTV decoded pictures are first filtered by a low-pass filter and then down-sampled by one-half in each dimension was used as a benchmark. In the computer simulations, an 1920×1080 interlaced HDTV sequence, "Whale", was used. The HDTV bit stream was generated by the MPEG standard video coding software with parameters of GOP size N=15, anchor frame distance M=3, bit rate equal to 19 Mbps, and 4:2:0 sequence. The simulation results showed that the prior art technique illustrated in FIG. 1 suffered from a significant amount of block edge effect and distortions due to poor approximation introduced by simply disregarding higher order coefficients (i.e., masking). The present invention, however, achieved significantly improved results over the prior art technique of FIG. 1. Additionally, the present invention provided improved processing speed, even faster than the benchmark.

Third Embodiment

Figure 3B:
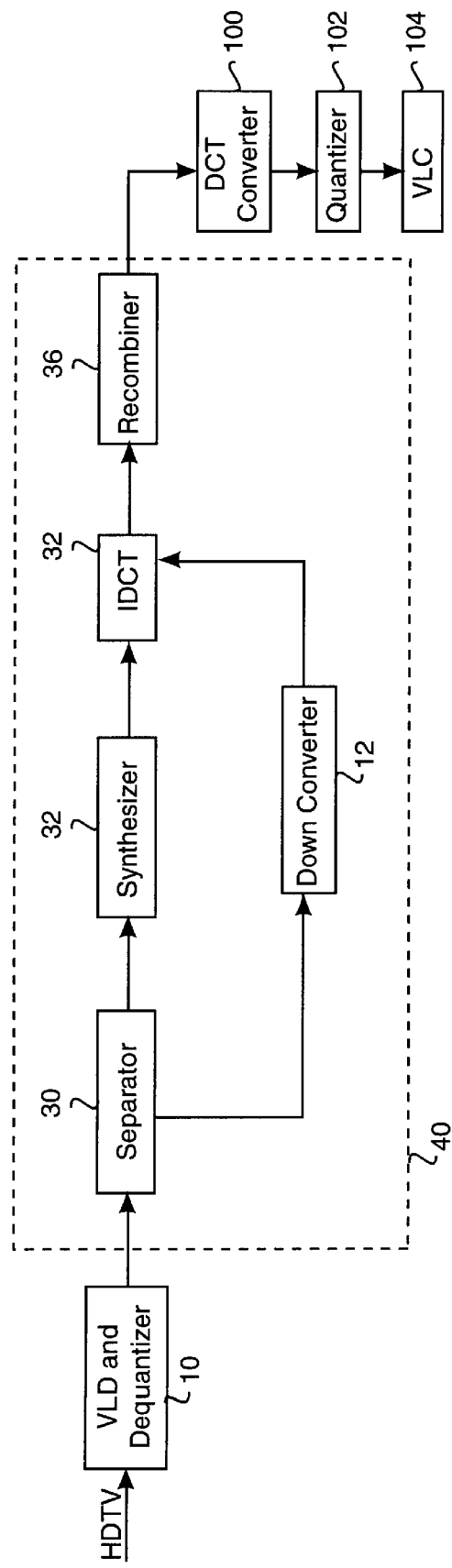
Figure 4B:
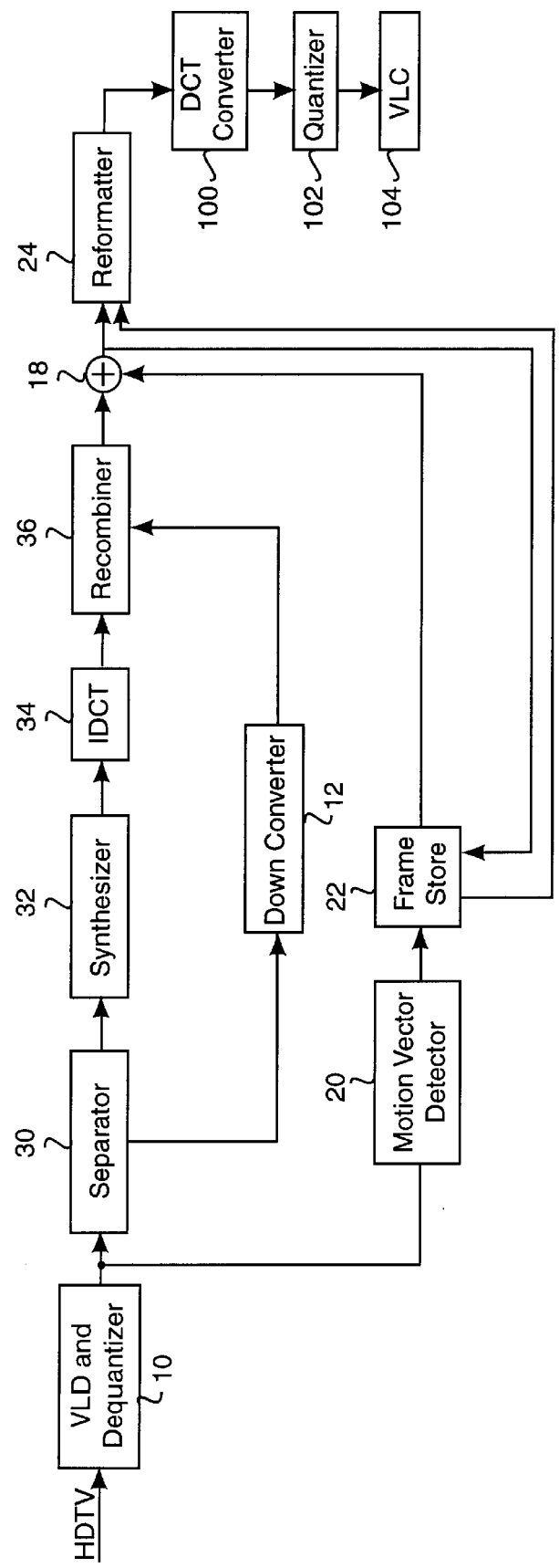

Standard SDTV decoders expect to receive an SDTV signal or bit stream which is both quantized (Q) and variable length encoded (VLC). Accordingly, the signal output by the HDTV converters of FIGS. 3A and 4A cannot be used by a standard SDTV converter. The HDTV converters of FIGS. 3A and 4A, however, can be modified to supply an SDTV signal such as expected by a standard SDTV decoder. Specifically, a DCT converter 100, a quantizer 102, and variable length encoder 104 would have to be connected in series to the output of the HDTV converter of FIGS. 3A and 4A as shown in FIGS. 3B and 4B.

Operation of the Third Embodiment

The DCT converter 100 converts the spatial domain SDTV signal into the frequency domain, the quantizer 102 then quantizes the output of the DCT converter 100, and the variable length encoder 104 variable length encodes the output from the quantizer 102 to produce an SDTV signal as expected by a standard SDTV decoder. Because variable length coding is lossless coding, only the distortion caused by the quantization step needs to be accounted for by the quantizer 102.

The elimination of distortion, however, can be assured by performing quantization as discussed in detail below.

Assuming that Q is the quantization scale determined by the original encoder, I is the intra macro block data before quantization and I' is the data after quantization, then $$I' = \left[\frac{I}{Q}\right] \cdot Q \qquad (27)$$

where the operator [.] is an integer operator, and I' can be seen as the reconstructed data.

Assume that $Q_r$, is the quantization scale used in the requantization, and I" is the data obtained after requantization, then $$I'' = \left[\frac{I'}{Qr}\right] \cdot Qr = \left[\left[\frac{I}{Q}\right] \cdot \frac{Q}{Qr}\right] \cdot Qr = \left[\frac{I}{Q}\right] \cdot \left[\frac{Q}{Qr}\right] \cdot Qr \qquad (28)$$

and, therefore, $$I'' = \left[\frac{I}{Q}\right] \cdot Q = I', \text{ if } \left[\frac{Q}{Qr}\right] = \text{integer} \qquad (29)$$

In other words, if the requantization scale is chosen as an integer times the original quantization scale, requantization will not cause any additional distortion.

For uni-directionally inter-coded macro blocks (i.e., macro blocks from P-pictures), $$P'=I'+E', \qquad (30)$$

where P' is the reconstructed data of the inter-coded macro block from the P-picture, I' represents the reconstructed reference data for motion-compensation (i.e., the composite macro block) and E' is the reconstructed prediction error (i.e., the macro block from the variable length decoder and dequantizer 58). Let Qi be the quantizer for I', Qp for P' and Qe for E', then expression (30) can be re-written as:

$$P' = \left[\frac{P}{Qp}\right] \cdot Qp = \left[\frac{I}{Qi}\right] \cdot Qi + \left[\frac{E}{Qe}\right] \cdot Qe \qquad (31)$$

After requantization with quantizer scale Qr, $$P'' = \left[\frac{P}{Qr}\right] \cdot Qr = \left[\left[\frac{I}{Qi}\right] \cdot \frac{Qi}{Qr} + \left[\frac{P}{Qp}\right] \cdot \frac{Qp}{Qr}\right] \cdot Qr \qquad (32)$$

where P" is the requantized reconstructed data. Accordingly, $$P'' = \left[\frac{I}{Qi}\right] \cdot Qi + \left[\frac{E}{Qe}\right] \cdot Qe = P', \qquad (33)$$

provided that both, $$\frac{Qi}{Qr} = \text{integer}, \frac{Qe}{Qr} = \text{integer} \qquad (34)$$

are satisfied. Therefore, if Qr is chosen according to the following expression, there is no additional distortion caused by the process of requantizing uni-directionally inter-coded macro blocks.

$$Qr = GCD(Qi, QE), \qquad (35)$$

where GCD stands for greatest common division.

Similarly, for bi-directionally inter-coded macro blocks, relationships can also be derived so that the quantizer scale is properly chosen during the process of requantization such that no additional errors are introduced during the process of requantization.

For bi-directionally inter-coded macro blocks (i.e., macro blocks from B-pictures).

$$B'=I'+P'+E'_I+E'_p \qquad (36)$$

where B' is the reconstructed data of the inter-coded macro block from the B-picture, $E_I'$ is the reconstructed prediction error with respect to the reconstructed reference data I', and $E_p'$ is the reconstructed prediction error with respect to the reconstructed reference data P'. Let $Q_B$ be the quantizer for B', $Q_P$ for P', $Q_{E_I}$ for $E_I'$, and $Q_{E_P}$ for $E_p'$, then expression (36) can be written as expression (37) below.

$$B'' = \left[\frac{B}{Q_B}\right] \cdot Q_B \qquad (37)$$

$$= \left[\frac{I}{Q_I}\right] \cdot Q_I + \left[\frac{P}{Q_P}\right] \cdot Q_P + \left[\frac{E_I}{Q_{E_I}}\right] \cdot Q_{E_I} + \left[\frac{E_P}{Q_{E_P}}\right] \cdot Q_{E_P}$$

After requantization with quantizer scale Qr, $$B'' = \left[\frac{B'}{Q_r}\right] \cdot Q_r \qquad (38)$$

where B" is the requantized reconstructed data for the bi-directionally inter-coded macro block. Accordingly, $$B'' = \left\{\left[\frac{I}{Q_I}\right]\frac{Q_I}{Q_r} + \left[\frac{P}{Q_P}\right]\frac{Q_P}{Q_r} + \left[\frac{E_I}{Q_{E_I}}\right]\frac{Q_{E_I}}{Q_r} + \left[\frac{E_P}{Q_{E_P}}\right]\frac{Q_{E_P}}{Q_r}\right\} \cdot Q_r = B' \qquad (39)$$

provided the following ratios are integers:

$$\frac{Q_I}{Q_r}, \frac{Q_P}{Q_r}, \frac{Q_{E_I}}{Q_r}, \frac{Q_{E_P}}{Q_r} \text{ or,} \qquad (40)$$

$$Q_r = GCD(Q_T, Q_P, Q_{E_I}, Q_{E_P}) \qquad (41)$$

Therefore, if expressions (40) or (41) are satisfied, there is no additional distortion caused by requantizing bi-directionally inter-coded macro blocks. Accordingly, taking into account expressions (34) and (35), if the following expression is satisfied, there is no additional distortion caused by the process of requantizing either uni-directionally or bi-directionally inter-coded macro blocks.

$$Q_r = GCD(Q_i, Q_e, Q_{E_p}). \qquad (42)$$

Additionally, because the HDTV signal has been down-converted, the quantizer 102 must also perform bit rate control so that the output thereof achieves the SDTV bit rate. Any well-known technique of bit rate control may be used. Also, if the distortion eliminating techniques discussed above are used, bit rate control may also become necessary. The bit rate control performed to obtain the SDTV bit rate, however, accounts for any influences on bit rate that use of the distortion eliminating equations may have.

Producing an SDTV signal as expected by a standard SDTV decoder in the manner discussed above with respect to FIGS. 3B and 4B, has two drawbacks. First, an additional DCT converter (i.e. DCT processor) is required. This increases the processing time and expense of the resulting apparatus. Furthermore, when the HDTV signal includes inter-coded pictures, a frame store 22 (see FIG. 4B) capable of storing two complete anchor pictures in the spatial domain is required to reconstruct spatial pictures. Memory requirements directly impact on the complexity and expense of such a device.

Fourth Embodiment

Figure 5:
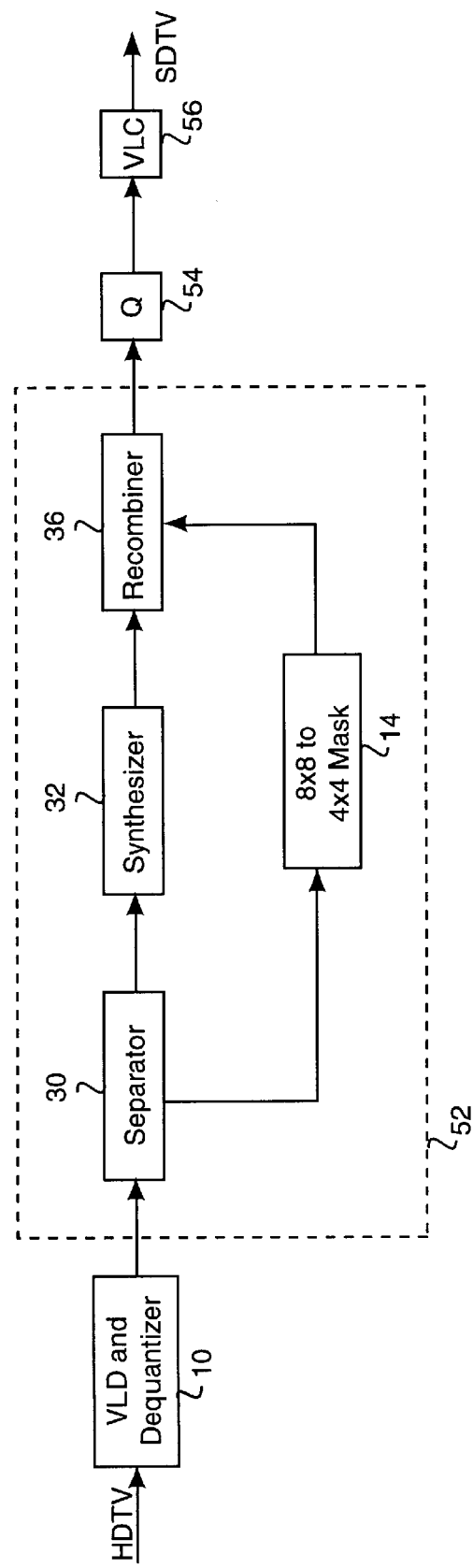
FIG. 5 illustrates another embodiment of an HDTV to SDTV converter according to the present invention.

FIG. 5 illustrates another embodiment of an HDTV to SDTV converter. The HDTV converter of FIG. 5 converts the HDTV signal into an SDTV signal expected by a standard SDTV decoder. The embodiment of FIG. 5, however, does not require performing DCT conversion, and also eliminates the need for inverse DCT conversion. Accordingly, this embodiment as compared to the embodiment of FIG. 3B eliminates both an inverse DCT converter and a DCT converter. As one skilled in the art will readily appreciate, the decoding process is therefore greatly simplified, as is the cost of the resulting device.

As shown in FIG. 5, a variable length decoder and dequantizer 10 is connected to a down-converter 52. The output of the down-converter 52 is processed in series by a quantizer 54 and a variable length encoder 56. The quantizer 54 requantizes the output of the down-converter 52 in the same manner discussed above with respect to the quantizer 102. The down-converter 52 includes a separator 30 which receives the output of the variable length decoder and dequantizer 10. A synthesizer 32 and mask 14 are connected to the separator 30, and send their output to a recombiner 50. The output of the recombiner 50 serves as the output of the down-converter 52.

It should be understood that in FIG. 5 the various data paths have been represented in greatly simplified form for clarity. In reality, many separate data paths into and out of the various components are required. Additionally, many data and control lines have been omitted entirely from FIG. 5 for clarity.

Operation of the Fourth Embodiment

During operation, the variable length decoder and dequantizer 10, variable length decodes and dequantizes the HDTV signal. As discussed with respect to FIG. 3A, the separator 30 receives the output of the variable length decoder and dequantizer 10, and based on the sequence header, identifies the sequence of the HDTV signal. The separator 30 then sends the luminance DCT blocks to the synthesizer 32, and sends the chroma DCT blocks to either the synthesizer 32 or the mask 14 depending upon the sequence identified from the sequence header of the HDTV signal. Both the synthesizer 32 and the mask 14 operate as discussed previously in this disclosure. The luminance DCT blocks output by the synthesizer 32 are then recombined with the chroma DCT blocks output from the mask 14 by the recombiner 50. In this manner the recombiner 50 recombines the DCT blocks corresponding to each picture to produce an SDTV signal in the frequency domain in much the same way the recombiner 36 recombined the spatial domain luminance and chroma blocks. The SDTV signal in the frequency domain output by the recombiner 50 is then quantized by the quantizer 54. As discussed above, the quantizer 54 requantizes the output of the down-converter 52 in the same manner as the quantizer 102. Subsequently, the output of the quantizer 54 is variable length encoded by the variable length encoder 56. Accordingly, the variable length encoder 56 produces an SDTV signal such as expected by a standard SDTV decoder.

The HDTV converter illustrated in FIG. 5 operates independently of the SDTV decoder. Consequently, the HDTV converter of this embodiment can be added to existing standard SDTV decoders without modification of standard SDTV decoders. As a result, the HDTV converter of FIG. 5 is very flexible in its application.

Fifth Embodiment

Figure 6:
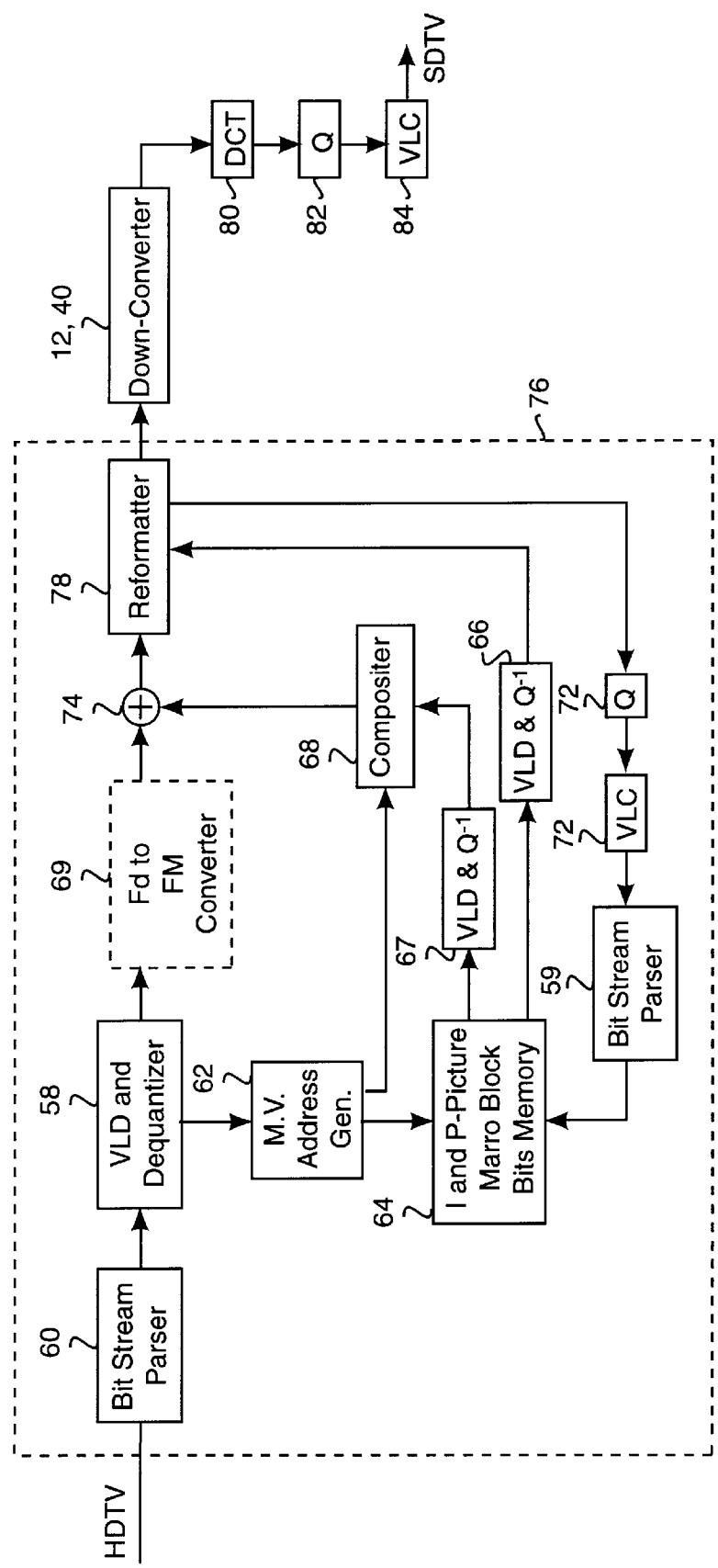
FIG. 6 illustrates a further embodiment of an HDTV to SDTV converter according to the present invention.

The HDTV converter of FIG. 5 can only handle HDTV signals having intra-coded pictures. The HDTV converter of FIG. 5 does not provide a means for processing inter-coded pictures. FIG. 6, however, illustrates another HDTV to SDTV converter according to the present invention. The HDTV converter of FIG. 6 can down-convert an HDTV signal into an SDTV signal as expected by a standard SDTV converter, even though the HDTV signal includes inter-coded pictures. Furthermore, in contrast to the HDTV converter of FIG. 4, the HDTV converter of FIG. 6 does not require memory capacity sufficient to store two anchor pictures in the spatial domain. Instead, the HDTV converter of FIG. 6 converts inter-coded pictures into I-pictures in the frequency or DCT domain.

Accordingly, the embodiment of FIG. 6 only requires storing two anchor pictures in the frequency domain. Additionally, the embodiment of FIG. 6 stores the variable length encoded and quantized version of these frequency domain anchor pictures. As a result, the memory requirements for storing these anchor pictures as compared to FIG. 4B are considerably reduced. Applicants estimate that the memory requirements of FIG. 6 are at least one-third less than the memory requirements for the embodiment of FIG. 4B. Since the requisite memory capacity for an HDTV converter is a large component of the cost therefore, this reduction in memory capacity results in a significant decrease in the cost of the resulting device.

As illustrated in FIG. 6, the HDTV signal is received by an I-picture converter 76 which processes an HDTV signal having either I-pictures, or both I-pictures and inter-coded pictures. After processing the HDTV signal, the I-picture converter 76 outputs an HDTV signal comprised only of I-pictures. The HDTV signal output by the I-picture converter 76 is received by a down-converter 12 or 40. Connected in series to the output of the down-converter 12,40 is a DCT converter 80, a quantizer 82, and a variable length encoder 84.

The I-picture converter 76 includes a bit stream parser 60 which receives the HDTV signal input to the I-picture converter 76. A variable length decoder and dequantizer 58 receives one of the outputs of the bit stream parser 60. The variable length decoder and dequantizer 58 outputs pictures to an adder 74 and outputs motion vectors to a motion vector address generator 62. As indicated by dashed lines, the variable length decoder and dequantizer 58 outputs pictures to the adder 74 via an optional field-to-frame converter 69. Both the bit stream parser 60 and the motion vector address generator 62 supply output signals to an I and P-picture macro block bits memory 64 (hereinafter referred to as "memory 64"). A variable length decoder and dequantizer 67 is connected to an output of the memory 64, and has an output thereof connected to a compositer 68. Another variable length decoder and dequantizer 66 is connected to an output of the memory 64, and has an output thereof connected to the reformatter 78.

The compositer 68 also receives an output from the motion vector address generator 62. Besides receiving the output of the variable length decoder and dequantizer 58, the adder 74 also receives the output of the compositer 68. The output of the adder 74 is connected to the reformatter 78, and one of the outputs of the reformatter 78 serves as the output of the I-picture converter 76. Another output of the reformatter 78 is received by a quantizer 70 within the I-picture converter 76. A variable length encoder 72 is connected to the output of the quantizer 70, and a bit stream parser 59 is connected to the output of the variable length encoder 72. The bit stream parser 59 supplies another input of the memory 64.

It should be understood that in FIG. 6 the various data paths have been represented in greatly simplified form for clarity. In reality, many separate data paths into and out of the various components are required. Additionally, many data and control lines have been omitted entirely from FIG. 6 for clarity.

Operation of the Fifth Embodiment

The operation of the embodiment illustrated in FIG. 6 will now be described. As discussed above, the I-picture converter 76 receives an HDTV signal, and converts all inter-coded pictures therein into I-pictures. For purposes of discussion, assume that the HDTV signal has the order of encodation as follows: $I_1P_1B_1B_2P_2B_3B_4P_3B_5B_6I_2B_7B_8$, and when displayed, these pictures have the display order of $I_1B_1B_2P_1B_3B_4P_2B_5B_6P_3B_7B_8I_2$.

As discussed above, an HDTV signal including inter-coded pictures includes both picture data and a motion vector corresponding thereto. The bit stream parser 60 receives the HDTV signal, and parses out the header information for each anchor picture. The header information includes the picture type, the picture timing stamp PTS, the slice header, etc. The header information for each anchor picture is output by the bit stream parser 60 to the memory 64. The memory 64 stores the header information on a picture-by-picture basis. The bit stream parser 60 also outputs the HDTV signal to the variable length decoder and dequantizer 58.

The variable length decoder and dequantizer 58 receives the HDTV signal, variable length decodes and dequantizes the HDTV signal, sends the decoded HDTV signal to the adder 74, and sends the motion vectors to the motion vector address generator 62. When the pictures of the HDTV signal could include fields, as opposed to, or in addition to frames, the I-picture converter 76 includes a field-to-frame converter 69 which converts the separate even and odd fields for a frame into a single frame. This is accomplished by simply interlacing the even and odd fields.

As discussed in more detail below, the compositer 68 produces a composite macro block based on the output of the motion vector address generator 62 and the macro blocks output by the memory 64. The adder 74 adds the composite macro block to the macro block of the picture data currently output by the variable length decoder and dequantizer 58, or optionally the field-to-frame converter 69, to reconstruct a complete macro block. In this manner, both P-pictures and B-pictures are converted into I-pictures.

Of course, if an I-picture is currently being output by the variable length decoder and dequantizer 58, then the adder 74 will not receive anything from the compositer 68 to add thereto. The motion vector address generator 62 will have recognized the I-picture as an I-picture and disabled the compositer 68 from sending output to the adder 74.

As discussed in detail below, when the adder 74 outputs I-pictures or I-pictures which were formally P-pictures, the reformatter 78 outputs these anchor pictures to the memory 64 for storage via the quantizer 70, the variable length encoder 72, and the bit stream parser 59. The memory 64 only stores two anchor pictures at a time, and will replace the oldest stored anchor picture with the newly received anchor picture. Specifically, the I and P-pictures (i.e., anchor pictures) in I-picture format output from the reformatter 78 to the memory 64 are quantized by the quantizer 70, and variable length encoded by the variable length encoder 72.

The quantizer 70 performs quantization in the same manner as discussed above with respect to the quantizer 102. The bit rate output from the quantizer 70, however, is that of an HDTV signal. Accordingly, no bit rate control is required if the quantization scale of the original encoder is used. Furthermore, tests have shown that if the quantizer 70 quantizes the anchor frames using the quantization scale determined by the original encoder, no noticeable distortion is introduced. If, however, the distortion eliminating equations are utilized by the quantizer 70, then the quantizer 70 may need to perform bit rate control to obtain the HDTV bit rate.

Using the various headers within the HDTV signal, the bit stream parser 59 identifies each macro block in an anchor picture. The bit stream parser 59 then separates the macro blocks for the anchor picture, and stores them in the memory 64. These anchor frames are stored in the DCT domain and have been variable length encoded and quantized. Consequently, the memory 64 can be much smaller than the memory needed to implement the frame store 22.

Figure 8:
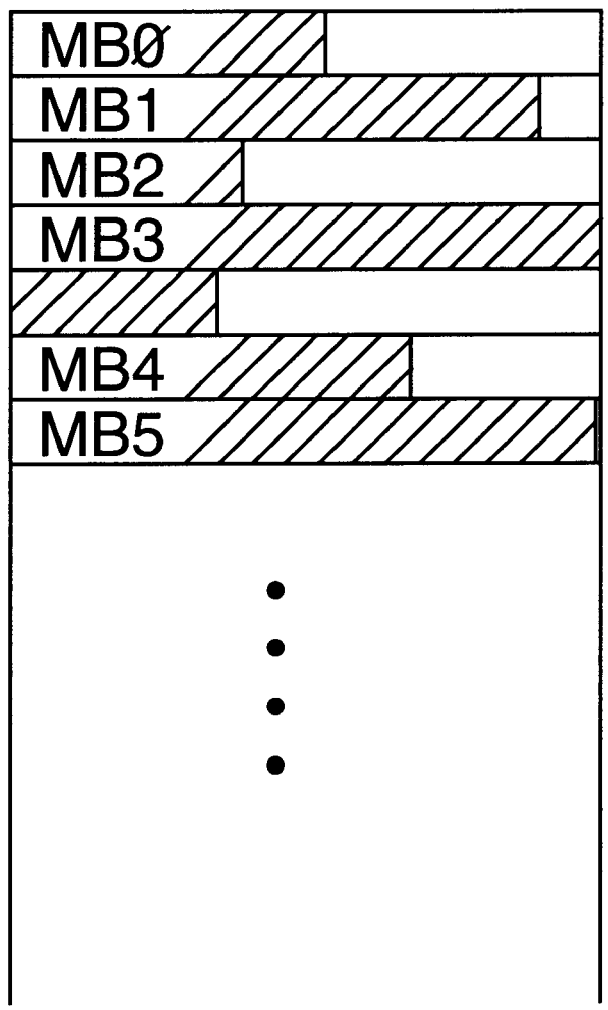
FIG. 8 illustrates an embodiment of the memory in the I-picture converter.

One possible embodiment of memory 64 is illustrates in FIG. 8. As shown in FIG. 8, the memory 64 resembles a memory stack. Each location in the memory stack only stores the data for one macro block. Because the macro blocks are variable length encoded and quantized, the macro blocks can have variable lengths. As illustrated, the macro block MB0 takes up only a portion of the first stack location, the same with macro blocks MB1 and MB2. The fourth macro block MB3, however, contains more data than a single stack location. In this instance, the macro block MB3 fills up an entire stack location and a portion of another stack location. The macro block MB4 following macro block MB3 is then stored in the next stack location. Accordingly, each macro block stored in the memory 64 will be stored beginning in a new stack location. In this manner, each macro block can be stored and retrieved independently of the other macro blocks. Preferably the memory 64 includes two such stacks for storing the macro blocks of two anchor frames. Alternatively, a single, large stack could be divided in half. Furthermore, the memory 64 links the macro blocks of an anchor picture to the previously stored header information therefor.

In the embodiment of FIG. 4, the macro blocks of the anchor pictures (I-pictures and P-pictures) used to form a complete picture were stored in the spatial domain. Accordingly, if the motion vectors caused a shift in the block structure of the anchor picture, the data for the new macro blocks could be easily obtained from the original macro block structure for the anchor picture as discussed in "Manipulation and Compositing of MC-DCT compressed Video" by Shih-Fu Chang, IEEE Journal on Selected Areas in Communication, Vol. 13, No. 1, January 1995 (hereinafter "the Chang article"); which is hereby incorporated by reference.

For instance, as discussed in the Chang article, FIG. 9A illustrates a macro block structure B shown by dashed lines and a macro block structure A illustrated by solid lines. Assume that the macro block structure B represents the macro block structure of an anchor picture stored in frame store memory 22 of FIG. 4B, and that the macro block structure A represents the macro block structure as indicated by the motion vector supplied to the frame store memory 22. If the macro block indicated by the motion vector is the macro block indicated as B' in FIG. 9A, then the macro block is simply formed from the data of the four macro blocks in the macro block structure B such as shown in FIGS. 9B–9D. Since the macro blocks are stored in the spatial domain, that portion of the macro block structure B forming the macro block B' in the macro block structure A can simply be read out. Think of it as a picture on a display screen and a window is simply moved about that display screen.

By contrast, macro blocks in the frequency domain (i.e., DCT blocks) do not operate in the same fashion. Instead, the DCT coefficients represent different frequency components of the corresponding macro block in the spatial domain. Namely, the new macro block B' contains contributions from the lower left corner $B_{13}$ of block $B_1$, the lower right corner $B_{24}$ of macro block $B_2$, the upper right corner $B_3$, of block $B_3$ and the upper left corner $B_{42}$ of macro block $B_4$. While in the spatial domain, the four contributions can be supplemented by zeros as shown in FIG. 9C and added according to the equation $B'=B_{13}+B_{24}+B_{31}+B_{42}$ as shown in FIG. 9D, this same method cannot be applied in the DCT domain. Instead, as discussed in the Chang article, the DCT macro block B' can be calculated according to the following expression:

$$DCT(B') = \sum_{i=1}^{4} DCT(H_{i1}) DCT(B_i) DCT(H_{i2}) \text{ where} \quad (43)$$

$$H_1 = \begin{bmatrix} 0 & 0 \\ I_h & 0 \end{bmatrix} H_2 = \begin{bmatrix} 0 & I_w \\ 0 & 0 \end{bmatrix}$$

where $I_h$ and $I_w$ are identity matrices with size h×h and w×w, respectively; and h and w are the number of rows and columns extracted.

Formation of Composite Macro Block

In a preferred embodiment, however, a different set of expressions is used to determine the composite macro block. First the formation of a composite macro block to perform frame-motion compensation will be described. Field-motion compensation will be described thereafter.

Frame-Motion Compensation Full Pixel Accuracy

Figure 10:
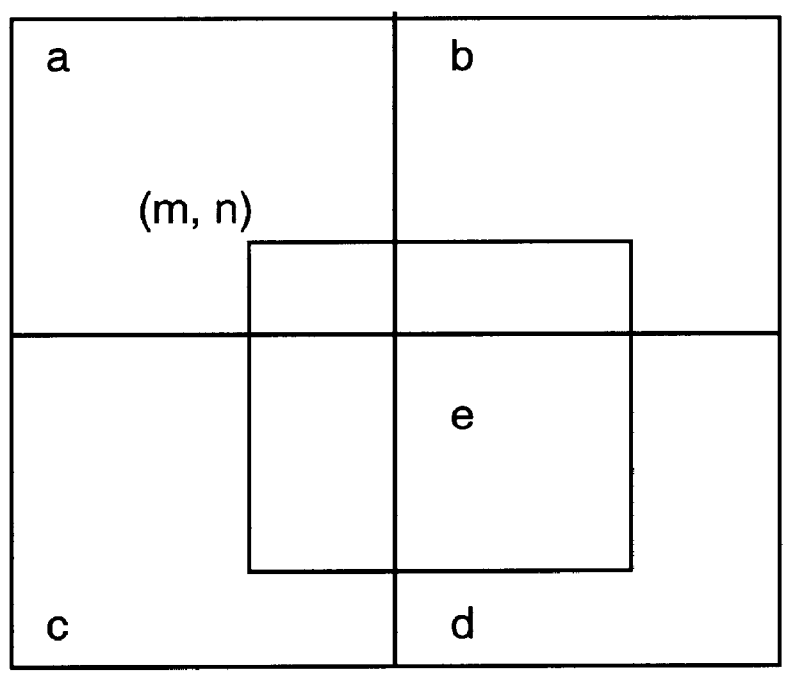
FIG. 10 illustrates a composite macro block with respect to anchor frame macro blocks.

FIG. 10 illustrates macro blocks a, b, c and d from the anchor frame in the spatial domain, and block e the macro block pointed to by the motion vector, albeit in the spatial domain. As shown in FIG. 10, the macro block e has an upper left hand coordinate of (m,n). The motion vector received by the motion vector address generator 62 points to this coordinate (m,n). Based on the motion vector, the motion vector address generator 62 instructs the memory 64 as to which macro blocks of the anchor frame to output to the compositer 68. The motion vector address generator 62 also outputs a signal to the compositer 68 indicating the coordinate (m,n).

Macro blocks a, b, c, d and e have the relationship shown below by expression (44).

$$e_{ij} = \begin{cases} a_{i+m,j+n} & 0 \le i \le 7-m; \ 0 \le j \le 7-n \\ b_{i+m,j+n-8} & 0 \le i \le 7-m; \ 8-n \le j \le 7 \\ c_{i+m-8,j+n} & 8-m \le i \le 7; \ 0 \le j \le 7-n \\ d_{i+m-8,j+n-8} & 8-m \le i \le 7; \ 8-n \le j \le 7 \end{cases} \quad (44)$$

For instance, if (m,n=2,3) then $$e_{ij} = \begin{bmatrix} a_{2,3} & a_{2,4} & a_{2,5} & a_{2,6} & a_{2,7} & b_{2,0} & b_{2,1} & b_{2,2} \\ a_{3,3} & a_{3,4} & a_{3,5} & a_{3,6} & a_{3,7} & b_{3,0} & b_{3,1} & b_{3,2} \\ a_{4,3} & a_{4,4} & a_{4,5} & a_{4,6} & a_{4,7} & b_{4,0} & b_{4,1} & b_{4,2} \\ a_{5,3} & a_{5,4} & a_{5,5} & a_{5,6} & a_{5,7} & b_{5,0} & b_{5,1} & b_{5,2} \\ a_{6,3} & a_{6,4} & a_{6,5} & a_{6,6} & a_{6,7} & b_{6,0} & b_{6,1} & b_{6,2} \\ a_{7,3} & a_{7,4} & a_{7,5} & a_{7,6} & a_{7,7} & b_{7,0} & b_{7,1} & b_{7,2} \\ c_{0,3} & c_{0,4} & c_{0,5} & c_{0,6} & c_{0,7} & d_{0,0} & d_{0,1} & d_{0,2} \end{bmatrix}$$

whereas if (m,n)=(6,5) then $$e_{ij} = \begin{bmatrix} a_{6,5} & a_{6,6} & a_{6,7} & b_{6,0} & b_{6,1} & b_{6,2} & b_{6,3} & b_{6,4} \\ a_{7,5} & a_{7,6} & a_{7,7} & b_{7,0} & b_{7,1} & b_{7,2} & b_{7,3} & b_{7,4} \\ c_{0,5} & c_{0,6} & c_{0,7} & d_{0,0} & d_{0,1} & d_{0,2} & d_{0,3} & d_{0,4} \\ c_{1,5} & c_{1,6} & c_{1,7} & d_{1,0} & d_{1,1} & d_{1,2} & d_{1,3} & d_{1,4} \\ c_{2,5} & c_{2,6} & c_{2,7} & d_{2,0} & d_{2,1} & d_{2,2} & d_{2,3} & d_{2,4} \\ c_{3,5} & c_{3,6} & c_{3,7} & d_{3,0} & d_{3,1} & d_{3,2} & d_{3,3} & d_{3,4} \\ c_{4,5} & c_{4,6} & c_{4,7} & d_{4,0} & d_{4,1} & d_{4,2} & d_{4,3} & d_{4,4} \\ c_{5,5} & c_{5,6} & c_{5,7} & d_{5,0} & d_{5,1} & d_{5,2} & d_{5,3} & d_{5,4} \end{bmatrix}$$

Assume that arrays A, B, C, D and E are the corresponding DCT macro blocks of macro blocks a, b, c, d and e, respectively. Accordingly, E and e have the relationship shown in expression (45) below.

$$E_{kl} = \sum_{i=0}^{7} \sum_{j=0}^{7} e_{ij} \cdot \cos\frac{(2i+1)k\pi}{16} \cdot \cos\frac{(2j+1)l\pi}{16} \quad (45)$$

Substituting a, b, c and d in for e in expression (45) based on expression (44) results in expression (46) below.

$$E_{kl} = \sum_{i=0}^{7-m} \sum_{j=0}^{7-n} a_{i+m,j+n} \cdot \cos\frac{(2i+1)k\pi}{16} \cdot \cos\frac{(2j+1)l\pi}{16} + \quad (46)$$

$$\sum_{i=0}^{7-m} \sum_{j=8-n}^{7} b_{i+m,j+n-8} \cdot \cos\frac{(2i+1)k\pi}{16} \cdot \cos\frac{(2j+1)l\pi}{16} +$$

$$\sum_{i=8-m}^{7} \sum_{j=0}^{7-n} c_{i+m-8,j+n} \cdot \cos\frac{(2i+1)k\pi}{16} \cdot \cos\frac{(2i+1)l\pi}{16} +$$

$$\sum_{i=8-m}^{7} \sum_{j=8-n}^{7} d_{i+m-8,j+n-8} \cdot \cos\frac{(2i+1)k\pi}{16} \cdot \cos\frac{(2j+1)l\pi}{16} +$$

$$\sum_{i=0}^{7-m} \sum_{j=0}^{7-n} a_{i+m,j+n} \cdot \cos\frac{(2i+1)k\pi}{16} \cdot \cos\frac{(2j+1)l\pi}{16} +$$

$$\sum_{i=0}^{7-m} \sum_{j=0}^{n-1} b_{i+m,j+n-8} \cdot \cos\frac{(2i+1)k\pi}{16} \cdot \cos\frac{(2(j-n)+17)l\pi}{16} +$$

-continued $$\sum_{i=0}^{m-1}\sum_{j=0}^{7-n} c_{i+m-8,j+n} \cdot \cos\frac{(2(i-m)+17)k\pi}{16} \cdot \cos\frac{(2i+1)l\pi}{16} +$$

$$\sum_{i=0}^{m-1}\sum_{j=0}^{n-1} d_{i,j} \cdot \cos\frac{(2(i-m)+17)k\pi}{16} \cdot \frac{(2(j-n)+17)l\pi}{16}$$

Representing a, b, c and d with the corresponding DCT coefficients A, B, C and D, respectively, using expression (45) and substituting A, B, C, or D for E and a, b, c, or d for e results in expression (47) below.

$$E_{kl} = \sum_{i=0}^{7-m}\sum_{j=0}^{7-n} \cos\frac{(2i+1)k\pi}{16} \cdot \cos\frac{(2j+1)l\pi}{16} \cdot \tag{47}$$

$$\sum_{p=0}^{7}\sum_{q=0}^{7} A_{pq}\cos\frac{(2i+2m+1)p\pi}{16} \cdot \cos\frac{(2j+2n+1)q\pi}{16} +$$

$$\sum_{i=0}^{7-m}\sum_{j=0}^{n-1}\cos\frac{(2i+1)k\pi}{16} \cdot \cos\frac{(2j-2n+17)l\pi}{16} \cdot$$

$$\sum_{p=0}^{7}\sum_{q=0}^{7} B_{pq}\cos\frac{(2i+2m+1)p\pi}{16} \cdot \cos\frac{(2j+1)q\pi}{16} +$$

$$\sum_{i=0}^{m-1}\sum_{j=0}^{7-n}\cos\frac{(2(i-m+17)k\pi}{16} \cdot \cos\frac{(2i+1)l\pi}{16} \cdot$$

$$\sum_{p=0}^{7}\sum_{q=0}^{7} C_{pq}\cos\frac{(2i+1)p\pi}{16} \cdot \cos\frac{(2j+2n+17)q\pi}{16} +$$

$$\sum_{i=0}^{m-1}\sum_{j=0}^{n-1}\cos\frac{(2(i-m)+17)k\pi}{16} \cdot \cos\frac{(2(j-n)+17)l\pi}{16} \cdot$$

$$\sum_{p=0}^{7}\sum_{q=0}^{7} D_{pq}\cos\frac{(2i+1)p\pi}{16} \cdot \cos\frac{(2j+1)q\pi}{16}$$

Changing the summing order and rewriting expression (47) results in expression (48) below.

$$E_{kl} = \tag{48}$$

$$\sum_{p=0}^{7}\sum_{q=0}^{7} A_{pq}\sum_{i=0}^{7-m}\sum_{j=0}^{7-n}\cos\frac{(2i+2m+1)p\pi}{16} \cdot \cos\frac{(2j+2n+1)q\pi}{16}\cos$$

$$\frac{(2i+1)k\pi}{16}\cos\frac{(2j+1)l\pi}{16} +$$

$$\sum_{p=0}^{7}\sum_{q=0}^{7} B_{pq}\sum_{i=0}^{7-m}\sum_{j=0}^{n-1}\cos\frac{(2i+2m+1)p\pi}{16} \cdot \cos\frac{(2j+1)q\pi}{16}$$

$$\cos\frac{(2i+1)k\pi}{16}\cos\frac{(2(j-n)+17)l\pi}{16} +$$

$$\sum_{p=0}^{7}\sum_{q=0}^{7} C_{pq}\sum_{i=0}^{m-1}\sum_{j=0}^{7-n}\cos\frac{(2i+1)p\pi}{16}\cos\frac{(2j+2n+1)q\pi}{16} \cdot \cos$$

$$\frac{(2(i-m)+17)k\pi}{16}\cos\frac{(2i+1)l\pi}{16} +$$

$$\sum_{p=0}^{7}\sum_{q=0}^{7} D_{pq}\sum_{i=0}^{m-1}\sum_{j=0}^{n-1}\cos\frac{(2i+1)p\pi}{16}\cos\frac{(2j+1)q\pi}{16} \cdot \cos$$

$$\frac{(2(i-m)+17)k\pi}{16}\cos\frac{(2(j-n)+17)l\pi}{16}$$

Expression (48) can be simplified to expression (49) below.

$$E_{kl} = \sum_{p=0}^{7}\sum_{q=0}^{7} (A_{pq} \cdot M_A + B_{pq} \cdot M_B + C_{pq} \cdot M_C + D_{pq} \cdot M_D) \tag{49}$$

where $M_A$, $M_B$, $M_C$ and $M_D$ are the matrices which are independent of the DCT coefficients and only depend on the values of p, q, k, l, m and n. Therefore, matrices $M_A$, $M_B$, $M_C$ and $M_D$ can be precalculated according to the following expressions for $0 \leq p, q, k, l <= 7$:

$$M_A = \sum_{i=0}^{7-m}\sum_{j=0}^{7-n}\cos\frac{(2i+2m+1)p\pi}{16}\cos \tag{50a}$$

$$\frac{(2j+2n+1)q\pi}{16} \cdot \cos\frac{(2i+1)k\pi}{16}\cos\frac{(2j+1)l\pi}{16}$$

$$M_B = \sum_{i=0}^{7-m}\sum_{j=0}^{n-1}\cos\frac{(2i+2m+1)p\pi}{16}\cos \tag{50b}$$

$$\frac{(2j+1)q\pi}{16} \cdot \cos\frac{(2i+1)k\pi}{16}\cos\frac{(2j-2n+17)l\pi}{16}$$

$$M_C = \sum_{i=0}^{7-m}\sum_{j=0}^{n-1}\cos\frac{(2i+1)p\pi}{16}\cos \tag{50c}$$

$$\frac{(2j+2n+1)q\pi}{16} \cdot \cos\frac{(2i+2m+17)k\pi}{16}\cos\frac{(2j+1)l\pi}{16}, \text{ and}$$

$$M_D = \sum_{i=0}^{7-m}\sum_{j=0}^{n-1}\cos\frac{(2i+1)p\pi}{16}\cos \tag{50d}$$

$$\frac{(2j+1)q\pi}{16} \cdot \cos\frac{(2i+2m+17)k\pi}{16}\cos\frac{(2j-2n+17)l\pi}{16}$$

Accordingly, using expressions (49) and (50a)–(50d), the DCT coefficients for the composite macro block E can be determined. As one skilled in the art will readily appreciate from the above disclosure, the expressions above provide a composite macro block for full pixel accuracy. In other words, the coordinate (m,n) is the coordinate for a pixel in the composite macro block e. The coordinate (m,n) does not, however, always fall on a pixel in a macro block of an anchor frame. Instead, this coordinate could fall between two pixels in the horizontal direction, between two pixels in the vertical direction, or between two pixels in the diagonal direction.

Frame-Motion Compensation—Half-Pel Accuracy
Horizontal Half-Pel Accuracy

If coordinate (m,n) falls between two pixels in the horizontal direction, then motion compensation must be performed with half-pel (i.e., half pixel) accuracy in the horizontal direction.

Expression (51) below illustrates the relationship between the composite macro block e and the macro blocks a–d in the anchor frame in the spatial domain.

$$e_{ij} = \begin{cases} \frac{1}{2}(a_{i+m,j+n} + a_{i+m,j+n+1}) & 0 \le i \le 7-m; 0 \le j \le 6-n \\ \frac{1}{2}(b_{i+m,j+n-8} + b_{i+m,j+n-7}) & 0 \le i \le 7-m; 8-n \le j \le 7 \\ \frac{1}{2}(c_{i+m-8,j+n} + c_{i+m-8,j+n+1}) & 8-m \le i \le 7; 0 \le j \le 6-n \\ \frac{1}{2}(d_{i+m-8,j+n-8} + d_{i+m-8,j+n-7}) & 8-m \le i \le 7; 8-n \le j \le 7 \\ \frac{1}{2}(a_{i+m,7} + b_{i+m,0}) & 0 \le i \le 7-m; j = 7-n \\ \frac{1}{2}(c_{i+m-8,7} + d_{i+m,-8,0}) & 8-m \le i \le 7 \end{cases} \quad (51)$$

Expressions (52a)–(52d) below are derived in the same manner as expressions (50a)–(50d) above using expression (51).

$$M_A = \left[\sum_{i=0}^{7-m}\sum_{j=0}^{6-n} \overline{Y}\cos\frac{(2i+1)k\pi}{16}\cos\frac{(2j+1)l\pi}{16} + \sum_{i=0}^{7-m}\frac{1}{2}\cos \right. \quad (52a)$$
$$\left. \frac{(2i+2m+1)p\pi}{16}\cos\frac{15q\pi}{16}\cdot\cos\frac{(2i+1)k\pi}{16}\cos\frac{(15-2n)l\pi}{16}\right]$$

$$M_B = \left[\sum_{i=0}^{7-m}\sum_{j=-n}^{-1} \overline{Y}\cos\frac{(2i+1)k\pi}{16}\cos\frac{(2j+17)l\pi}{16} + \right. \quad (52b)$$
$$\left. \sum_{i=0}^{7-m}\frac{1}{2}\cos\frac{(2i+2m+1)p\pi}{16}\cos\frac{q\pi}{16}\cdot\cos\frac{(2i+1)k\pi}{16}\cos\frac{(15-2n)l\pi}{16}\right]$$

$$M_C = \left[\sum_{i=-m}^{-1}\sum_{j=0}^{6-n} \overline{Y}\cos\frac{(2i+17)k\pi}{16}\cos\frac{(2j+1)l\pi}{16} + \sum_{i=-m}^{-1}\frac{1}{2}\cos \right. \quad (52c)$$
$$\left. \frac{(2i+2m+1)p\pi}{16}\cos\frac{15q\pi}{16}\cdot\cos\frac{(2i+17)k\pi}{16}\cos\frac{(15-2n)l\pi}{16}\right]$$

$$M_D = \left[\sum_{i=-m}^{-1}\sum_{j=-n}^{-1} \overline{Y}\cos\frac{(2i+17)k\pi}{16}\cos\frac{(2j+17)l\pi}{16} + \sum_{i=-m}^{-1}\frac{1}{2}\cos \right. \quad (52d)$$
$$\left. \frac{(2i+2m+1)p\pi}{16}\cos\frac{q\pi}{16}\cdot\cos\frac{(2i+17)k\pi}{16}\cos\frac{(15-2n)l\pi}{16}\right]$$

where $\overline{Y}$ represents expression (53) below $$\overline{Y} = \cos\frac{(2i+2m+1)p\pi}{16}\cos\frac{q\pi}{16}\cos\frac{(j+n+1)}{8}q\pi \quad (53)$$

Using expressions (49) and (52a)–(52d), the composite macro block E can be derived with horizontal half-pel accuracy.

Vertical Half-Pel Accuracy

If coordinate (m,n) falls between two pixels in the vertical direction, then motion compensation must be performed with half-pel (i.e., half pixel) accuracy in the vertical direction. Equation (54) below illustrates the relationship between the composite macro block e and the macro blocks a–d of the anchor frame in the spatial domain.

$$e_{ij} = \begin{cases} \frac{1}{2}(a_{i+m,j+n} + a_{i+m+1,j+n}) & 0 \le i \le 6-m; 0 \le j \le 7-n \\ \frac{1}{2}(b_{i+m,j+n-8} + b_{i+m+1,j+n-8}) & 0 \le i \le 6-m; 8-n \le j \le 7 \\ \frac{1}{2}(c_{i+m-8,j+n} + c_{i+m-7,j+n}) & 8-m \le i \le 7; 0 \le j \le 7-n \\ \frac{1}{2}(d_{i+m-8,j+n-8} + d_{i+m-7,j+n-8}) & 8-m \le i \le 7; 8-n \le j \le 7 \\ \frac{1}{2}(a_{i+m,j+n} + c_{i+m-7,j+n}) & 0 \le i \le 7-n; j = 7-m \\ \frac{1}{2}(b_{i+m,j+n-8} + d_{i+m-7,j+n-8}) & 8-n \le j \le 7 \end{cases} \quad (54)$$

Expressions (55a)–(55d) below are derived in the same manner as expressions (50a)–(50d) using expression $$M_A = \left[\sum_{i=0}^{6-m}\sum_{j=0}^{7-n} \overline{X}\cos\frac{(2i+1)k\pi}{16}\cos\frac{(2j+1)l\pi}{16} + \sum_{j=0}^{7-n}\frac{1}{2}\cos\frac{15p\pi}{16} \right. \quad (55a)$$
$$\left. \cos\frac{(2j+2n+1)q\pi}{16}\cos\frac{(15-2m)k\pi}{16}\cos\frac{(2j+1)l\pi}{16}\right]$$

$$M_B = \left[\sum_{i=0}^{6-m}\sum_{j=-n}^{-1} \overline{X}\cos\frac{(2i+1)k\pi}{16}\cos\frac{(2j+17)l\pi}{16} + \sum_{j=-n}^{-1}\frac{1}{2}\cos\frac{15p\pi}{16} \right. \quad (55b)$$
$$\left. \cos\frac{(2j+2n+1)q\pi}{16}\cos\frac{(15-2m)k\pi}{16}\cos\frac{(2j+17)l\pi}{16}\right]$$

$$M_C = \left[\sum_{i=-m}^{-1}\sum_{j=0}^{7-n} \overline{X}\cos\frac{(2i+17)k\pi}{16}\cos\frac{(2j+1)l\pi}{16} + \sum_{j=0}^{7-n}\frac{1}{2}\cos\frac{p\pi}{16} \right. \quad (55c)$$
$$\left. \cos\frac{(2j+2n+1)q\pi}{16}\cos\frac{(15-2m)k\pi}{16}\cos\frac{(2j+1)l\pi}{16}\right]$$

$$M_D = \left[\sum_{i=-m}^{-1}\sum_{j=-n}^{-1} \overline{X}\cos\frac{(2i+17)k\pi}{16}\cos\frac{(2j+17)l\pi}{16} + \right. \quad (55d)$$
$$\left. \sum_{j=-n}^{-1}\frac{1}{2}\cos\frac{p\pi}{16}\cos\frac{(2j+2n+1)q\pi}{16}\cos\frac{(15-2m)k\pi}{16}\cos\frac{(2j+17)l\pi}{16}\right]$$

where $\overline{X}$ represents expression (56) below.

$$\overline{X} = 2\cos\frac{(2j+2n+1)q\pi}{16}\cos\frac{(7+m+1)p\pi}{8}\cos\frac{p\pi}{16} \quad (56)$$

Using expressions (49) and (55a)–(55d), the composite macro block E can be derived with vertical half-pel accuracy.

Diagonal Half-Pel Accuracy

If coordinate (m,n) falls between two pixels in the diagonal direction, then motion compensation must be performed with half-pel accuracy in the diagonal direction. Expression (57) below illustrates the relationship between the composite macro block e and the macro blocks a–d of the anchor frame in the spatial domain.

$$e_{ij} = \begin{cases} \frac{1}{4}(a_{i+m,j+n} + a_{i+m,j+n+1} + & 0 \le i \le 6-n; \\ \quad a_{i+m+1,j+n} + a_{i+m+1,j+n+1}) & 0 \le i \le 6-n \\ \frac{1}{4}(b_{i+m,j+n-8} + b_{i+m,j+n-7} + & 0 \le i \le 6-m; \\ \quad b_{i+m+1,j+n-8} + b_{i+m+1,j+n-7}) & 8 \le n \le j \le 7 \\ \frac{1}{4}(c_{i+m-8,j+n} + c_{i+m-8,j+n+1} + & 8 \le m \le i \le 7; \\ \quad c_{i+m-7,j+n} + c_{i+m-7,j+n+1}) & 0 \le j \le 6-n \\ \frac{1}{4}(d_{i+m-8,j+n-8} + d_{i+m-8,j+n-7} + & 8-m \le i \le 7; \\ \quad d_{i+m-7,j+n-8} + d_{i+m-7,j+n-7}) & 8-n \le i \le 7 \\ \frac{1}{4}(a_{7,j+n} + a_{7,j+n+1} + & i = 7-m; \\ \quad c_{0,j+n} + c_{0,j+n+1}) & 0 \le i \le 6-n \\ \frac{1}{4}(b_{7,j+n-8} + b_{1,j+n-7} + & i = 7-m; \\ \quad d_{0,j+n-8} + d_{0,j+n-7}) & 8-n \le j \le 7 \\ \frac{1}{4}(a_{i+m,7} + a_{i+m+1,7} + & 0 \le i \le 6-m; \\ \quad b_{i+m,0} + b_{i+m+1,0}) & j = 7-n \\ \frac{1}{4}(c_{i+m-8,7} + c_{i+m-7,7} + & 8-m \le i \le 7; \\ \quad d_{i+m-8,0} + d_{i+m-7,0}) & j = 7-n \\ \frac{1}{4}(a_{7,7} + b_{7,0} + c_{0,7} + d_{0,0}) & i = 7-m; \\ & j = 7-n \end{cases} \quad (57)$$

Expressions (58a)–(58d) below are derived in the same manner as expressions (50a)–(50d) using expression (57).

$$M_A = \left[\sum_{i=0}^{6-m}\sum_{j=0}^{6-n}\cos\frac{p\pi}{16}\cos\frac{q\pi}{16}\cos\frac{(i+m+1)p\pi}{8}\cos\frac{(j+n+1)p\pi}{8}\cdot\cos\frac{(2i+1)k\pi}{16}\cos\frac{(2j+1)l\pi}{16} + \right. \quad (58a)$$
$$\frac{1}{2}\sum_{j=0}^{6-n}\cos\frac{15p\pi}{16}\cos\frac{(j+n+1)q\pi}{8}\cos\frac{q\pi}{16}\cos\frac{(15-2m)k\pi}{16}\cos\frac{(2j+1)l\pi}{16} +$$
$$\left.\frac{1}{2}\sum_{i=0}^{6-m}\cos\frac{15q\pi}{16}\cos\frac{(j+m+1)p\pi}{8}\cos\frac{p\pi}{16}\cos\frac{(15-2n)l\pi}{16}\cos\frac{(2i+1)k\pi}{16} + \frac{1}{4}\cos\frac{15p\pi}{16}\cos\frac{15q\pi}{16}\cos\frac{(15-2m)k\pi}{16}\cos\frac{(15-2n)l\pi}{16}\right]$$

$$M_B = \left[\sum_{i=0}^{6-m}\sum_{j=-n}^{-1}\cos\frac{p\pi}{16}\cos\frac{q\pi}{16}\cos\frac{(i+m-1)p\pi}{8}\cos\frac{(j+n+1)q\pi}{8}\cdot\cos\frac{(2j+1)k\pi}{16}\cos\frac{(2j+17)l\pi}{16} + \right. \quad (58b)$$
$$\frac{1}{2}\sum_{j=-n}^{-1}\cos\frac{15p\pi}{16}\cos\frac{(j+n+1)q\pi}{8}\cos\frac{q\pi}{16}\cos\frac{(15-2m)k\pi}{16}\cos\frac{(2j+17)l\pi}{16} +$$
$$\left.\frac{1}{2}\sum_{i=0}^{6-m}\cos\frac{q\pi}{16}\cos\frac{(j+m+1)p\pi}{8}\cos\frac{p\pi}{16}\cos\frac{(2i+1)k\pi}{16}\cos\frac{(15+2n)l\pi}{16} + \frac{1}{4}\cos\frac{15p\pi}{16}\cos\frac{q\pi}{16}\cos\frac{(15-2m)k\pi}{16}\cos\frac{(15-2n)l\pi}{16}\right]$$

$$M_C = \left[\sum_{i=-m}^{-i}\sum_{j=0}^{6-n}\cos\frac{p\pi}{16}\cos\frac{q\pi}{16}\cos\frac{(i+m+1)p\pi}{8}\cos\frac{(j+n+1)q\pi}{8}\cdot\cos\frac{(2i+17)k\pi}{16}\cos\frac{(2j+1)l\pi}{16} + \right. \quad (58c)$$
$$\frac{1}{2}\sum_{j=0}^{6-n}\cos\frac{p\pi}{16}\cos\frac{(j+n+1)q\pi}{8}\cos\frac{q\pi}{16}\cos\frac{(15-2m)k\pi}{16}\cos\frac{(2j+1)l\pi}{16} +$$
$$\left.\frac{1}{2}\sum_{i=-m}^{-i}\cos\frac{15q\pi}{16}\cos\frac{(i+m+1)p\pi}{8}\cos\frac{P\pi}{16}\cos\frac{(2i+17)k\pi}{16}\cos\frac{(15-2n)l\pi}{16} + \frac{1}{4}\cos\frac{p\pi}{16}\cos\frac{15q\pi}{16}\cos\frac{(15-2m)k\pi}{16}\cos\frac{(15-2n)l\pi}{16}\right]$$

-continued $$M_D = \left[\sum_{i=-m}^{-i}\sum_{j=-n}^{-i}\cos\frac{p\pi}{16}\cos\frac{q\pi}{16}\cos\frac{(i+m+1)p\pi}{8}\cos\frac{(j+n+1)q\pi}{8}\cdot\cos\frac{(2i+17)k\pi}{16}\cos\frac{(2j+17)l\pi}{16} + \right.$$
$$\frac{1}{2}\sum_{i=-n}^{-i}\cos\frac{p\pi}{16}\cos\frac{(j+n+1)q\pi}{8}\cos\frac{q\pi}{16}\cos\frac{(15-2m)k\pi}{16}\cos\frac{(2j+17)l\pi}{16} +$$
$$\left.\frac{1}{2}\sum_{i=-m}^{-i}\cos\frac{q\pi}{16}\cos\frac{(i+m+1)p\pi}{8}\cos\frac{p\pi}{16}\cos\frac{(2i+17)k\pi}{16}\cos\frac{(15-2n)l\pi}{16} + \frac{1}{4}\cos\frac{p\pi}{16}\cos\frac{q\pi}{16}\cos\frac{(15-2m)k\pi}{16}\cos\frac{(15-2n)l\pi}{16}\right]$$
(58d)

Using expressions (49) and (58a)–(58d), the composite macro block E can be derived with diagonal half-pel accuracy.

The composiater 68 uses expressions (49)–(58d) to form composite macro blocks in the DCT domain when the inter-coded pictures have been encoded on a frame-by-frame basis. Accordingly, when the adder 74 adds the composite macro blocks to the macro blocks of P and B-pictures output from the variable length decoder and dequantizer 58, frame-motion compensation is performed.

Field-Motion Compensation

The HDTV signal can, however, also include fields. The even and odd fields of a frame may be inter-coded independently based on the even and odd fields of a previous frame. Namely, the even field may be inter-coded based on either the even or odd field of the previous frame regardless of whether the odd field was inter-coded based on the even or odd field of the previous frame. As discussed above, decoding inter-coded fields is referred to as field-motion compensation.

To perform field-motion compensation, the motion vector address generator 62 receives the odd field motion vector and the even field motion vector from the variable length decoder and dequantizer 58. The odd field motion vector points to a first coordinate (m,n) of a composite odd field macro block e, while the even field motion vector points to a second coordinate (m',n') of a composite even field macro block e'. Based on the first and second motion vectors, the motion vector address generator 62 instructs the memory 64 as to which of the anchor frame macro blocks to output to the compositer 68.

For purposes of discussion, assume that the motion vector address generator instructs the memory 64 to output anchor frame macro blocks A–D with respect to the odd field motion vector and output anchor frame macro blocks A'–D' with respect to the even field motion vector. The motion vector address generator 62 also outputs a signal to the compositer 68 indicating the coordinates (m,n) and (m',n'). Additionally, the signal output by the motion vector address generator 62 to the compositer 68 indicates whether frame or field motion compensation is to be performed. If field-motion compensation is to be performed, the compositer 68 then forms a frame composite macro block according to expressions (59)–(94) discussed below.

Because of the operation of the field-to-frame converter 69, the adder 74 receives macro blocks of a frame even when the HDTV signal includes fields. Therefore, the compositer 68 has to output frame composite macro blocks. Also, the macro blocks received from the memory 64 via the variable length decoder and dequantizer 67 are frame macro blocks. Accordingly, when performing field-motion compensation, the compositer 68 (1) separates the anchor frame macro blocks into even and odd fields, (2) forms respective even and odd field composite macro blocks, and (3) interlaces the even and odd field composite macro blocks to form a frame composite macro block. Operations (1), (2), and (3) are simultaneously performed by the compositer 68 according to expressions (59)–(94) discussed below.

Full-Pel Accuracy

With field-motion compensation, four possible encoding schemes exist:

| | |
|---|---|
| o → o | (1) |
| o → e | |
| e → o | (2) |
| e → e | |
| o → o | (3) |
| e → e | |
| o → e | (4) |
| e → o | | where o→e means that the current even field was encoded based on the previous odd field. In other words, "o" stands for odd field and "e" stands for even field.

Case (1) o→o and e→e

Expression (59) below represents the relationship between the frame composite macro block e and the macro blocks a–d and a'–d' of the anchor frame in the spatial domain when the even and odd fields are encoded based on the odd field of the anchor frame.

$$e_{i,j} = \begin{cases} a_{i+m,j+n} & 0 \le i \le 6-m & 0 \le j \le 7-n \\ b_{i+m,j+n-8} & 0 \le i \le 6-m & 8-n \le j \le 7 \\ c_{i+m-8,j+n} & 8-m \le i \le 6 & 0 \le j \le 7-n \\ d_{i+m-8,j+n-8} & 8-m \le i \le 6 & 8-n \le j \le 7 \\ a'_{i+m'-1,j+n'} & 1, 3 \le i \le 7-m' & 0 \le j \le 7-n' \\ b'_{i+m'-1,j+n'-8'} & 1, 3 \le i \le 7-m' & 8-n' \le j \le 7 \\ c'_{i+m'-9',j+n'} & 9-m' \le i \le 7 & 0 \le j \le 7-n' \\ d'_{i+m'-9',j+n'-8'} & 9-m' \le i \le 7 & 8-n' \le j \le 7 \end{cases}$$
(59)

where m = 0, 2, 4, 6 and m' = 0, 2, 4, 6

The top half of expression (59) represents the o→o portion of the frame composite macro block e, while the bottom portion of expression (59) represents the o→e portion of the frame composite macro block e.

Using expression (59), expression (60) below is derived in the same manner as expression (47).

$$E_{kl} = \sum_{i=0}^{7}\sum_{j=0}^{7} e_{ij}\cos\frac{(2i+1)k\pi}{16}\cos\frac{(2j+1)l\pi}{16} \qquad (60)$$

$$E_{kl} = \sum_{p=0}^{7}\sum_{q=0}^{7} A_{pq}\sum_{i=0,2}^{6-m}\sum_{j=0}^{7-n}\cos\frac{(2i+2m+1)p\pi}{16}\cos\frac{(2j+2n+1)q\pi}{16}\cdot F +$$

$$\sum_{p=0}^{7}\sum_{q=0}^{7} B_{pq}\sum_{i=0,2}^{6-m}\sum_{j=8-n}^{7}\cos\frac{(2i+2m+1)p\pi}{16}\cos\frac{(2j+2n-15)q\pi}{16}\cdot F +$$

$$\sum_{p=0}^{7}\sum_{q=0}^{7} C_{pq}\sum_{i=8-m}^{6}\sum_{j=0}^{7-n}\cos\frac{(2i+2m-15)p\pi}{16}\cos\frac{(2j+2n+1)q\pi}{16}\cdot F +$$

$$\sum_{p=0}^{7}\sum_{q=0}^{7} D_{pq}\sum_{i=8-m}^{6}\sum_{j=8-n}^{7}\cos\frac{(2i+2m-15)p\pi}{16}\cos\frac{(2j+2n-15)p\pi}{16}\cdot F +$$

$$\sum_{p=0}^{7}\sum_{q=0}^{7} A'_{pq}\sum_{i=1,3}^{7-m'}\sum_{j=0}^{7-n'}\cos\frac{(2i+2m'-1)p\pi}{16}\cos\frac{(2j+2n'+1)q\pi}{16}\cdot F +$$

$$\sum_{p=0}^{7}\sum_{q=0}^{7} B'_{pq}\sum_{i=1,3}^{7-m'}\sum_{j=8-n}^{7}\cos\frac{(2i+2m'-1)p\pi}{16}\cos\frac{(2j+2n'-15)q\pi}{16}\cdot F +$$

$$\sum_{p=0}^{7}\sum_{q=0}^{7} C'_{pq}\sum_{i=9-m}^{7}\sum_{j=0}^{7-n'}\cos\frac{(2i+2m'-17)p\pi}{16}\cos\frac{(2j+2n'+1)q\pi}{16}\cdot F +$$

$$\sum_{p=0}^{7}\sum_{q=0}^{7} D'_{pq}\sum_{i=9-m}^{7}\sum_{j=8-n'}^{7}\cos\frac{(2i+2m'-17)p\pi}{16}\cos\frac{(2j+2n'-15)q\pi}{16}\cdot F$$

where $$F = \cos\frac{(2i+1)k\pi}{16}\cos\frac{(2j+1)l\pi}{16} \qquad (61)$$

The quadruple summations including the terms $A_{pq}$, $B_{pq}$, $C_{pq}$, and $D_{pq}$ in equation (60) represent the o→o portion of the frame composite macro block E, while the quadruple summations including the terms $A'_{pq}$, $B'_{pq}$, $C'_{pq}$, and $D'_{pq}$ represent the o→e portion of the frame composite macro block E.

Using expression (60), the motion compensated frame macro block E can be derived for full-pel accuracy when the even and odd fields are encoded based on the odd field of the anchor frame.

As expressions (59) and (60) show, the frame composite macro block e can be represented in the spatial domain such that the frame composite macro block E can be derived without having to separately perform the following operations: (1) separate the frame anchor macro blocks into even and odd fields, (2) form respective even and odd field composite macro blocks, and (3) interlace the even and odd field composite macro blocks to form a frame composite macro block.

Case (2) e→o and e→e

Expression (62) below represents the relationship between frame composite macro block e and the macro blocks a–d and a'–d' in the spatial domain when the even and odd fields are encoded based on the even field of the anchor frame.

$$e_{i,j} = \begin{cases} a_{i+m,j+n} & 0,2 \le i \le 7-m & 0 \le j \le 7-n \\ b_{i+m,j+n-8} & 0,2 \le i \le 7-m & 8-n \le j \le 7 \\ c_{i+m-8,j+n} & 9-m \le i \le 6 & 0 \le j \le 7-n \\ d_{i+m-8,j+n-8} & 9-m \le i \le 6 & 8-n \le j \le 7 \\ a'_{i+m'-1,j+n'} & 1,3 \le i \le 8-m' & 0 \le j \le 7-n' \\ b'_{i+m'-1,j+n'-8} & 1,3 \le i \le 8-m' & 8-n' \le j \le 7 \\ c'_{i+m'-9,j+n'} & 10-m' \le i \le 7 & 0 \le j \le 7-n' \\ d'_{i+m'-9,j+n'-8} & 9-m' \le i \le 7 & 8-n' \le j \le 7 \end{cases} \qquad (62)$$

where $m = 1, 3, 5, 7$ and $m' = 1, 3, 5, 7$

The top half of expression (62) represents the e→o portion of the frame composite macro block e, while the bottom portion of expression (62) represents the e→e portion of the frame composite macro block e.

Using expression (62), expression (63) below is derived in the same manner as expression (47).

$$E_{kl} = \sum_{p=0}^{7}\sum_{q=0}^{7} A_{pq}\sum_{i=0,2}^{7-m}\sum_{j=0}^{7-n}\cos\frac{(2i+2m+1)p\pi}{16}\cos\frac{(2j+2n+1)q\pi}{16}\cdot F + \sum_{p=0}^{7}\sum_{q=0}^{7} B_{pq}\sum_{i=0,2}^{7-m}\sum_{j=8-n}^{7}\cos\frac{(2i+2m+1)p\pi}{16}\cos\frac{(2j+2n-15)q\pi}{16}\cdot F + \qquad (63)$$

$$\sum_{p=0}^{7}\sum_{q=0}^{7} C_{pq}\sum_{i=9-m}^{6}\sum_{j=0}^{7-n}\cos\frac{(2i+2m-15)p\pi}{16}\cos\frac{(2j+2n+1)q\pi}{16}\cdot F + \sum_{p=0}^{7}\sum_{q=0}^{7} D_{pq}\sum_{i=9-m}^{6}\sum_{j=8-n}^{7}\cos\frac{(2i+2m-15)p\pi}{16}\cos\frac{(2j+2n-15)p\pi}{16}\cdot F +$$

-continued $$\sum_{p=0}^{7}\sum_{q=0}^{7}A'_{pq}\sum_{i=1,3}^{8-m'}\sum_{j=0}^{7-n'}\cos\frac{(2i+2m'-1)p\pi}{16}\cos\frac{(2j+2n'+1)q\pi}{16}\cdot F+\sum_{p=0}^{7}\sum_{q=0}^{7}B'_{pq}\sum_{i=1,3}^{8-m'}\sum_{j=8-n'}^{7}\cos\frac{(2i+2m'-1)p\pi}{16}\cos\frac{(2j+2n'-15)q\pi}{16}+$$

$$\sum_{p=0}^{7}\sum_{q=0}^{7}C'_{pq}\sum_{i=10-m'}^{7}\sum_{j=0}^{7-n'}\cos\frac{(2i+2m'-17)p\pi}{16}\cos\frac{(2j+2n'+1)q\pi}{16}+\sum_{p=0}^{7}\sum_{q=0}^{7}D'_{pq}\sum_{i=10-m'}^{7}\sum_{j=8-n'}^{7}\cos\frac{(2i+2m-17)p\pi}{16}\cos\frac{(2j+2n'-15)q}{16}$$

The summation terms including $A_{pq}$, $B_{pq}$, $C_{pq}$, and $D_{pq}$ in expression (63) represent the e→o portion of the frame composite macro block E, while the summation terms including $A'_{pq}$, $B'_{pq}$, $C'_{pq}$, and $D'_{pq}$ in expression (63) represent the e→e portion of the frame composite macro block E.

Using expression (63), the motion compensated frame macro block E can be derived for full-pel accuracy when the even and odd fields are encoded based on the even field of the anchor frame.

Case (3) o→o and e→e

Expression (64) below represents the relationship between frame composite macro block e and the macro blocks a–d and a'–d' in the spatial domain when the odd and even fields are encoded based on the odd and even fields, respectively, of the anchor frame.

$$e_{i,j}=\begin{cases}a_{i+m,j+n} & 0\le i\le 6-m & 0\le j\le 7-n\\ b_{i+m,j+n-8} & 0\le i\le 6-m & 8-n\le j\le 7\\ c_{i+m-8,j+n} & 8-m\le i\le 6 & 0\le j\le 7-n\\ d_{i+m-8,j+n-8} & 8-m\le i\le 6 & 8-n\le j\le 7\\ a'_{i+m'-1,j+n'} & 1,3\le i\le 8-m' & 0\le j\le 7-n'\\ b'_{i+m'-1,j+n'-8} & 1,3\le i\le 8-m' & 8-n'\le j\le 7\\ c'_{i+m'-9,j+n'} & 10-m'\le i\le 7 & 0\le j\le 7-n'\\ d'_{i+m'-9,j+n'-8} & 9-m'\le i\le 7 & 8-n'\le j\le 7\end{cases}\quad(64)$$

where $m=0, 2, 4, 6$ and $m'=1, 3, 5, 7$

The top half of expression (64) represents the o→o portion of the frame composite macro block e, while the bottom portion of expression (64) represents the e→e portion of the frame composite macro block e.

Using expression (64), expression (65) below is derived in the same manner as expression (47).

$$E_{kl}=\sum_{p=0}^{7}\sum_{q=0}^{7}A_{pq}\sum_{i=0,2}^{6-m}\sum_{j=0}^{7-n}\cos\frac{(2i+2m+1)p\pi}{16}\cos\frac{(2j+2n+1)q\pi}{16}\cdot F+\sum_{p=0}^{7}\sum_{q=0}^{7}B_{pq}\sum_{i=0,2}^{6-m}\sum_{j=8-n}^{7}\cos\frac{(2i+2m+1)p\pi}{16}\cos\frac{(2j+2n-15)q\pi}{16}\cdot F+\quad(65)$$

$$\sum_{p=0}^{7}\sum_{q=0}^{7}C_{pq}\sum_{i=8-m}^{6}\sum_{j=0}^{7-n}\cos\frac{(2i+2m-15)p\pi}{16}\cos\frac{(2j+2n+1)q\pi}{16}\cdot F+\sum_{p=0}^{7}\sum_{q=0}^{7}D_{pq}\sum_{i=8-m}^{6}\sum_{j=8-n}^{7}\cos\frac{(2i+2m-15)p\pi}{16}\cos\frac{(2j+2n-15)p\pi}{16}\cdot F+$$

$$\sum_{p=0}^{7}\sum_{q=0}^{7}A'_{pq}\sum_{i=1,3}^{8-m'}\sum_{j=0}^{7-n'}\cos\frac{(2i+2m'-1)p\pi}{16}\cos\frac{(2j+2n'+1)q\pi}{16}\cdot F+\sum_{p=0}^{7}\sum_{q=0}^{7}B'_{pq}\sum_{i=1,3}^{8-m'}\sum_{j=8-n'}^{7}\cos\frac{(2i+2m'-1)p\pi}{16}\cos\frac{(2j+2n'-15)q\pi}{16}+$$

$$\sum_{p=0}^{7}\sum_{q=0}^{7}C'_{pq}\sum_{i=10-m'}^{7}\sum_{j=0}^{7-n'}\cos\frac{(2i+2m'-17)p\pi}{16}\cos\frac{(2j+2n'+1)q\pi}{16}+\sum_{p=0}^{7}\sum_{q=0}^{7}D'_{pq}\sum_{i=10-m'}^{7}\sum_{j=8-n'}^{7}\cos\frac{(2i+2m-17)p\pi}{16}\cos\frac{(2j+2n'-15)q}{16}$$

The summation terms including $A_{pq}$, $B_{pq}$, $C_{pq}$, and $D_{pq}$ in expression (65) represent the o→o portion of the frame composite macro block E, while the summation terms including $A'_{pq}$, $B'_{pq}$, $C'_{pq}$, and $D'_{pq}$ in expression (65) represent the e→e portion of the frame composite macro block E.

Using expression (65), the motion compensated frame macro block E can be derived for full-pel accuracy when the odd and even fields are encoded based on the odd and even fields, respectively, of the anchor frame.

Case (4) e→o and o→e

Expression (66) below represents the relationship between frame composite macro block e and the macro blocks a–d and a'–d' in the spatial domain when the odd and even fields are encoded based on the even and odd fields, respectively, of the anchor frame.

$$e_{i,j}=\begin{cases}a_{i+m,j+n} & 0,2\le i\le 7-m & 0\le j\le 7-n\\ b_{i+m,j+n-8} & 0,2\le i\le 7-m & 8-n\le j\le 7\\ c_{i+m-8,j+n} & 9-m\le i\le 6 & 0\le j\le 7-n\\ d_{i+m-8,j+n-8} & 9-m\le i\le 6 & 8-n\le j\le 7\\ a'_{i+m'-1,j+n'} & 1,3\le i\le 7-m' & 0\le j\le 7-n'\\ b'_{i+m'-1,j+n'-8} & 1,3\le i\le 7-m' & 8-n'\le j\le 7\\ c'_{i+m'-9,j+n'} & 9-m'\le i\le 7 & 0\le j\le 7-n'\\ d'_{i+m'-9,j+n'-8} & 9-m'\le i\le 7 & 8-n'\le j\le 7\end{cases}\quad(66)$$

where $m=1, 3, 5, 7$ and $m'=0, 2, 4, 6$

The top half of expression (66) represents the e→o portion of the frame composite macro block e, while the bottom portion of expression (66) represents the o→e portion of the frame composite macro block e.

Using expression (66), expression (67) below is derived in the same manner as expression (47).

$$E_{kl} = \sum_{p=0}^{7}\sum_{q=0}^{7} A_{pq} \sum_{i=0,2}^{7-m}\sum_{j=0}^{7-n} \cos\frac{(2i+2m+1)p\pi}{16}\cos\frac{(2j+2n+1)q\pi}{16} \cdot F + \sum_{p=0}^{7}\sum_{q=0}^{7} B_{pq} \sum_{i=0,2}^{7-m}\sum_{j=8-n}^{7} \cos\frac{(2i+2m+1)p\pi}{16}\cos\frac{(2j+2n-15)q\pi}{16} \cdot F +$$

$$\sum_{p=0}^{7}\sum_{q=0}^{7} C_{pq} \sum_{i=9-m}^{6}\sum_{j=0}^{7-n} \cos\frac{(2i+2m-15)p\pi}{16}\cos\frac{(2j+2n+1)q\pi}{16} \cdot F + \sum_{p=0}^{7}\sum_{q=0}^{7} D_{pq} \sum_{i=9-m}^{6}\sum_{j=8-n}^{7} \cos\frac{(2i+2m-15)p\pi}{16}\cos\frac{(2j+2n-15)p\pi}{16} \cdot F +$$

$$\sum_{p=0}^{7}\sum_{q=0}^{7} A'_{pq} \sum_{i=1,3}^{7-m'}\sum_{j=0}^{7-n'} \cos\frac{(2i+2m'-1)p\pi}{16}\cos\frac{(2j+2n'+1)q\pi}{16} \cdot F + \sum_{p=0}^{7}\sum_{q=0}^{7} B'_{pq} \sum_{i=1,3}^{7-m'}\sum_{j=8-n}^{7} \cos\frac{(2i+2m'-1)p\pi}{16}\cos\frac{(2j+2n'-15)q\pi}{16} +$$

$$\sum_{p=0}^{7}\sum_{q=0}^{7} C'_{pq} \sum_{i=9-m}^{7}\sum_{j=0}^{7-n'} \cos\frac{(2i+2m'-17)p\pi}{16}\cos\frac{(2j+2n'+1)q\pi}{16} \cdot F + \sum_{p=0}^{7}\sum_{q=0}^{7} D'_{pq} \sum_{i=9-m}^{7}\sum_{j=8-n'}^{7} \cos\frac{(2i+2m'-17)p\pi}{16}\cos\frac{(2j+2n'-15)q\pi}{16}$$

(67)

The summation terms including $A_{pq}$, $B_{pq}$, $C_{pq}$, and $D_{pq}$ in expression (67) represent the e→o portion of the frame composite macro block E, while the summation terms including $A'_{pq}$, $B'_{pq}$, $C'_{pq}$, and $D'_{pq}$ in expression (67) represent the o→e portion of the frame composite macro block E.

Using expression (67), the motion compensated frame macro block E can be derived for full-pel accuracy when the odd and even fields are encoded based on the even and odd fields, respectively, of the anchor frame.

Accordingly, using expressions (60), (63), (65), and (67), the DCT coefficients for the composite macro block E can be determined. As one skilled in the art will readily appreciate from the above disclosure, the expressions above provide a composite macro block for full pixel accuracy. In other words, the coordinates (m,n) and (m',n') are the coordinates for a pixel in the composite macro block e. The coordinates (m,n) and (m',n') do not, however, always fall on a pixel in a macro block of the anchor frame. Instead, these coordinates could fall between two pixels in the horizontal direction, between two pixels in the vertical direction, or between two pixels in the diagonal direction.

$$e_{ij} = \begin{cases} \frac{1}{2}(a_{i+m,j+n} + a_{i+m,j+n+1}) & 0, 2 \le i \le 6-m; 0 \le j \le 6-n \\ \frac{1}{2}(b_{i+m,j+n-8} + b_{i+m,j+n-7}) & 0, 2 \le i \le 6-m; 8-n \le j \le 7 \\ \frac{1}{2}(c_{i+m-8,j+n} + c_{i+m-8,j+n+1}) & 8-m \le i \le 6; 0 \le j \le 6-n \\ \frac{1}{2}(d_{i+m-8,j+n-8} + d_{i+m-8,j+n-7}) & 8-m \le i \le 6; 8-n \le j \le 7 \\ \frac{1}{2}(a_{i+m,7} + b_{i+m,0}) & 0 \le i \le 6-m; j = 7-n \\ \frac{1}{2}(c_{i+m-8,7} + d_{i+m-8,0}) & 8-m \le i \le 6; j = 7-n \\ \frac{1}{2}(a'_{i+m'-1,j+n'} + a'_{i+m'-1,j+n'-1}) & 1, 3 \le i \le 7-m'; \\ & i = \le j \le 6-n' \\ \frac{1}{2}(b'_{i+m'-1,j+n'-8} + b'_{i+m'-1,j+n'-7}) & 1, 3 \le i \le 7-m'; \\ & 8-n' \le j \le 7 \\ \frac{1}{2}(c'_{i+m'-9,j+n'} + c'_{i+m'-9,j+n'+1}) & 9-m' \le i \le 7; \\ & 0 \le j \le 6-n' \\ \frac{1}{2}(d'_{i+m'-9,j+n'-8} + d'_{i+m'-9,j+n'-7}) & 9-m' \le i \le 7; \\ & 8-n' \le j \le 7 \\ \frac{1}{2}(a'_{i+m'-1,7} + b'_{i+m'-1,0}) & 1, 3 \le i \le 7-m'; j = 7-n' \\ \frac{1}{2}(c'_{i+m'-9,7} + d'_{i+m'-9,0}) & 9-m' \le i \le 7; j = 7-n' \end{cases}$$

(68)

where $m = 1, 3, 5, 7$ and $m' = 1, 3, 5, 7$

Horizontal Half-Pel Accuracy

Case (1) o→o and o→e

Expression (68) below represents the relationship between the frame composite macro block e and the macro blocks a–d and a'–d' in the anchor frame in the spatial domain when the even and odd fields are encoded based on the odd field of the anchor frame.

The top half of expression (68) represents the o→o portion of the frame composite macro block e, while the bottom portion of expression (68) represents the o→e portion of the frame composite macro block e.

Using expression (68), expression (69) below is derived in the same manner as expression (47).

$$E_{kl} = \sum_{p=0}^{7}\sum_{q=0}^{7} A_{pq} \left[ \sum_{i=0,2}^{6-m}\sum_{j=0}^{6-n} \Upsilon \cos\frac{(2i+1)k\pi}{16}\cos\frac{(2j+1)l\pi}{16} + \sum_{i=0,2}^{6-m} \frac{1}{2}\cos\frac{(2i+2m+1)p\pi}{16}\cos\frac{15q\pi}{16}\cos\frac{(2i+1)k\pi}{16}\cos\frac{(15-2n)l\pi}{16} \right] +$$

(69)

-continued $$\sum_{p=0}^{7}\sum_{q=0}^{7} B_{pq}\left[\sum_{i=0,2}^{6-m}\sum_{j=-n-1}^{-1}\Upsilon\cos\frac{(2i+1)k\pi}{16}\cos\frac{(2j+17)l\pi}{16} + \sum_{i=0,2}^{6-m}\frac{1}{2}\cos\frac{(2i+2m+1)p\pi}{16}\cos\frac{q\pi}{16}\cos\frac{(2i+1)k\pi}{16}\cos\frac{(15-2n)l\pi}{16}\right] +$$

$$\sum_{p=0}^{7}\sum_{q=0}^{7} C_{pq}\left[\sum_{i=-m+2,-m}^{-2}\sum_{j=0}^{6-n}\Upsilon\cos\frac{(2i+17)k\pi}{16}\cos\frac{(2j+1)l\pi}{16} + \sum_{i=-m}^{6-m}\frac{1}{2}\cos\frac{(2i+2m+1)p\pi}{16}\cos\frac{15q\pi}{16}\cos\frac{(2i+17)k\pi}{16}\cos\frac{(15-2n)l\pi}{16}\right] +$$

$$\sum_{p=0}^{7}\sum_{q=0}^{7} D_{pq}\left[\sum_{i=-m}^{-2}\sum_{j=-n}^{-1}\Upsilon\cos\frac{(2i+17)k\pi}{16}\cos\frac{(2j+17)l\pi}{16} + \sum_{i=-m}^{-2}\frac{1}{2}\cos\frac{(2i+2m+1)p\pi}{16}\cos\frac{q\pi}{16}\cos\frac{(2i+17)k\pi}{16}\cos\frac{(15-2n)l\pi}{16}\right] +$$

$$\sum_{p=0}^{7}\sum_{q=0}^{7} A'_{pq}\left[\sum_{i=0,2}^{6-m'}\sum_{j=0}^{6-n'}\Upsilon'\cos\frac{(2i+3)k\pi}{16}\cos\frac{(2j+1)l\pi}{16} + \sum_{i=0,2}^{6-m'}\frac{1}{2}\cos\frac{(2i+2m'+1)p\pi}{16}\cos\frac{15q\pi}{16}\cos\frac{(2i+3)k\pi}{16}\cos\frac{(15-2n')l\pi}{16}\right] +$$

$$\sum_{p=0}^{7}\sum_{q=0}^{7} B'_{pq}\left[\sum_{i=0,2}^{6-m'}\sum_{j=-n'}^{-1}\Upsilon'\cos\frac{(2i+3)k\pi}{16}\cos\frac{(2j+17)l\pi}{16} + \sum_{i=0,2}^{6-m'}\frac{1}{2}\cos\frac{(2i+2m'+1)p\pi}{16}\cos\frac{q\pi}{16}\cos\frac{(2i+3)k\pi}{16}\cos\frac{(15-2n')l\pi}{16}\right] +$$

$$\sum_{p=0}^{7}\sum_{q=0}^{7} C'_{pq}\left[\sum_{i=-m'+2,-m'}^{-2}\sum_{j=0}^{6-n'}\Upsilon'\frac{(2i+19)k\pi}{16}\cos\frac{(2j+1)l\pi}{16} + \sum_{i=-m'}^{-2}\frac{1}{2}\cos\frac{(2i+2m'+1)p\pi}{16}\cos\frac{15q\pi}{16}\cos\frac{(2i+19)k\pi}{16}\cos\frac{(15-2n')l\pi}{16}\right] +$$

$$\sum_{p=0}^{7}\sum_{q=0}^{7} D'_{pq}\left[\sum_{i=-m'}^{-2}\sum_{j=-n'}^{-1}\Upsilon'\cos\frac{(2i+19)k\pi}{16}\cos\frac{(2j+17)l\pi}{16} + \sum_{i=-m'}^{-2}\frac{1}{2}\cos\frac{(2i+2m'+1)p\pi}{16}\cos\frac{q\pi}{16}\cos\frac{(2i+19)k\pi}{16}\cos\frac{(15-2n')l\pi}{16}\right]$$

where $$\Upsilon = \cos\frac{(2i+2m+1)p\pi}{16}\cos\frac{q\pi}{16}\cos\frac{(j+n+1)q\pi}{8} \quad (70\text{A})$$

$$\Upsilon' = \cos\frac{(2i+2m'+1)p\pi}{16}\cos\frac{q\pi}{16}\cos\frac{(j+n'+1)q\pi}{8} \quad (70\text{B})$$

The summation terms including $A_{pq}$, $B_{pq}$, $C_{pq}$, and $D_{pq}$ in expression (69) represent the o→o portion of the frame composite macro block E, while the summation terms including $A'_{pq}$, $B'_{pq}$, $C'_{pq}$, and $D'_{pq}$ in expression (69) represent the o→e portion of the frame composite macro block E.

Using expression (69), the motion compensated frame macro block E can be derived for horizontal half-pel accuracy when the even and odd fields are encoded based on the odd field of the anchor frame.

Case (2) e→o e→e

Expression (71) below represents the relationship between frame composite macro block e and the macro blocks a–d and a'–d' in the spatial domain when the even and odd fields are encoded based on the even field of the anchor frame.

$$e_{ij} = \begin{cases} \frac{1}{2}(a_{i+m,j+n} + a_{i+m,j+n+1}) & 0, 2 \leq i \leq 7-m; \\ & 0 \leq j \leq 6-n \\ \frac{1}{2}(b_{i+m,j+n-8} + b_{i+m,j+n-7}) & 0, 2 \leq i \leq 7-m; \\ & 8-n \leq j \leq 7 \\ \frac{1}{2}(c_{i+m-8,j+n} + c_{i+m-8,j+n-1}) & 9-m \leq i \leq 6; 0 \leq j \leq 6-n \\ \frac{1}{2}(d_{i+m-8,j+n-8} + d_{i+m-8,j+n-7}) & 9-m \leq i \leq 6; 8-n \leq j \leq 7 \\ \frac{1}{2}(a_{i+m,7} + b_{i+m,0}) & 0 \leq i \leq 7-m; j = 7-n \\ \frac{1}{2}(c_{i+m-8,7} + d_{i+m-8,0}) & 9-m \leq i \leq 6; j = 7-n \\ \frac{1}{2}(a'_{i+m'-1,j+n'} + a'_{i+m'-1,j+n'-1}) & 1, (3 \leq i \leq 8-m';)' \\ & i = \leq j \leq 6-n \\ \frac{1}{2}(b'_{i+m'-1,j+n'-8} + b'_{i+m'-1,j+n'-7}) & 1, 3 \leq i \leq 8-m'; \\ & 8-n' \leq j \leq 7 \\ \frac{1}{2}(c'_{i+m'-9,j+n'} + c'_{i+m'-9,j+n'+1}) & 10-m' \leq i \leq 7; \\ & 0 \leq j \leq 6-n' \\ \frac{1}{2}(d'_{i+m'-9,j+n'-8} + d'_{i+m'-9,j+n'-7}) & 10-m' \leq i \leq 7; \\ & 8-n' \leq j \leq 7 \\ \frac{1}{2}(a'_{i+m'-1,7} + b'_{i+m'-1,0}) & 1, 3 \leq i \leq 8-m'; j = 7-n' \\ \frac{1}{2}(c'_{i+m'-9,7} + d'_{i+m'-9,0}) & 10-m' \leq i \leq 7; j = 7-n' \end{cases} \quad (71)$$

where $m = 0, 2, 4, 6$ and $m' = 0, 2, 4, 6$

The top half of expression (71) represents the e→o portion of the frame composite macro block e, while the bottom portion of expression (71) represents the e→e portion of the frame composite macro block e.

Using expression (71), expression (72) below is derived in the same manner as expression (47).

$$E_{kl} = \sum_{p=0}^{7}\sum_{q=0}^{7} A_{pq}\left[\sum_{i=0,2}^{7-m}\sum_{j=0}^{6-n}\Upsilon\cos\frac{(2i+1)k\pi}{16}\cos\frac{(2j+1)l\pi}{16} + \sum_{i=0,2}^{7-m}\frac{1}{2}\cos\frac{(2i+2m+1)p\pi}{16}\cos\frac{15q\pi}{16}\cos\frac{(2i+1)k\pi}{16}\cos\frac{(15-2n)l\pi}{16}\right] +$$

$$\sum_{p=0}^{7}\sum_{q=0}^{7} B_{pq}\left[\sum_{i=0,2}^{7-m}\sum_{j=-n}^{-1}\Upsilon\cos\frac{(2i+1)k\pi}{16}\cos\frac{(2j+17)l\pi}{16} + \sum_{i=0,2}^{7-m}\frac{1}{2}\cos\frac{(2i+2m+1)p\pi}{16}\cos\frac{q\pi}{16}\cos\frac{(2i+1)k\pi}{16}\cos\frac{(15-2n)l\pi}{16}\right] +$$

$$\sum_{p=0}^{7}\sum_{q=0}^{7} C_{pq}\left[\sum_{i=-m+1}^{-2}\sum_{j=0}^{6-n}\Upsilon\cos\frac{(2i+17)k\pi}{16}\cos\frac{(2j+1)l\pi}{16} + \sum_{i=-m+1}^{-2}\frac{1}{2}\cos\frac{(2i+2m+1)p\pi}{16}\cos\frac{15q\pi}{16}\cos\frac{(2i+17)k\pi}{16}\cos\frac{(15-2n)l\pi}{16}\right] +$$

$$\sum_{p=0}^{7}\sum_{q=0}^{7} D_{pq}\left[\sum_{i=-m+1}^{-2}\sum_{j=-n}^{-1}\Upsilon\cos\frac{(2i+17)k\pi}{16}\cos\frac{(2j+17)l\pi}{16} + \sum_{i=-m+1}^{-2}\frac{1}{2}\cos\frac{(2i+2m+1)p\pi}{16}\cos\frac{q\pi}{16}\cos\frac{(2i+17)k\pi}{16}\cos\frac{(15-2n)l\pi}{16}\right] +$$

$$\sum_{p=0}^{7}\sum_{q=0}^{7} A'_{pq}\left[\sum_{i=0,2}^{7-m'}\sum_{j=0}^{6-n'}\Upsilon'\cos\frac{(2i+3)k\pi}{16}\cos\frac{(2j+1)l\pi}{16} + \sum_{i=0,2}^{7-m'}\frac{1}{2}\cos\frac{(2i+2m'+1)p\pi}{16}\cos\frac{15q\pi}{16}\cos\frac{(2i+3)k\pi}{16}\cos\frac{(15-2n')q\pi}{16}\right] +$$

$$\sum_{p=0}^{7}\sum_{q=0}^{7} B'_{pq}\left[\sum_{i=0,2}^{7-m'}\sum_{j=-n'}^{-1}\Upsilon'\cos\frac{(2i+3)k\pi}{16}\cos\frac{(2j+17)l\pi}{16} + \sum_{i=0,2}^{7-m'}\frac{1}{2}\cos\frac{(2i+2m'+1)p\pi}{16}\cos\frac{q\pi}{16}\cos\frac{(2i+3)k\pi}{16}\cos\frac{(15-2n')l\pi}{16}\right] +$$

$$\sum_{p=0}^{7}\sum_{q=0}^{7} C'_{pq}\left[\sum_{i=-m'+1}^{-2}\sum_{j=0}^{6-n'}\Upsilon'\cos\frac{(2i+19)k\pi}{16}\cos\frac{(2j+1)l\pi}{16} + \sum_{i=-m'+1}^{-2}\frac{1}{2}\cos\frac{(2i+2m'+1)p\pi}{16}\cos\frac{(15q\pi)}{16}\cos\frac{(2i+19)k\pi}{16}\cos\frac{(15-2n')l\pi}{16}\right] +$$

$$\sum_{p=0}^{7}\sum_{q=0}^{7} D'_{pq}\left[\sum_{i=-m'+1}^{-2}\sum_{j=-n'}^{-1}\Upsilon'\cos\frac{(2i+19)k\pi}{16}\cos\frac{(2j+17)l\pi}{16} + \sum_{i=-m'+1}^{-2}\frac{1}{2}\cos\frac{(2i+2m'+1)p\pi}{16}\cos\frac{q\pi}{16}\cos\frac{(2i+19)k\pi}{16}\cos\frac{(15-2n')l\pi}{16}\right]$$

(72)

The summation terms including $A_{pq}$, $B_{pq}$, $C_{pq}$, and $D_{pq}$ in expression (72) represent the e→o portion of the frame composite macro block E, while the summation terms including $A'_{pq}$, $B'_{pq}$, $C'_{pq}$, and $D'_{pq}$ in expression (72) represent the e→e portion of the frame composite macro block E.

Using expression (72), the motion compensated frame macro block E can be derived for horizontal half-pel accuracy when the even and odd fields are encoded based on the even field of the anchor frame.

Case (3) o→o and e→e

Expression (73) below represents the relationship between frame composite macro block e and the macro blocks a–d and a'–d' in the spatial domain when the odd and even fields are encoded based on the odd and even fields, respectively, of the anchor frame.

$$e_{ij} = \begin{cases} \frac{1}{2}(a_{i+m,j+n} + a_{i+m,j+n+1}) & 0, 2 \le i \le 6-m; \\ & 0 \le j \le 6-n \\ \frac{1}{2}(b_{i+m,j+n-8} + b_{i+m,j+n-7}) & 0, 2 \le i \le 6-m; \\ & 8-n \le j \le 7 \\ \frac{1}{2}(c_{i+m-8,j+n} + c_{i+m-8,j+n+1}) & 8-m \le i \le 6; 0 \le j \le 6-n \\ \frac{1}{2}(d_{i+m-8,j+n-8} + d_{i+m-8,j+n-7}) & 8-m \le i \le 6; 8-n \le j \le 7 \\ \frac{1}{2}(a_{i+m,7} + b_{i+m,0}) & 0 \le i \le 6-m; j = 7-n \\ \frac{1}{2}(c_{i+m-8,7} + d_{i+m-8,0}) & 8-m \le i \le 6; j = 7-n \\ \frac{1}{2}(a'_{i+m'-1,j+n'} + a'_{i+m'-1,j+n'-1}) & 1, 3 \le i \le 8-m'; \\ & 0 \le j \le 6-n' \\ \frac{1}{2}(b'_{i+m'-1,j+n'-8} + b'_{i+m'-1,j+n'-7}) & 1, 3 \le i \le 8-m'; \\ & 8-n' \le j \le 7 \\ \frac{1}{2}(c'_{i+m'-9,j+n'} + c'_{i+m'-9,j+n'+1}) & 10-m' \le i \le 7; \\ & 0 \le j \le 6-n' \\ \frac{1}{2}(d'_{i+m'-9,j+n'-8} + d'_{i+m'-9,j+n'-7}) & 10-m' \le i \le 7; \\ & 8-n' \le j \le 7 \\ \frac{1}{2}(a'_{i+m'-1,7} + b'_{i+m'-1,0}) & 1, 3 \le i \le 8-m'; j = 7-n' \\ \frac{1}{2}(c'_{i+m'-9,7} + d'_{i+m'-9,0}) & 10-m' \le i \le 7; j = 7-n' \end{cases}$$

(73)

where $m = 0, 2, 4, 6$ and $m' = 1, 3, 5, 7$

The top half of expression (73) represents the o→o portion of the frame composite macro block e, while the bottom portion of expression (73) represents the e→e portion of the frame composite macro block e.

Using expression (73), expression (74) below is derived in the same manner as expression (47).

$$E_{kl} = \sum_{p=0}^{7}\sum_{q=0}^{7} A_{pq}\left[\sum_{i=0,2}^{6-m}\sum_{j=0}^{6-n}\Upsilon\cos\frac{(2i+1)k\pi}{16}\cos\frac{(2j+1)l\pi}{16} + \sum_{i=0,2}^{6-m}\frac{1}{2}\cos\frac{(2i+2m+1)p\pi}{16}\cos\frac{15q\pi}{16}\cos\frac{(2i+1)k\pi}{16}\cos\frac{(15-2n)l\pi}{16}\right] +$$

$$\sum_{p=0}^{7}\sum_{q=0}^{7} B_{pq}\left[\sum_{i=0,2}^{6-m}\sum_{j=-n-1}^{-1}\Upsilon\cos\frac{(2i+1)k\pi}{16}\cos\frac{(2j+17)l\pi}{16} + \sum_{i=0,2}^{6-m}\frac{1}{2}\cos\frac{(2i+2m+1)p\pi}{16}\cos\frac{q\pi}{16}\cos\frac{(2i+1)k\pi}{16}\cos\frac{(15-2n)l\pi}{16}\right] +$$

$$\sum_{p=0}^{7}\sum_{q=0}^{7} C_{pq}\left[\sum_{i=-m+2,-m}^{-2}\sum_{j=0}^{6-n}\Upsilon\cos\frac{(2i+17)k\pi}{16}\cos\frac{(2j+1)l\pi}{16} + \sum_{i=-m}^{-2}\frac{1}{2}\cos\frac{(2i+2m+1)p\pi}{16}\cos\frac{15q\pi}{16}\cos\frac{(2i+17)k\pi}{16}\cos\frac{(15-2n)l\pi}{16}\right] +$$

$$\sum_{p=0}^{7}\sum_{q=0}^{7} D_{pq}\left[\sum_{i=-m}^{-2}\sum_{j=-n}^{-1}\Upsilon\cos\frac{(2i+17)k\pi}{16}\cos\frac{(2j+17)l\pi}{16} + \sum_{i=-m}^{-2}\frac{1}{2}\cos\frac{(2i+2m+1)p\pi}{16}\cos\frac{q\pi}{16}\cos\frac{(2i+17)k\pi}{16}\cos\frac{(15-2n)l\pi}{16}\right] +$$

$$\sum_{p=0}^{7}\sum_{q=0}^{7} A'_{pq}\left[\sum_{i=0,2}^{7-m'}\sum_{j=0}^{6-n'}\Upsilon'\cos\frac{(2i+3)k\pi}{16}\cos\frac{(2j+1)l\pi}{16} + \sum_{i=0,2}^{7-m'}\frac{1}{2}\cos\frac{(2i+2m'+1)p\pi}{16}\cos\frac{15q\pi}{16}\cos\frac{(2i+3)k\pi}{16}\cos\frac{(15-2n')q\pi}{16}\right] +$$

$$\sum_{p=0}^{7}\sum_{q=0}^{7} B'_{pq}\left[\sum_{i=0,2}^{7-m'}\sum_{j=-n'}^{-1}\Upsilon'\cos\frac{(2i+3)k\pi}{16}\cos\frac{(2j+17)l\pi}{16} + \sum_{i=0,2}^{7-m'}\frac{1}{2}\cos\frac{(2i+2m'+1)p\pi}{16}\cos\frac{q\pi}{16}\cos\frac{(2i+3)k\pi}{16}\cos\frac{(15-2n')l\pi}{16}\right] +$$

$$\sum_{p=0}^{7}\sum_{q=0}^{7} C'_{pq}\left[\sum_{i=-m'+1}^{-2}\sum_{j=0}^{6-n'}\Upsilon'\cos\frac{(2i+19)k\pi}{16}\cos\frac{(2j+1)l\pi}{16} + \sum_{i=-m'+1}^{-2}\frac{1}{2}\cos\frac{(2i+2m'+1)p\pi}{16}\cos\frac{(15q\pi)}{16}\cos\frac{(2i+19)k\pi}{16}\cos\frac{(15-2n')l\pi}{16}\right] +$$

$$\sum_{p=0}^{7}\sum_{q=0}^{7} D'_{pq}\left[\sum_{i=-m'+1}^{-2}\sum_{j=-n'}^{-1}\Upsilon'\cos\frac{(2i+19)k\pi}{16}\cos\frac{(2j+17)l\pi}{16} + \sum_{i=-m'+1}^{-2}\frac{1}{2}\cos\frac{(2i+2m'+1)p\pi}{16}\cos\frac{q\pi}{16}\cos\frac{(2i+19)k\pi}{16}\cos\frac{(15-2n')l\pi}{16}\right]$$

(74)

The summation terms including $A_{pq}$, $B_{pq}$, $C_{pq}$, and $D_{pq}$ expression (74) represent the o→o portion of the frame composite macro block E, while the summation terms including $A'_{pq}$, $B'_{pq}$, $C'_{pq}$, and $D'_{pq}$ in expression (74) represent the e→e portion of the frame composite macro block E.

Using expression (74) the motion compensated frame macro block E can be derived for horizontal half-pel accuracy when the odd and even fields are encoded based on the odd and even fields, respectively, of the anchor frame.

Case (4) e→o and o→e

Expression (75) below represents the relationship between frame composite macro block e and the macro blocks a–d and a'–d' in the spatial domain when the odd and even fields are encoded based on the even and odd fields, respectively, of the anchor frame.

$$e_{ij} = \begin{cases} \frac{1}{2}(a_{i+m,j+n} + a_{i+m,j+n+1}) & 0, 2 \le i \le 7-m; \\ & 0 \le j \le 6-n \\ \frac{1}{2}(b_{i+m,j+n-8} + b_{i+m,j+n-7}) & 0, 2 \le i \le 7-m; \\ & 8-n \le j \le 7 \\ \frac{1}{2}(c_{i+m-8,j+n} + c_{i+m-8,j+n+1}) & 9-m \le i \le 6; 0 \le j \le 6-n \\ \frac{1}{2}(d_{i+m-8,j+n-8} + d_{i+m-8,j+n-7}) & 9-m \le i \le 6; 8-n \le j \le 7 \\ \frac{1}{2}(a_{i+m,7} + b_{i+m,0}) & 0 \le i \le 7-m; j = 7-n \\ \frac{1}{2}(c_{i+m-8,7} + d_{i+m-8,0}) & 9-m \le i \le 6; j = 7-n \\ \frac{1}{2}(a'_{i+m'-1,j+n'} + a'_{i+m'-1,j+n'-1}) & 1, 3 \le i \le 7-m'; \\ & i = 0 \le j \le 6-n' \\ \frac{1}{2}(b'_{i+m'-1,j+n'-8} + b'_{i+m'-1,j+n'-7}) & 1, 3 \le i \le 7-m'; \\ & 8-n' \le j \le 7 \\ \frac{1}{2}(c'_{i+m'-9,j+n'} + c'_{i+m'-9,j+n'+1}) & 9-m' \le i \le 7; \\ & 0 \le j \le 6-n' \\ \frac{1}{2}(d'_{i+m'-9,j+n'-8} + d'_{i+m'-9,j+n'-7}) & 9-m' \le i \le 7; \\ & 8-n' \le j \le 7 \\ \frac{1}{2}(a'_{i+m'-1,7} + b'_{i+m'-1,0}) & 1, 3 \le i \le 7-m'; j = 7-n' \\ \frac{1}{2}(c'_{i+m'-9,7} + d'_{i+m'-9,0}) & 9-m' \le i \le 7; j = 7-n' \end{cases}$$

(75)

where $m = 1, 3, 5, 7$ and $m' = 0, 2, 4, 6$

The top half of expression (75) represents the e→o portion of the frame composite macro block e, while the bottom portion of expression (75) represents the o→e portion of the frame composite macro block e.

Using expression (75), expression (76) below is derived in the same manner as expression (47).

Using expression (76), the motion compensated frame macro block E can be derived for horizontal half-pel accuracy when the odd and even fields are encoded based on the even and odd fields, respectively, of the anchor frame.

$$E_{kl} = \sum_{p=0}^{7}\sum_{q=0}^{7} A_{pq}\left[\sum_{i=0,2}^{7-m}\sum_{j=0}^{6-n}\Upsilon\cos\frac{(2i+1)k\pi}{16}\cos\frac{(2j+1)l\pi}{16} + \sum_{i=0,2}^{7-m}\frac{1}{2}\cos\frac{(2i+2m+1)p\pi}{16}\cos\frac{15q\pi}{16}\cos\frac{(2i+1)k\pi}{16}\cos\frac{(15-2n)l\pi}{16}\right] + \quad (76)$$

$$\sum_{p=0}^{7}\sum_{q=0}^{7} B_{pq}\left[\sum_{i=0,2}^{7-m}\sum_{j=-n}^{-1}\Upsilon\cos\frac{(2i+1)k\pi}{16}\cos\frac{(2j+17)l\pi}{16} + \sum_{i=0,2}^{7-m}\frac{1}{2}\cos\frac{(2i+2m+1)p\pi}{16}\cos\frac{q\pi}{16}\cos\frac{(2i+1)k\pi}{16}\cos\frac{(15-2n)l\pi}{16}\right] +$$

$$\sum_{p=0}^{7}\sum_{q=0}^{7} C_{pq}\left[\sum_{i=-m+1}^{-2}\sum_{j=0}^{6-n}\Upsilon\cos\frac{(2i+17)k\pi}{16}\cos\frac{(2j+1)l\pi}{16} + \sum_{i=-m+1}^{-2}\frac{1}{2}\cos\frac{(2i+2m+1)p\pi}{16}\cos\frac{15q\pi}{16}\cos\frac{(2i+17)k\pi}{16}\cos\frac{(15-2n)l\pi}{16}\right] +$$

$$\sum_{p=0}^{7}\sum_{q=0}^{7} D_{pq}\left[\sum_{i=-m+1}^{-2}\sum_{j=-n}^{-1}\Upsilon\cos\frac{(2i+17)k\pi}{16}\cos\frac{(2j+17)l\pi}{16} + \sum_{i=-m+1}^{-2}\frac{1}{2}\cos\frac{(2i+2m+1)p\pi}{16}\cos\frac{q\pi}{16}\cos\frac{(2i+17)k\pi}{16}\cos\frac{(15-2n)l\pi}{16}\right] +$$

$$\sum_{p=0}^{7}\sum_{q=0}^{7} A'_{pq}\left[\sum_{i=0,2}^{6-m'}\sum_{j=0}^{6-n'}\Upsilon'\cos\frac{(2i+3)k\pi}{16}\cos\frac{(2j+1)l\pi}{16} + \sum_{i=0,2}^{6-m'}\frac{1}{2}\cos\frac{(2i+2m'+1)p\pi}{16}\cos\frac{15q\pi}{16}\cos\frac{(2i+3)k\pi}{16}\cos\frac{(15-2n')l\pi}{16}\right] +$$

$$\sum_{p=0}^{7}\sum_{q=0}^{7} B'_{pq}\left[\sum_{i=0,2}^{6-m'}\sum_{j=n'}^{-1}\Upsilon'\cos\frac{(2i+3)k\pi}{16}\cos\frac{(2j+17)l\pi}{16} + \sum_{i=0,2}^{6-m'}\frac{1}{2}\cos\frac{(2i+2m'+1)p\pi}{16}\cos\frac{q\pi}{16}\cos\frac{(2i+3)k\pi}{16}\cos\frac{(15-2n')l\pi}{16}\right] +$$

$$\sum_{p=0}^{7}\sum_{q=0}^{7} C'_{pq}\left[\sum_{i=m'+2,-m'}^{-2}\sum_{j=0}^{6-n'}\Upsilon'\cos\frac{(2i+19)k\pi}{16}\cos\frac{(2j+1)l\pi}{16} + \sum_{i=-m'}^{-2}\frac{1}{2}\cos\frac{(2i+2m'+1)p\pi}{16}\cos\frac{15q\pi}{16}\cos\frac{(2i+19)k\pi}{16}\cos\frac{(15-2n')l\pi}{16}\right] +$$

$$\sum_{p=0}^{7}\sum_{q=0}^{7} D'_{pq}\left[\sum_{i=m'}^{-2}\sum_{j=n'}^{-1}\Upsilon'\cos\frac{(2i+19)k\pi}{16}\cos\frac{(2j+17)l\pi}{16} + \sum_{i=-m'}^{-2}\frac{1}{2}\cos\frac{(2i+2m'+1)p\pi}{16}\cos\frac{q\pi}{16}\cos\frac{(2i+19)k\pi}{16}\cos\frac{(15-2n')l\pi}{16}\right]$$

The summation terms including $A_{pq}$, $B_{pq}$, $C_{pq}$, and $D_{pq}$ expression (76) represent the e→o portion of the frame composite macro block E, while the summation terms including $A'_{pq}$, $B'_{pq}$, $C'_{pq}$, and $D'_{pq}$ in expression (76) represent the o→e portion of the frame composite macro block E.

Vertical Half-Pel Accuracy

Case (1) o→o and o→e

Expression (77) below represents the relationship between the frame composite macro block e and the macro blocks a–d and a'–d' in the anchor frame in the spatial domain when the even and odd fields are encoded based on the odd field of the anchor frame.

$$e_{ij} = \begin{cases} \frac{1}{2}(a_{i+m,j+n} + a_{i+m+2,j+n}) & 0, 2 \leq i \leq 4-m; \\ & 0 \leq j \leq 7-n \\ \frac{1}{2}(b_{i+m,j+n-8} + & 0, 2 \leq i \leq 4-m; \\ b_{i+m+2,j+n-8}) & 8-n \leq j \leq 7 \\ \frac{1}{2}(c_{i+m-8,j+n} + c_{i+m-6,j+n}) & 8-m \leq i \leq 6; 0 \leq j \leq 7-n \\ \frac{1}{2}(d_{i+m-8,j+n-8} + & 8-m \leq i \leq 6; \\ d_{i+m-6,j+n-8}) & 8-n \leq j \leq 7 \\ \frac{1}{2}(a_{i+m,j+n} + c_{i+m-6,j+n}) & i = 6-m; 0 \leq j \leq 7-n \\ \frac{1}{2}(b_{i+m,j+n-8} + d_{i+m-6,j+n-8}) & 8 = 6-m; 8-n \leq j \leq 7 \\ \frac{1}{2}(a'_{i+m'-1,j+n} + & 1, 3 \leq i \leq 5-m'; \\ a'_{i+m'+1,j+n'}) & 0 \leq j \leq 7-n' \\ \frac{1}{2}(b'_{i+m'-1,j+n'-8} + & 1, 3 \leq i \leq 5-m'; \\ b'_{i+m'+1,j+n'-8}) & 8-n' \leq j \leq 7 \\ \frac{1}{2}(c'_{i+m'-9,j+n'} + c'_{i+m'-7,j+n'}) & 9-m' \leq i \leq 7; \\ & 0 \leq j \leq 7-n' \\ \frac{1}{2}(d'_{i+m'-9,j+n'-8} + & 9-m' \leq i \leq 7; \\ d'_{i+m'-7,j+n'-8}) & 8-n' \leq j \leq 7 \\ \frac{1}{2}(a'_{i+m'-1,j+n'} + c'_{i+m'-7,j+n'}) & i = 7-m'; 0 \leq j \leq 7-n' \\ \frac{1}{2}(b'_{i+m'-1,j+n'-8} + & i = 7-m'; 8-n' \leq j \leq 7 \\ d'_{i+m'-7,j+n'-8}) & \end{cases} \quad (78)$$

where $m = 0, 2, 4, 6$ and $m' = 0, 2, 4, 6$

The top half of expression (77) represents the o→o portion of the frame composite macro block e, while the bottom portion of expression (77) represents the o→e portion of the frame composite macro block e.

Using expression (77), expression (78) below is derived in the same manner as expression (47).

$$E_{kl} = \sum_{p=0}^{7}\sum_{q=0}^{7} A_{pq}\left[\sum_{i=0,2}^{4-m}\sum_{j=0}^{7-n} X\cos\frac{(2i+1)k\pi}{16}\cos\frac{(2j+1)l\pi}{16} + \sum_{j=0}^{7-n}\frac{1}{2}\cos\frac{13p\pi}{16}\cos\frac{(2j+2n+1)q\pi}{16}\cos\frac{(13-2m)k\pi}{16}\cos\frac{(2j+1)l\pi}{16}\right] +$$

$$\sum_{p=0}^{7}\sum_{q=0}^{7} B_{pq}\left[\sum_{i=0,2}^{4-m}\sum_{j=-n}^{-1} X\cos\frac{(2i+1)k\pi}{16}\cos\frac{(2j+17)l\pi}{16} + \sum_{j=-n}^{-1}\frac{1}{2}\cos\frac{13p\pi}{16}\cos\frac{(2j+2n+1)q\pi}{16}\cos\frac{(13-2m)k\pi}{16}\cos\frac{(2j+17)l\pi}{16}\right] +$$

$$\sum_{p=0}^{7}\sum_{q=0}^{7} C_{pq}\left[\sum_{i=2-m,-m}^{-2}\sum_{j=0}^{7-n} X\cos\frac{(2i+17)k\pi}{16}\cos\frac{(2j+1)l\pi}{16} + \sum_{j=0}^{7-n}\frac{1}{2}\cos\frac{p\pi}{16}\cos\frac{(2j+2n+1)q\pi}{16}\cos\frac{(13-2m)k\pi}{16}\cos\frac{(2j+1)l\pi}{16}\right] +$$

$$\sum_{p=0}^{7}\sum_{q=0}^{7} D_{pq}\left[\sum_{i=2-m,-m}^{-2}\sum_{j=-n}^{-1} X\cos\frac{(2i+17)k\pi}{16}\cos\frac{(2j+17)l\pi}{16} + \sum_{j=0}^{7-n}\frac{1}{2}\cos\frac{p\pi}{16}\cos\frac{(2j+2n+1)q\pi}{16}\cos\frac{(13-2m)k\pi}{16}\cos\frac{(2j+17)l\pi}{16}\right] +$$

$$\sum_{p=0}^{7}\sum_{q=0}^{7} A'_{pq}\left[\sum_{i=0,2}^{4-m'}\sum_{j=0}^{7-n'} X'\cos\frac{(2i+3)k\pi}{16}\cos\frac{(2j+1)l\pi}{16} + \sum_{j=0}^{7-n'}\frac{1}{2}\cos\frac{13p\pi}{16}\cos\frac{(2j+2n'+1)q\pi}{16}\cos\frac{(15-2m')k\pi}{16}\cos\frac{(2j+1)l\pi}{16}\right] +$$

(78)

-continued $$\sum_{p=0}^{7}\sum_{q=0}^{7}B'_{pq}\left[\sum_{i=0,2}^{4-m'}\sum_{j=-n'}^{-1}X'\cos\frac{(2i+3)k\pi}{16}\cos\frac{(2j+17)l\pi}{16}+\sum_{j=-n}^{-1}\frac{1}{2}\cos\frac{13p\pi}{16}\cos\frac{(2j+2n'+1)q\pi}{16}\cos\frac{(15-2m')k\pi}{16}\cos\frac{(2j+17)l\pi}{16}\right]+$$

$$\sum_{p=0}^{7}\sum_{q=0}^{7}C'_{pq}\left[\sum_{i=2-m',-m'}^{-2}\sum_{j=0}^{7-n'}X'\cos\frac{(2i+19)k\pi}{16}\cos\frac{(2j+1)l\pi}{16}+\sum_{j=0}^{7-n'}\frac{1}{2}\cos\frac{p\pi}{16}\cos\frac{(2j+2n'+1)q\pi}{16}\cos\frac{(15-2m')k\pi}{16}\cos\frac{(2j+1)l\pi}{16}\right]+$$

$$\sum_{p=0}^{7}\sum_{q=0}^{7}D'_{pq}\left[\sum_{i=2-m',-m'}^{-2}\sum_{j=-1}^{-n'}X'\cos\frac{(2i+19)k\pi}{16}\cos\frac{(2j+17)l\pi}{16}+\sum_{j=0}^{7-n'}\frac{1}{2}\cos\frac{p\pi}{16}\cos\frac{(2j+2n'+1)q\pi}{16}\cos\frac{(15-2m')k\pi}{16}\cos\frac{(2j+17)l\pi}{16}\right]$$

where $$X = \cos\frac{(2i+2m+3)p\pi}{16}\cos\frac{p\pi}{8}\cos\frac{(2j+2n+1)q\pi}{16} \quad (79A)$$

$$X' = \cos\frac{(2i+2m'+3)p\pi}{16}\cos\frac{p\pi}{8}\cos\frac{(2j+2n'+1)q\pi}{16} \quad (79B)$$

The summation terms including $A_{pq}$, $B_{pq}$, $C_{pq}$, and $D_{pq}$ in expression (78) represent the o→o portion of the frame composite macro block E, while the summation terms including $A'_{pq}$, $B'_{pq}$, $C'_{pq}$, and $D'_{pq}$ in expression (78) represent the o→e portion of the frame composite macro block E.

Using expression (78), the motion compensated frame macro block E can be derived for vertical half-pel accuracy when the even and odd fields are encoded based on the odd field of the anchor frame.

Case (2) e→o and e→e

Expression (80) below represents the relationship between frame composite macro block e and the macro blocks a–d and a'–d' in the spatial domain when the even and odd fields are encoded based on the even field of the anchor frame.

$$e_{ij} = \begin{cases} \frac{1}{2}(a_{i+m,j+n}+a_{i+m+2,j+n}) & 0, 2 \le i \le 5-m; \\ & 0 \le j \le 7-n \\ \frac{1}{2}(b_{i+m,j+n-8}+b_{i+m+2,j+n-8}) & 0, 2 \le i \le 5-m; \\ & 8-n \le j \le 7 \\ \frac{1}{2}(c_{i+m-8,j+n}+c_{i+m-6,j+n}) & 9-m \le i \le 6; 0 \le j \le 7-n \\ \frac{1}{2}(d_{i+m-8,j+n-8}+d_{i+m-6,j+n-8}) & 9-m \le i \le 6; 8-n \le j \le 7 \\ \frac{1}{2}(a_{i+m,j+n}+c_{i+m-6,j+n}) & i = 7-m; 0 \le j \le 7-n \\ \frac{1}{2}(b_{i+m,j+n-8}+d_{i+m-6,j+n-8}) & i = 7-m; 8-n \le j \le 7 \\ \frac{1}{2}(a'_{i+m'-1,j+n'}+ & 1, 3 \le i \le 6-m'; \\ a'_{i+m'+1,j+n'}) & 0 \le j \le 7-n' \\ \frac{1}{2}(b'_{i+m'-1,j+n'-8}+ & 1, 3 \le i \le 6-m'; \\ b'_{i+m'+1,j+n'-8}) & 8-n' \le j \le 7 \\ \frac{1}{2}(c'_{i+m'-9,j+n'}+ & 10-m' \le i \le 7; \\ c'_{i+m'-7,j+n'}) & 0 \le j \le 7-n' \\ \frac{1}{2}(d'_{i+m'-9,j+n'-8}+ & 10-m' \le i \le 7; \\ d'_{i+m'-7,j+n'-8}) & 8-n' \le j \le 7 \\ \frac{1}{2}(a'_{i+m'-1,j+n'}+c'_{i+m'-7,j+n'}) & i = 8-m'; 0 \le j \le 7-n' \\ \frac{1}{2}(b'_{i+m'-1,j+n'-8}+ & i = 8-m'; \\ d'_{i+m'-7,j+n'-8}) & 8-n' \le j \le 7 \end{cases} \quad (80)$$

where $m = 1, 3, 5, 7$ and $m' = 1, 3, 5, 7$

The top half of expression (80) represents the e→o portion of the frame composite macro block e, while the bottom portion of expression (80) represents the e→e portion of the frame composite macro block e.

Using expression (80), expression (81) below is derived in the same manner as expression (47).

$$E_{kl} = \sum_{p=0}^{7}\sum_{q=0}^{7} A_{pq}\left[\sum_{i=0,2}^{5-m}\sum_{j=0}^{7-n} X\cos\frac{(2i+1)k\pi}{16}\cos\frac{(2j+1)l\pi}{16} + \sum_{j=0}^{7-n}\frac{1}{2}\cos\frac{15p\pi}{16}\cos\frac{(2j+2n+1)q\pi}{16}\cos\frac{(15-2m)k\pi}{16}\cos\frac{(2j+1)l\pi}{16}\right] + \qquad(81)$$

$$\sum_{p=0}^{7}\sum_{q=0}^{7} B_{pq}\left[\sum_{i=0,2}^{5-m}\sum_{j=-n}^{-1} X\cos\frac{(2i+1)k\pi}{16}\cos\frac{(2j+17)l\pi}{16} + \sum_{j=-n}^{-1}\frac{1}{2}\cos\frac{15p\pi}{16}\cos\frac{(2j+2n+1)q\pi}{16}\cos\frac{(15-2m)k\pi}{16}\cos\frac{(2j+17)l\pi}{16}\right] +$$

$$\sum_{p=0}^{7}\sum_{q=0}^{7} C_{pq}\left[\sum_{i=3-m,1-m}^{-2}\sum_{j=0}^{7-n} X\cos\frac{(2i+17)k\pi}{16}\cos\frac{(2j+1)l\pi}{16} + \sum_{j=0}^{7-n}\frac{1}{2}\cos\frac{3p\pi}{16}\cos\frac{(2j+2n+1)q\pi}{16}\cos\frac{(15-2m)k\pi}{16}\cos\frac{(2j+1)l\pi}{16}\right] +$$

$$\sum_{p=0}^{7}\sum_{q=0}^{7} D_{pq}\left[\sum_{i=3-m,1-m}^{-2}\sum_{j=-n}^{-1} X\cos\frac{(2i+17)k\pi}{16}\cos\frac{(2j+17)l\pi}{16} + \sum_{j=0}^{7-n}\frac{1}{2}\cos\frac{3p\pi}{16}\cos\frac{(2j+2n+1)q\pi}{16}\cos\frac{(15-2m)k\pi}{16}\cos\frac{(2j+17)l\pi}{16}\right] +$$

$$\sum_{p=0}^{7}\sum_{q=0}^{7} A'_{pq}\left[\sum_{i=0,2}^{5-m'}\sum_{j=0}^{7-n'} X'\cos\frac{(2i+3)k\pi}{16}\cos\frac{(2j+1)l\pi}{16} + \sum_{j=0}^{7-n'}\frac{1}{2}\cos\frac{15p\pi}{16}\cos\frac{(2j+2n'+1)q\pi}{16}\cos\frac{(17-2m')k\pi}{16}\cos\frac{(2j+1)l\pi}{16}\right] +$$

$$\sum_{p=0}^{7}\sum_{q=0}^{7} B'_{pq}\left[\sum_{i=0,2}^{5-m'}\sum_{j=-n'}^{-1} X'\cos\frac{(2i+3)k\pi}{16}\cos\frac{(2j+17)l\pi}{16} + \sum_{j=-n'}^{-1}\frac{1}{2}\cos\frac{15p\pi}{16}\cos\frac{(2j+2n'+1)q\pi}{16}\cos\frac{(17-2m')k\pi}{16}\cos\frac{(2j+17)l\pi}{16}\right] +$$

$$\sum_{p=0}^{7}\sum_{q=0}^{7} C'_{pq}\left[\sum_{i=3-m',1-m'}^{-2}\sum_{j=0}^{7-n'} X'\cos\frac{(2i+19)k\pi}{16}\cos\frac{(2j+1)l\pi}{16} + \sum_{j=0}^{7-n'}\frac{1}{2}\cos\frac{3p\pi}{16}\cos\frac{(2j+2n'+1)q\pi}{16}\cos\frac{(17-2m')k\pi}{16}\cos\frac{(2j+1)l\pi}{16}\right] +$$

$$\sum_{p=0}^{7}\sum_{q=0}^{7} D'_{pq}\left[\sum_{i=3-m',1-m'}^{-2}\sum_{j=-n'}^{-1} X'\cos\frac{(2i+19)k\pi}{16}\cos\frac{(2j+17)l\pi}{16} + \sum_{j=0}^{7-n'}\frac{1}{2}\cos\frac{3p\pi}{16}\cos\frac{(2j+2n'+1)q\pi}{16}\cos\frac{(17-2m')k\pi}{16}\cos\frac{(2j+17)l\pi}{16}\right]$$

The summation terms including $A_{pq}$, $B_{pq}$, $C_{pq}$, and $D_{pq}$ in expression (81) represent the e→o portion of the frame composite macro block E, while the summation terms including $A'_{pq}$, $B'_{pq}$, $C'_{pq}$, and $D'_{pq}$ in expression (81) represent the e→e portion of the frame composite macro block E.

Using expression (81), the motion compensated frame macro block E can be derived for vertical half-pel accuracy when the even and odd fields are encoded based on the even field of the anchor frame.

Case (3) o→o and e→e

Expression (82) below represents the relationship between frame composite macro block e and the macro blocks a–d and a'–d' in the spatial domain when the odd and even fields are encoded based on the odd and even fields, respectively, of the anchor frame.

$$e_{ij} = \begin{cases} \frac{1}{2}(a_{i+m,j+n} + a_{i+m+2,j+n}) & 0, 2 \leq i \leq 4-m; \\ & 0 \leq j \leq 7-n \\ \frac{1}{2}(b_{i+m,j+n-8} + b_{i+m+2,j+n-8}) & 0, 2 \leq i \leq 4-m; \\ & 8-n \leq j \leq 7 \\ \frac{1}{2}(c_{i+m-8,j+n} + c_{i+m-6,j+n}) & 8-m \leq i \leq 6; 0 \leq j \leq 7-n \\ \frac{1}{2}(d_{i+m-8,j+n-8} + d_{i+m-6,j+n-8}) & 8-m \leq i \leq 6; 8 \leq j \leq 7 \\ \frac{1}{2}(a_{i+m,j+n} + c_{i+m-6,j+n}) & i = 6-m; 0 \leq j \leq 7-n \\ \frac{1}{2}(b_{i+m,j+n-8} + d_{i+m-6,j+n-8}) & 8 = 6-m; 8-n \leq j \leq 7 \\ \frac{1}{2}(a'_{i+m'-1,j+n'} + a'_{i+m'+1,j+n'}) & 1, 3 \leq i \leq 6-m'; \\ & 0 \leq j \leq 7-n' \\ \frac{1}{2}(b'_{i+m'-1,j+n'-8} + b'_{i+m'+1,j+n'-8}) & 1, 3 \leq i \leq 6-m'; \\ & 8-n' \leq j \leq 7 \\ \frac{1}{2}(c'_{i+m'-9,j+n'} + c'_{i+m'-7,j+n'}) & 10-m' \leq i \leq 7; \\ & 0 \leq j \leq 7-n' \\ \frac{1}{2}(d'_{i+m'-9,j+n'-8} + d'_{i+m'-7,j+n'-8}) & 10-m' \leq i \leq 7; \\ & 8-n' \leq j \leq 7 \\ \frac{1}{2}(a'_{i+m'-1,j+n'} + c'_{i+m'-7,j+n'}) & i = 8-m'; 0 \leq j \leq 7-n' \\ \frac{1}{2}(b'_{i+m'-1,j+n'-8} + d'_{i+m'-7,j+n'-8}) & i = 8-m'; 8-n' \leq j \leq 7 \end{cases} \qquad (82)$$

where $m = 0, 2, 4, 6$ and $m' = 1, 3, 5, 7$

The top half of expression (82) represents the o→o portion of the frame composite macro block e, while the bottom portion of expression (82) represents the e→e portion of the frame composite macro block e.

Using expression (82), expression (83) below is derived in the same manner as expression (47).

Using expression (83), the motion compensated frame macro block E can be derived for vertical half-pel accuracy when the odd and even fields are encoded based on the odd and even fields, respectively, of the anchor frame.

$$E_{kl} = \sum_{p=0}^{7}\sum_{q=0}^{7} A_{pq}\left[\sum_{i=0,2}^{4-m}\sum_{j=0}^{7-n} X\cos\frac{(2i+1)k\pi}{16}\cos\frac{(2j+1)l\pi}{16} + \sum_{j=0}^{7-n}\frac{1}{2}\cos\frac{13p\pi}{16}\cos\frac{(2j+2n+1)q\pi}{16}\cos\frac{(13-2m)k\pi}{16}\cos\frac{(2j+1)l\pi}{16}\right] + \tag{83}$$

$$\sum_{p=0}^{7}\sum_{q=0}^{7} B_{pq}\left[\sum_{i=0,2}^{4-m}\sum_{j=-n}^{-1} X\cos\frac{(2i+1)k\pi}{16}\cos\frac{(2j+17)l\pi}{16} + \sum_{j=-n}^{-1}\frac{1}{2}\cos\frac{13p\pi}{16}\cos\frac{(2j+2n+1)q\pi}{16}\cos\frac{(13-2m)k\pi}{16}\cos\frac{(2j+17)l\pi}{16}\right] +$$

$$\sum_{p=0}^{7}\sum_{q=0}^{7} C_{pq}\left[\sum_{i=2-m,-m}^{-2}\sum_{j=0}^{7-n} X\cos\frac{(2i+17)k\pi}{16}\cos\frac{(2j+1)l\pi}{16} + \sum_{j=0}^{7-n}\frac{1}{2}\cos\frac{p\pi}{16}\cos\frac{(2j+2n+1)q\pi}{16}\cos\frac{(13-2m)k\pi}{16}\cos\frac{(2j+1)l\pi}{16}\right] +$$

$$\sum_{p=0}^{7}\sum_{q=0}^{7} D_{pq}\left[\sum_{i=2-m,-m}^{-2}\sum_{j=-n}^{-1} X\cos\frac{(2i+17)k\pi}{16}\cos\frac{(2j+17)l\pi}{16} + \sum_{j=0}^{7-n}\frac{1}{2}\cos\frac{p\pi}{16}\cos\frac{(2j+2n+1)q\pi}{16}\cos\frac{(13-2m)k\pi}{16}\cos\frac{(2j+17)l\pi}{16}\right] +$$

$$\sum_{p=0}^{7}\sum_{q=0}^{7} A'_{pq}\left[\sum_{i=0,2}^{5-m'}\sum_{j=0}^{7-n'} X'\cos\frac{(2i+3)k\pi}{16}\cos\frac{(2j+1)l\pi}{16} + \sum_{j=0}^{7-n'}\frac{1}{2}\cos\frac{15p\pi}{16}\cos\frac{(2j+2n'+1)q\pi}{16}\cos\frac{(17-2m')k\pi}{16}\cos\frac{(2j+1)l\pi}{16}\right] +$$

$$\sum_{p=0}^{7}\sum_{q=0}^{7} B'_{pq}\left[\sum_{i=0,2}^{5-m'}\sum_{j=-n'}^{-1} X'\cos\frac{(2i+3)k\pi}{16}\cos\frac{(2j+17)l\pi}{16} + \sum_{j=-n'}^{-1}\frac{1}{2}\cos\frac{15p\pi}{16}\cos\frac{(2j+2n'+1)q\pi}{16}\cos\frac{(17-2m')k\pi}{16}\cos\frac{(2j+17)l\pi}{16}\right] +$$

$$\sum_{p=0}^{7}\sum_{q=0}^{7} C'_{pq}\left[\sum_{i=3-m',1-m'}^{-2}\sum_{j=0}^{7-n'} X'\cos\frac{(2i+19)k\pi}{16}\cos\frac{(2j+1)l\pi}{16} + \sum_{j=0}^{7-n'}\frac{1}{2}\cos\frac{3p\pi}{16}\cos\frac{(2j+2n'+1)q\pi}{16}\cos\frac{(17-2m')k\pi}{16}\cos\frac{(2j+1)l\pi}{16}\right] +$$

$$\sum_{p=0}^{7}\sum_{q=0}^{7} D'_{pq}\left[\sum_{i=3-m',1-m}^{-2}\sum_{j=-n'}^{-1} X'\cos\frac{(2i+19)k\pi}{16}\cos\frac{(2j+17)l\pi}{16} + \sum_{j=0}^{7-n'}\frac{1}{2}\cos\frac{3p\pi}{16}\cos\frac{(2j+2n'+1)q\pi}{16}\cos\frac{(17-2m')k\pi}{16}\cos\frac{(2j+1)l\pi}{16}\right]$$

The summation terms including $A_{pq}$, $B_{pq}$, $C_{pq}$, and $D_{pq}$ in expression (83) represent the o→o portion of the frame composite macro block E, while the summation terms including $A'_{pq}$, $B'_{pq}$, $C'_{pq}$, and $D'_{pq}$ in expression (83) represent the e→e portion of the frame composite macro block E.

Case (4) e→o and o→e

Expression (84) below represents the relationship between frame composite macro block e and the macro blocks a–d and a'–d' in the spatial domain when the odd and even fields are encoded based on the even and odd fields, respectively, of the anchor frame.

$$e_{ij} = \begin{cases} \frac{1}{2}(a_{i+m,j+n} + a_{i+m+2,j+n}) & 0, 2 \le i \le 5-m; \\ & 0 \le j \le 7-n \\ \frac{1}{2}(b_{i+m,j+n-8} + b_{i+m+2,j+n-8}) & 0, 2 \le i \le 5-m; \\ & 8-n \le j \le 7 \\ \frac{1}{2}(c_{i+m-8,j+n} + c_{i+m-6,j+n}) & 9-m \le i \le 6; 0 \le j \le 7-n \\ \frac{1}{2}(d_{i+m-8,j+n-8} + d_{i+m-6,j+n-8}) & 9-m \le i \le 6; 8-n \le j \le 7 \\ \frac{1}{2}(a_{i+m,j+n} + c_{i+m-6,j+n}) & i = 7-m; 0 \le j \le 7-n \\ \frac{1}{2}(b_{i+m,j+n-8} + d_{i+m-6,j+n-8}) & i = 7-m; 8-n \le j \le 7 \\ \frac{1}{2}(a'_{i+m'-1,j+n} + a'_{i+m'+1,j+n'}) & 1, 3 \le i \le 5-m'; \\ & 0 \le j \le 7-n' \\ \frac{1}{2}(b'_{i+m'-1,j+n'-8} + b'_{i+m'+1,j+n'-8}) & 1, 3 \le i \le 5-m'; \\ & 8-n' \le j \le 7 \\ \frac{1}{2}(c'_{i+m'-9,j+n'} + c'_{i+m'-7,j+n'}) & 9-m' \le i \le 7; \\ & 0 \le j \le 7-n' \\ \frac{1}{2}(d'_{i+m'-9,j+n'-8} + d'_{i+m'-7,j+n'-8}) & 9-m' \le i \le 7; \\ & 8-n' \le j \le 7 \\ \frac{1}{2}(a'_{i+m'-1,j+n'} + c'_{i+m'-7,j+n'}) & i = 7-m'; 0 \le j \le 7-n' \\ \frac{1}{2}(b'_{i+m'-1,j+n'-8} + d'_{i+m'-7,j+n'-8}) & i = 7-m'; \\ & 8-n' \le j \le 7 \end{cases} \quad (84)$$

where $m = 1, 3, 5, 7$ and $m' = 0, 2, 4, 6$

The top half of expression (84) represents the e→o portion of the frame composite macro block e, while the bottom portion of expression (84) represents the o→e portion of the frame composite macro block e.

Using expression (84), expression (85) below is derived in the same manner as expression (47).

$$E_{kl} = \sum_{p=0}^{7} \sum_{q=0}^{7} A_{pq} \left[ \sum_{i=0,2}^{5-m} \sum_{j=0}^{7-n} X\cos\frac{(2i+1)k\pi}{16}\cos\frac{(2j+1)l\pi}{16} + \sum_{j=0}^{7-n} \frac{1}{2}\cos\frac{15p\pi}{16}\cos\frac{(2j+2n+1)q\pi}{16}\cos\frac{(15-2m)k\pi}{16}\cos\frac{(2j+1)l\pi}{16} \right] +$$

$$\sum_{p=0}^{7} \sum_{q=0}^{7} B_{pq} \left[ \sum_{i=0,2}^{5-m} \sum_{j=-n}^{-1} X\cos\frac{(2i+1)k\pi}{16}\cos\frac{(2j+17)l\pi}{16} + \sum_{j=-n}^{-1} \frac{1}{2}\cos\frac{15p\pi}{16}\cos\frac{(2j+2n+1)q\pi}{16}\cos\frac{(15-2m)k\pi}{16}\cos\frac{(2j+17)l\pi}{16} \right] +$$

$$\sum_{p=0}^{7} \sum_{q=0}^{7} C_{pq} \left[ \sum_{i=3-m,1-m}^{-2} \sum_{j=0}^{7-n} X\cos\frac{(2i+17)k\pi}{16}\cos\frac{(2j+1)l\pi}{16} + \sum_{j=0}^{7-n} \frac{1}{2}\cos\frac{3p\pi}{16}\cos\frac{(2j+2n+1)q\pi}{16}\cos\frac{(15-2m)k\pi}{16}\cos\frac{(2j+1)l\pi}{16} \right] +$$

$$\sum_{p=0}^{7} \sum_{q=0}^{7} D_{pq} \left[ \sum_{i=3-m,1-m}^{-2} \sum_{j=-n}^{-1} X\cos\frac{(2i+17)k\pi}{16}\cos\frac{(2j+17)l\pi}{16} + \sum_{j=0}^{7-n} \frac{1}{2}\cos\frac{3p\pi}{16}\cos\frac{(2j+2n+1)q\pi}{16}\cos\frac{(15-2m)k\pi}{16}\cos\frac{(2j+17)l\pi}{16} \right] +$$

$$\sum_{p=0}^{7} \sum_{q=0}^{7} A'_{pq} \left[ \sum_{i=0,2}^{4-m'} \sum_{j=0}^{7-n'} X'\cos\frac{(2i+3)k\pi}{16}\cos\frac{(2j+1)l\pi}{16} + \sum_{j=0}^{7-n'} \frac{1}{2}\cos\frac{13p\pi}{16}\cos\frac{(2j+2n'+1)q\pi}{16}\cos\frac{(15-2m')k\pi}{16}\cos\frac{(2j+1)l\pi}{16} \right] + \quad (85)$$

-continued $$\sum_{p=0}^{7}\sum_{q=0}^{7}B'_{pq}\left[\sum_{i=0,2}^{4-m'}\sum_{j=n'}^{-1}X'\cos\frac{(2i+3)k\pi}{16}\cos\frac{(2j+17)l\pi}{16}+\sum_{j=-n'}^{-1}\frac{1}{2}\cos\frac{13p\pi}{16}\cos\frac{(2j+2n'+1)q\pi}{16}\cos\frac{(15-2m')k\pi}{16}\cos\frac{(2j+17)l\pi}{16}\right]+$$

$$\sum_{p=0}^{7}\sum_{q=0}^{7}C'_{pq}\left[\sum_{i=3-m',-m'}^{-2}\sum_{j=0}^{7-n'}X'\cos\frac{(2i+19)k\pi}{16}\cos\frac{(2j+1)l\pi}{16}+\sum_{j=0}^{7-n'}\frac{1}{2}\cos\frac{p\pi}{16}\cos\frac{(2j+2n'+1)q\pi}{16}\cos\frac{(15-2m')k\pi}{16}\cos\frac{(2j+1)l\pi}{16}\right]+$$

$$\sum_{p=0}^{7}\sum_{q=0}^{7}D'_{pq}\left[\sum_{i=3-m',1-m}^{-2}\sum_{j=-n'}^{-n'}X'\cos\frac{(2i+19)k\pi}{16}\cos\frac{(2j+17)l\pi}{16}+\sum_{j=0}^{7-n'}\frac{1}{2}\cos\frac{p\pi}{16}\cos\frac{(2j+2n'+1)q\pi}{16}\cos\frac{(15-2m')k\pi}{16}\cos\frac{(2j+17)l\pi}{16}\right]$$

The summation terms including $A_{pq}$, $B_{pq}$, $C_{pq}$, and $D_{pq}$ expression (85) represent the e→o portion of the frame composite macro block E, while the summation terms including $A'_{pq}$, $B'_{pq}$, $C'_{pq}$, and $D'_{pq}$ in expression (85) represent the o→e portion of the frame composite macro block E.

Using expression (85), the motion compensated frame macro block E can be derived for vertical half-pel accuracy when the odd and even fields are encoded based on the even and odd fields, respectively, of the anchor frame.

Diagonal Half-Pel Accuracy

Case (1) o→o and o→e

Expression (86) below represents the relationship between the frame composite macro block e and the macro blocks a–d and a'–d' in the anchor frame in the spatial domain when the even and odd fields are encoded based on the odd field of the anchor frame.

$$e_{ij} = \begin{cases} \frac{1}{4}(a_{i+m,j+n} + a_{i+m,j+n+1} + a_{i+m+2,j+n} + a_{i+m+2,j+n+1}) & 0, 2 \le i \le 4-m; 0 \le j \le 6-n \\ \frac{1}{4}(b_{i+m,j+n-8} + b_{i+m,j+n-7} + b_{i+m+2,j+n-8} + b_{i+m+2,j+n-7}) & 0, 2 \le i \le 4-m; 8-n \le j \le 7 \\ \frac{1}{4}(c_{i+m-8,j+n} + c_{i+m-8,j+n+1} + c_{i+m-6,j+n} + c_{i+m-6,j+n+1}) & 8-m \le i \le 6; 0 \le j \le 6-n \\ \frac{1}{4}(d_{i+m-8,j+n-8} + d_{i+m-8,j+n-7} + d_{i+m-6,j+n-8} + d_{i+m-6,j+n-7}) & 8-m \le i \le 6; 8-n \le j \le 7 \\ \frac{1}{4}(a_{6,j+n} + a_{6,j+n+1} + c_{0,j+n} + c_{0,j+n+1}) & i = 6-m; 0 \le j \le 6-n \\ \frac{1}{4}(b_{6,j+n-8} + b_{6,j+n-7} + d_{0,j+n-8} + d_{0,j+n-7}) & i = 6-m; 8-n \le j \le 7 \\ \frac{1}{4}(a_{i+m,7} + a_{i+m+2,7} + b_{i+m,0} + b_{i+m+2,0}) & j = 7-n; 0 \le i \le 4-m \\ \frac{1}{4}(c_{i+m-8,7} + c_{i+m-6,7} + d_{i+m-8,0} + d_{i+m-6,0}) & j = 7-n; 8-m \le i \le 6 \\ \frac{1}{4}(a_{6,7} + b_{6,0} + c_{0,7} + d_{0,0}) & i = 6-m; j = 7-n \\ \frac{1}{4}(a'_{i+m'-1,j+n'} + a'_{i+m'-1,j+n'+1} + a'_{i+m'+1,j+n'} + a'_{i+m'+1,j+n'+1}) & 1, 3 \le i \le 5-m'; 0 \le j \le 6-n' \\ \frac{1}{4}(b'_{i+m'-1,j+n'-8} + b'_{i+m'-1,j+n'-7} + b'_{i+m'+1,j+n'-8} + b'_{i+m'+1,j+n'-7}) & 1, 3 \le i \le 5-m'; 8-n' \le j \le 7 \\ \frac{1}{4}(c'_{i+m'-9,j+n'} + c'_{i+m'-9,j+n'+1} + c'_{i+m'-7,j+n'} + c'_{i+m'-7,j+n'+1}) & 9-m' \le i \le 7; 0 \le j \le 6-n' \\ \frac{1}{4}(d'_{i+m'-9,j+n'-8} + d'_{i+m'-9,j+n'-7} + d'_{i+m'-7,j+n'-8} + d'_{i+m'-7,j+n'-7}) & 9-m' \le i \le 7; 8-n' \le j \le 7 \\ \frac{1}{4}(a'_{6,j+n'} + a'_{6,j+n'+1} + c'_{0,j+n'} + c'_{0,j+n'+1}) & i = 7-m'; 0 \le j \le 6-n' \\ \frac{1}{4}(b'_{6,j+n'-8} + b'_{6,j+n'-7} + d'_{0,j+n'-8} + d'_{0,j+n'-7}) & i = 7-m'; 8-n' \le j \le 7 \\ \frac{1}{4}(a'_{i+m'-1,7} + a'_{i+m'+1,7} + b'_{i+m'-1,0} + b'_{i+m'+1,0}) & 1, 3 \le i \le 5-m'; j = 7-n' \\ \frac{1}{4}(c'_{i+m'-9,7} + c'_{i+m'-7,7} + d'_{i+m'-9,0} + d'_{i+m'-7,0}) & 1, 3 \le i \le 5-m'; j = 7-n' \\ \frac{1}{4}(a'_{6,7} + b'_{6,0} + c'_{0,7} + d'_{0,0}) & i = 7-m'; j = 7-n' \end{cases} \quad (86)$$

where $m = 0, 2, 4, 6$ and $m' = 0, 2, 4, 6$

The top half of expression (86) represents the o→o portion of the frame composite macro block e, while the bottom portion of expression (86) represents the o→e portion of the frame composite macro block e.

Using expression (86), expression (87) below is derived in the same manner as expression (47).

$$\begin{aligned}
E_{kl} = & \sum_{p=0}^{7}\sum_{q=0}^{7} A_{pg}\left[\sum_{i=0,2}^{4-m}\sum_{j=0}^{6-n}\left(W\cos\frac{(2i+1)k\pi}{16}\cos\frac{(2j+1)l\pi}{16}\right) + \frac{1}{2}\sum_{j=0}^{6-n}\left(\cos\frac{13p\pi}{16}\cos\frac{q\pi}{16}\cos\frac{(j+n+1)q\pi}{8}\cos\frac{(13-2m)k\pi}{16}\cos\frac{(2j+1)l\pi}{16}\right) + \right. \\
& \frac{1}{2}\sum_{i=0,2}^{4-m}\left(\cos\frac{(2i+2m+3)p\pi}{16}\cos\frac{p\pi}{8}\cos\frac{15q\pi}{16}\cos\frac{(2i+1)k\pi}{16}\cos\frac{(15-2n)l\pi}{16}\right) + \left(\frac{1}{4}\cos\frac{13p\pi}{16}\cos\frac{15q\pi}{16}\cos\frac{(13-2m)k\pi}{16}\cos\frac{(15-2n)l\pi}{16}\right)\Bigg] + \\
& \sum_{p=0}^{7}\sum_{q=0}^{7} B_{pg}\left[\sum_{i=0,2}^{4-m}\sum_{j=-n}^{-1}\left(W\cos\frac{(2i+1)k\pi}{16}\cos\frac{(2j+17)l\pi}{16}\right) + \frac{1}{2}\sum_{j=-n}^{-1}\left(\cos\frac{13p\pi}{16}\cos\frac{q\pi}{16}\cos\frac{(j+n+1)q\pi}{8}\cos\frac{(13-2m)k\pi}{16}\cos\frac{(2j+17)l\pi}{16}\right) + \right. \\
& \frac{1}{2}\sum_{i=0,2}^{4-m}\left(\cos\frac{(2i+2m+3)p\pi}{16}\cos\frac{p\pi}{8}\cos\frac{q\pi}{16}\cos\frac{(2i+1)k\pi}{16}\cos\frac{(15-2n)l\pi}{16}\right) + \frac{1}{4}\left(\cos\frac{13p\pi}{16}\cos\frac{q\pi}{16}\cos\frac{(13-2m)k\pi}{16}\cos\frac{(15-2n)l\pi}{16}\right)\Bigg] + \\
& \sum_{p=0}^{7}\sum_{q=0}^{7} C_{pg}\left[\sum_{i=-m}^{-2}\sum_{j=0}^{6-n}\left(W\cos\frac{(2i+17)k\pi}{16}\cos\frac{(2j+1)l\pi}{16}\right) + \frac{1}{2}\sum_{j=0}^{6-n}\left(\cos\frac{p\pi}{16}\cos\frac{q\pi}{16}\cos\frac{(j+n+1)q\pi}{8}\cos\frac{(13-2m)k\pi}{16}\cos\frac{(2j+1)l\pi}{16}\right) + \right. \\
& \frac{1}{2}\sum_{i=-m}^{-2}\left(\cos\frac{(2i+2m+3)p\pi}{16}\cos\frac{p\pi}{8}\cos\frac{15q\pi}{16}\cos\frac{(2i+17)k\pi}{16}\cos\frac{(15-2n)l\pi}{16}\right) + \frac{1}{4}\cos\frac{p\pi}{16}\cos\frac{15q\pi}{16}\cos\frac{(13-2m)k\pi}{16}\cos\frac{(15-2n)l\pi}{16}\Bigg] + \\
& \sum_{p=0}^{7}\sum_{q=0}^{7} D_{pg}\left[\sum_{i=-m}^{-2}\sum_{j=-n}^{-1}\left(W\cos\frac{(2i+17)k\pi}{16}\cos\frac{(2j+1)l\pi}{16}\right) + \frac{1}{2}\sum_{j=-n}^{-1}\left(\cos\frac{p\pi}{16}\cos\frac{q\pi}{16}\cos\frac{(j+n+1)q\pi}{8}\cos\frac{(13-2m)k\pi}{16}\cos\frac{(2j+17)l\pi}{16}\right) + \right. \\
& \frac{1}{2}\sum_{i=-m}^{-2}\left(\cos\frac{(2i+2m+3)p\pi}{16}\cos\frac{p\pi}{8}\cos\frac{q\pi}{16}\cos\frac{(2i+17)k\pi}{16}\cos\frac{(15-2n)l\pi}{16}\right) + \left(\frac{1}{4}\cos\frac{p\pi}{16}\cos\frac{q\pi}{16}\cos\frac{(13-2m)k\pi}{16}\cos\frac{(15-2n)l\pi}{16}\right)\Bigg] + \\
& \sum_{p=0}^{7}\sum_{q=0}^{7} A'_{pg}\left[\sum_{i=0}^{4-m'}\sum_{j=0}^{6-n'}\left(W'\cos\frac{(2i+3)k\pi}{16}\cos\frac{(2j+1)l\pi}{16}\right) + \frac{1}{2}\sum_{j=0}^{6-n'}\left(\cos\frac{13p\pi}{16}\cos\frac{q\pi}{16}\cos\frac{(j+n'+1)q\pi}{8}\cos\frac{(15-2m')k\pi}{16}\cos\frac{(2j+1)l\pi}{16}\right) + \right. \\
& \frac{1}{2}\sum_{i=0,2}^{4-m'}\left(\cos\frac{(2i+2m'+3)p\pi}{16}\cos\frac{p\pi}{8}\cos\frac{15q\pi}{16}\cos\frac{(2i+3)k\pi}{16}\cos\frac{(15-2n')l\pi}{16}\right) + \frac{1}{4}\left(\cos\frac{13p\pi}{16}\cos\frac{15q\pi}{16}\cos\frac{(15-2m')k\pi}{16}\cos\frac{(15-2n')l\pi}{16}\right)\Bigg] + \\
& \sum_{p=0}^{7}\sum_{q=0}^{7} B'_{pg}\left[\sum_{i=0,2}^{4-m'}\sum_{j=-n'}^{-1}\left(W'\cos\frac{(2i+3)k\pi}{16}\cos\frac{(2j+17)l\pi}{16}\right) + \frac{1}{2}\sum_{j=-n'}^{-1}\left(\cos\frac{13p\pi}{16}\cos\frac{q\pi}{16}\cos\frac{(j+n'+1)q\pi}{8}\cos\frac{(15-2m')k\pi}{16}\cos\frac{(2j+17)l\pi}{16}\right) + \right. \\
& \frac{1}{2}\sum_{i=0,2}^{4-m'}\left(\cos\frac{(2i+2m'+3)p\pi}{16}\cos\frac{p\pi}{8}\cos\frac{q\pi}{16}\cos\frac{(2j+3)k\pi}{16}\cos\frac{(15-2n')l\pi}{16}\right) + \frac{1}{4}\left(\cos\frac{13p\pi}{16}\cos\frac{q\pi}{16}\cos\frac{(15-2m')k\pi}{16}\cos\frac{(15-2n')l\pi}{16}\right)\Bigg] + \\
& \sum_{p=0}^{7}\sum_{q=0}^{7} C'_{pg}\left[\sum_{i=-m'}^{-2}\sum_{j=0}^{6-n'}\left(W'\cos\frac{(2i+19)k\pi}{16}\cos\frac{(2j+1)l\pi}{16}\right) + \frac{1}{2}\sum_{j=0}^{6-n'}\left(\cos\frac{p\pi}{16}\cos\frac{q\pi}{16}\cos\frac{(j+n'+1)q\pi}{8}\cos\frac{(15-2m')k\pi}{16}\cos\frac{(2j+1)l\pi}{16}\right) + \right. \\
& \frac{1}{2}\sum_{i=-m'}^{-2}\left(\cos\frac{(2i+2m'+3)p\pi}{16}\cos\frac{p\pi}{8}\cos\frac{15q\pi}{16}\cos\frac{(2i+19)k\pi}{16}\cos\frac{(15-2n')l\pi}{16}\right) + \frac{1}{4}\left(\cos\frac{p\pi}{16}\cos\frac{15q\pi}{16}\cos\frac{(15-2m')k\pi}{16}\cos\frac{(15-2n')l\pi}{16}\right)\Bigg] + \\
& \sum_{p=0}^{7}\sum_{q=0}^{7} D'_{pg}\left[\sum_{i=-m'}^{-2}\sum_{j=-n'}^{-1}\left(W'\cos\frac{(2i+19)k\pi}{16}\cos\frac{(2j+1)l\pi}{16}\right) + \frac{1}{2}\sum_{j=-n'}^{-1}\left(\cos\frac{p\pi}{16}\cos\frac{q\pi}{16}\cos\frac{(j+n'+1)q\pi}{8}\cos\frac{(15-2m')k\pi}{16}\cos\frac{(2j+17)l\pi}{16}\right) + \right. \\
& \frac{1}{2}\sum_{i=-m'}^{-2}\left(\cos\frac{(2i+2m'+3)p\pi}{16}\cos\frac{p\pi}{8}\cos\frac{q\pi}{16}\cos\frac{(2i+19)k\pi}{16}\cos\frac{(15-2n')l\pi}{16}\right) + \frac{1}{4}\left(\cos\frac{p\pi}{16}\cos\frac{q\pi}{16}\cos\frac{(15-2m')k\pi}{16}\cos\frac{(15-2n')l\pi}{16}\right)\Bigg]
\end{aligned} \quad (87)$$

where $$W = \cos\frac{(2i+2m+3)p\pi}{16}\cos\frac{p\pi}{8}\cos\frac{q\pi}{16}\cos\frac{(i+n+1)q\pi}{16} \qquad (88a)$$

$$W' = \cos\frac{(2i+2m'+3)p\pi}{16}\cos\frac{p\pi}{8}\cos\frac{q\pi}{16}\cos\frac{(i+n'+1)q\pi}{16} \qquad (88b)$$

The summation terms including $A_{pq}$, $B_{pq}$, $C_{pq}$, and $D_{pq}$ in expression (87) represent the o→o portion of the frame composite macro block E, while the summation terms including $A'_{pq}$, $B'_{pq}$, $C'_{pq}$, and $D'_{pq}$ in expression (87) represent the o→e portion of the frame composite macro block E.

Using expression (87), the motion compensated frame macro block E can be derived for diagonal half-pel accuracy when the even and odd fields are encoded based on the odd field of the anchor frame.

Case (2) e→o e→e

Expression (89) below represents the relationship between frame composite macro block e and the macro blocks a–d and a'–d' in the spatial domain when the even and odd fields are encoded based on the even field of the anchor frame.

$$e_{ij} = \begin{cases} \frac{1}{4}(a_{i+m,j+n} + a_{i+m,j+n+1} + a_{i+m+2,j+n} + a_{i+m+2,j+n+1}) & 0,\, 2 \le i \le 5-m;\, 0 \le j \le 6-n \\ \frac{1}{4}(b_{i+m,j+n-8} + b_{i+m,j+n-7} + b_{i+m+2,j+n-8} + b_{i+m+2,j+n-7}) & 0,\, 2 \le i \le 5-m;\, 8-n \le j \le 7 \\ \frac{1}{4}(c_{i+m-8,j+n} + c_{i+m-8,j+n+1} + c_{i+m-6,j+n} + c_{i+m-6,j+n+1}) & 9-m \le i \le 6;\, 0 \le j \le 6-n \\ \frac{1}{4}(d_{i+m-8,j+n-8} + d_{i+m-8,j+n-7} + d_{i+m-6,j+n-8} + d_{i+m-6,j+n-7}) & 9-m \le i \le 6;\, 8-n \le j \le 7 \\ \frac{1}{4}(a_{6,j+n} + a_{6,j+n+1} + c_{0,j+n} + c_{0,j+n+1}) & i = 7-m;\, 0 \le j \le 6-n \\ \frac{1}{4}(b_{6,j+n-8} + b_{6,j+n-7} + d_{0,j+n-8} + d_{0,j+n-7}) & i = 7-m;\, 8-n \le j \le 7 \\ \frac{1}{4}(a_{i+m,7} + a_{i+m+2,7} + b_{i+m,0} + b_{i+m+2,0}) & j = 7-n;\, 0 \le j \le 5-m \\ \frac{1}{4}(c_{i+m-8,7} + c_{i+m-6,7} + d_{i+m-8,0} + d_{i+m-6,0}) & i = 7-n;\, 9-m \le i \le 6 \\ \frac{1}{4}(a_{6,7} + b_{6,0} + c_{0,7} + d_{0,0}) & i = 7-m;\, j = 7-n \\ \frac{1}{4}(a'_{i+m'-1,j+n'} + a'_{i+m'-1,j+n'+1} + a'_{i+m'+1,j+n'} + a'_{i+m'+1,j+n'}) & 1,\, 3 \le i \le 6-m';\, 0 \le j \le 6-n' \\ \frac{1}{4}(b'_{i+m'-1,j+n'-8} + b'_{i+m'-1,j+n'-7} + b'_{i+m'+1,j+n'-8} + b'_{i-m'+1,j+n'-7}) & 1,\, 3 \le i \le 6-m';\, 8-n' \le j \le 7 \\ \frac{1}{4}(c'_{i+m'-9,j+n'} + c'_{i+m'-9,j+n'+1} + c'_{i+m'-7,j+n'} + c'_{i+m'-7,j+n'+1}) & 10-m' \le i \le 7;\, 0 \le j \le 6-n' \\ \frac{1}{4}(d'_{i+m'-9,j+n'-8} + d'_{i+m'-9,j+n'-7} + d'_{i+m'-7,j+n'-8} + d'_{i+m'-7,j+n'-7}) & 10-m' \le i \le 7;\, 8-n' \le j \le 7 \\ \frac{1}{4}(a'_{7,j+n'} + a'_{7,j+n'+1} + c'_{1,j+n'} + c'_{1,j+n'+1}) & i = 8-m';\, 0 \le j \le 6-n' \\ \frac{1}{4}(b'_{7,j+n'-8} + b'_{7,j+n'-7} + d'_{1,j+n'-8} + d'_{1,j+n'-7}) & i = 8-m';\, 8-n' \le j \le 7 \\ \frac{1}{4}(a'_{i+m'-1,7} + a'_{i+m'+1,7} + b'_{i+m'-1,0} + b'_{i+m'+1,0}) & 1,\, 3 \le i \le 6-m';\, j = 7-n' \\ \frac{1}{4}(c'_{i+m'-9,7} + c'_{i+m'-7,7} + d'_{i+m'-9,0} + d'_{i+m'-7,0}) & 10-m' \le i \le 7;\, j = 7-n' \\ \frac{1}{4}(a'_{7,7} + b'_{7,0} + c'_{1,7} + d'_{1,0}) & i = 8-m';\, j = 7-n' \end{cases} \qquad (89)$$

where $m = 1, 3, 5, 7$ and $m' = 1, 3, 5, 7$

The top half of expression (89) represents the e→o portion of the frame composite macro block e, while the bottom portion of expression (89) represents the e→e portion of the frame composite macro block e.

Using expression (89), expression (90) below is derived in the same manner as expression (47).

$$E_{kl} = \sum_{p=0}^{7}\sum_{q=0}^{7} A_{pq}\left[\sum_{i=0,2}^{5-m}\sum_{j=0}^{6-n}\left(W\cos\frac{(2i+1)k\pi}{16}\cos\frac{(2k+1)l\pi}{16}\right) + \frac{1}{2}\sum_{j=0}^{6-n}\left(\cos\frac{15p\pi}{16}\cos\frac{q\pi}{16}\cos\frac{(j+n+1)q\pi}{8}\cos\frac{(15-2m)k\pi}{16}\cos\frac{(2j+1)l\pi}{16}\right) + \right.$$

$$\frac{1}{2}\sum_{i=0,2}^{5-m}\left(\cos\frac{(2i+2m+3)p\pi}{16}\cos\frac{p\pi}{8}\cos\frac{15q\pi}{16}\cos\frac{(2i+1)k\pi}{16}\cos\frac{(15-2n)l\pi}{16}\right) + \left.\left(\frac{1}{4}\cos\frac{15p\pi}{16}\cos\frac{15q\pi}{16}\cos\frac{(15-2m)k\pi}{16}\cos\frac{(15-2n)l\pi}{16}\right)\right] +$$

$$\sum_{p=0}^{7}\sum_{q=0}^{7} B_{pq}\left[\sum_{i=0,2}^{5-m}\sum_{j=-n}^{-1}\left(W\cos\frac{(2i+1)k\pi}{16}\cos\frac{(2j+17)l\pi}{16}\right) + \frac{1}{2}\sum_{j=-n}^{-1}\left(\cos\frac{15p\pi}{16}\cos\frac{q\pi}{16}\cos\frac{(j+n+1)q\pi}{8}\cos\frac{(15-2m)k\pi}{16}\cos\frac{(2j+17)l\pi}{16}\right) + \right.$$

$$\frac{1}{2}\sum_{i=0,2}^{5-m}\left(\cos\frac{(2i+2m+3)p\pi}{16}\cos\frac{p\pi}{8}\cos\frac{q\pi}{16}\cos\frac{(2i+1)k\pi}{16}\cos\frac{(15-2n)l\pi}{16}\right) + \left.\left(\frac{1}{4}\cos\frac{15p\pi}{16}\cos\frac{q\pi}{16}\cos\frac{(15-2m)k\pi}{16}\cos\frac{(15-2n)l\pi}{16}\right)\right] +$$

$$\sum_{p=0}^{7}\sum_{q=0}^{7} C_{pq}\left[\sum_{i=-m+1}^{-2}\sum_{j=0}^{6-n}\left(W\cos\frac{(2i+17)k\pi}{16}\cos\frac{(2j+1)l\pi}{16}\right) + \frac{1}{2}\sum_{j=0}^{6-n}\left(\cos\frac{3p\pi}{16}\cos\frac{q\pi}{16}\cos\frac{(j+n+1)q\pi}{8}\cos\frac{(15-2m)k\pi}{16}\cos\frac{(2j+1)l\pi}{16}\right) + \right.$$

$$\left.\frac{1}{2}\sum_{i=-m+1}^{-2}\left(\cos\frac{(2i+2m+3)p\pi}{16}\cos\frac{p\pi}{16}\cos\frac{15q\pi}{16}\cos\frac{(2i+17)k\pi}{16}\cos\frac{(15-2n)l\pi}{16} + \frac{1}{4}\left(\cos\frac{3p\pi}{16}\cos\frac{15q\pi}{16}\cos\frac{(15-2m)k\pi}{16}\cos\frac{(15-2n)l\pi}{16}\right)\right)\right] +$$

$$\sum_{p=0}^{7}\sum_{q=0}^{7} D_{pq}\left[\sum_{i=-m+1}^{-2}\sum_{j=-n}^{-1}\left(W\cos\frac{(2i+17)k\pi}{16}\cos\frac{(2j+1)l\pi}{16}\right) + \frac{1}{2}\sum_{j=-n}^{-1}\left(\cos\frac{3p\pi}{16}\cos\frac{q\pi}{16}\cos\frac{(j+n+1)q\pi}{8}\cos\frac{(15-2m)k\pi}{16}\cos\frac{(2j+17)l\pi}{16}\right) + \right.$$

$$\frac{1}{2}\sum_{i=-m+1}^{-2}\left(\cos\frac{(2i+2m+3)p\pi}{16}\cos\frac{p\pi}{8}\cos\frac{q\pi}{16}\cos\frac{(2i+17)k\pi}{16}\cos\frac{(15-2n)l\pi}{16}\right) + \left.\left(\frac{1}{4}\cos\frac{3p\pi}{16}\cos\frac{q\pi}{16}\cos\frac{(15-2m)k\pi}{16}\cos\frac{(15-2n)l\pi}{16}\right)\right] +$$

$$\sum_{p=0}^{7}\sum_{q=0}^{7} A'_{pq}\left[\sum_{i=0,2}^{5-m'}\sum_{j=0}^{6-n'}\left(W'\cos\frac{(2i+3)k\pi}{16}\cos\frac{(2j+1)l\pi}{16}\right) + \frac{1}{2}\sum_{j=0}^{6-n'}\left(\cos\frac{15p\pi}{16}\cos\frac{q\pi}{16}\cos\frac{(j+n'+1)q\pi}{8}\cos\frac{(17-2m')k\pi}{16}\cos\frac{(2j+1)l\pi}{16}\right) + \right.$$

$$\frac{1}{2}\sum_{j=0,2}^{5-m'}\left(\cos\frac{(2i+2m'+3)p\pi}{16}\cos\frac{p\pi}{8}\cos\frac{15q\pi}{16}\cos\frac{(2i+3)k\pi}{16}\cos\frac{(15-2n')l\pi}{16}\right) + \left.\frac{1}{4}\left(\cos\frac{13p\pi}{16}\cos\frac{15q\pi}{16}\cos\frac{(17-2m')k\pi}{16}\cos\frac{(15-2n')l\pi}{16}\right)\right] +$$

$$\sum_{p=0}^{7}\sum_{q=0}^{7} B'_{pq}\left[\sum_{i=0,2}^{5-m'}\sum_{j=-n'}^{-1}\left(W'\cos\frac{(2i+3)k\pi}{16}\cos\frac{(2j+17)l\pi}{16}\right) + \frac{1}{2}\sum_{i=-n'}^{-1}\left(\cos\frac{15p\pi}{16}\cos\frac{q\pi}{16}\cos\frac{(j+n'+1)q\pi}{8}\cos\frac{(17-2m')k\pi}{16}\cos\frac{(2j+17)l\pi}{16}\right) + \right.$$

$$\frac{1}{2}\sum_{i=0,2}^{5-m'}\left(\cos\frac{(2i+2m'+3)p\pi}{16}\cos\frac{p\pi}{8}\cos\frac{q\pi}{16}\cos\frac{(2j+3)k\pi}{16}\cos\frac{(15-2n')l\pi}{16}\right) + \left.\frac{1}{4}\left(\cos\frac{13p\pi}{16}\cos\frac{q\pi}{16}\cos\frac{(17-2m')k\pi}{16}\cos\frac{(15-2n')l\pi}{16}\right)\right] +$$

$$\sum_{p=0}^{7}\sum_{q=0}^{7} C'_{pq}\left[\sum_{i=-m'+1}^{-2}\sum_{j=0}^{6-n'}\left(W'\cos\frac{(2i+19)k\pi}{16}\cos\frac{(2j+1)l\pi}{16}\right) + \frac{1}{2}\sum_{j=0}^{6-n'}\left(\cos\frac{3p\pi}{16}\cos\frac{q\pi}{16}\cos\frac{(j+n'+1)q\pi}{8}\cos\frac{(17-2m')k\pi}{16}\cos\frac{(2j+1)l\pi}{16}\right) + \right.$$

$$\left.\frac{1}{2}\sum_{i=-m'+1}^{-2}\left(\cos\frac{(2i+2m'+3)p\pi}{16}\cos\frac{p\pi}{8}\cos\frac{15q\pi}{16}\cos\frac{(2i+19)k\pi}{16}\cos\frac{(15-2n')l\pi}{16}\right) + \frac{1}{4}\left(\cos\frac{p\pi}{16}\cos\frac{15q\pi}{16}\cos\frac{(17-2m')k\pi}{16}\cos\frac{(15-2n')l\pi}{16}\right)\right] +$$

$$\sum_{p=0}^{7}\sum_{q=0}^{7} D'_{pq}\left[\sum_{i=-m'+1}^{-2}\sum_{j=-n'}^{-1}\left(W'\cos\frac{(2i+19)k\pi}{16}\cos\frac{(2j+1)l\pi}{16}\right) + \frac{1}{2}\sum_{j=-n'}^{-1}\left(\cos\frac{3p\pi}{16}\cos\frac{q\pi}{16}\cos\frac{(j+n'+1)q\pi}{8}\cos\frac{(17-2m')k\pi}{16}\cos\frac{(2j+17)l\pi}{16}\right)\right.$$

$$\left.\frac{1}{2}\sum_{i=-m'+1}^{-2}\left(\cos\frac{(2i+2m'+3)p\pi}{16}\cos\frac{p\pi}{8}\cos\frac{q\pi}{16}\cos\frac{(2i+19)k\pi}{16}\cos\frac{(15-2n')l\pi}{16}\right) + \frac{1}{4}\left(\cos\frac{p\pi}{16}\cos\frac{q\pi}{16}\cos\frac{(17-2m')k\pi}{16}\cos\frac{(15-2n')l\pi}{16}\right)\right]$$

(90)

The summation terms including $A_{pq}$, $B_{pq}$, $C_{pq}$, and $D_{pq}$ in expression (90) represent the e→o portion of the frame composite macro block E, while the summation terms including $A'_{pq}$, $B'_{pq}$, $C'_{pq}$, and $D'_{pq}$ in expression (90) represent the e→e portion of the frame composite macro block E.

Using expression (90), the motion compensated frame macro block E can be derived for diagonal half-pel accuracy when the even and odd fields are encoded based on the even field of the anchor frame.

Case (3) o→o and e→e

Expression (91) below represents the relationship between frame composite macro block e and the macro blocks a–d and a'–d' in the spatial domain when the odd and even fields are encoded based on the odd and even fields, respectively, of the anchor frame.

$$e_{ij} = \begin{cases} \frac{1}{4}(a_{i+m,j+n} + a_{i+m,j+n+1} + a_{j+m+2,j+n} + a_{i+m+2,j+n+1}) & 0, 2 \leq i \leq 4-m; 0 \leq j \leq 6-n \\ \frac{1}{4}(b_{i+m,j+n-8} + b_{i+m,j+n-7} + b_{i+m+2,j+n-8} + b_{i+m+2,j+n-7}) & 0, 2 \leq i \leq 4-m; 8-n \leq j \leq 7 \\ \frac{1}{4}(c_{i+m-8,j+n} + c_{i+m-8,j+n+1} + c_{i+m-6,j+n} + c_{i+m-6,j+n+1}) & 8-m \leq i \leq 6; 0 \leq j \leq 6-n \\ \frac{1}{4}(d_{i+m-8,j+n-8} + d_{i+m-8,j+n-7} + d_{i+m-6,j+n-8} + d_{i+m-6,j+n-7}) & 8-m \leq i \leq 6; 8-n \leq j \leq 7 \\ \frac{1}{4}(a_{6,j+n} + a_{6,j+n+1} + c_{0,j+n} + c_{0,j+n+1}) & i = 6-m; 0 \leq j \leq 6-n \\ \frac{1}{4}(b_{6,j+n-8} + b_{6,j+n-7} + d_{0,j+n-8} + d_{0,j+n-7}) & i = 6-m; 8-n \leq j \leq 7 \\ \frac{1}{4}(a_{i+m,7} + a_{i+m+2,7} + b_{i+m,0} + b_{i+m+2,0}) & j = 7-n; 0 \leq j \leq 4-m \\ \frac{1}{4}(c_{i+m-8,7} + c_{i+m-6,7} + d_{i+m-8,0} + d_{i+m-6,0}) & i = 7-n; 8-m \leq i \leq 6 \\ \frac{1}{4}(a_{6,7} + b_{6,0} + c_{0,7} + d_{0,0}) & i = 6-m; j = 7-n \\ \frac{1}{4}(a'_{i+m'-1,j+n'} + a'_{i+m'-1,j+n'+1} + a'_{i+m'+1,j+n'} + a'_{i+m'+1,j+n'}) & 1, 3 \leq i \leq 6-m'; 0 \leq j \leq 6-n' \\ \frac{1}{4}(b'_{i+m'-1,j+n'-8} + b'_{i+m'-1,j+n'-7} + b'_{i+m'+1,j+n'-8} + b'_{i-m'+1,j+n'-7}) & 1, 3 \leq i \leq 6-m'; 8-n' \leq j \leq 7 \\ \frac{1}{4}(c'_{i+m'-9,j+n'} + c'_{i+m'-9,j+n'+1} + c'_{i+m'-7,j+n'} + c'_{i+m'-7,j+n'+1}) & 10-m' \leq i \leq 7; 0 \leq j \leq 6-n' \\ \frac{1}{4}(d'_{i+m'-9,j+n'-8} + d'_{i+m'-9,j+n'-7} + d'_{i+m'-7,j+n'-8} + d'_{i+m'-7,j+n'-7}) & 10-m' \leq i \leq 7; 8-n' \leq j \leq 7 \\ \frac{1}{4}(a'_{7,j+n'} + a'_{7,j+n'+1} + c'_{1,j+n'} + c_{1,j+n'+1}) & i = 8-m'; 0 \leq j \leq 6-n' \\ \frac{1}{4}(b'_{7,j+n'-8} + b'_{7,j+n'-7} + d'_{1,j+n'-8} + d'_{1,j+n'-7}) & i = 8-m'; 8-n' \leq j \leq 7 \\ \frac{1}{4}(a'_{i+m'-1,7} + a'_{i+m'+1,7} + b'_{i+m'-1,0} + b'_{i+m'+1,0}) & 1, 3 \leq i \leq 6-m'; j = 7-n' \\ \frac{1}{4}(c'_{i+m'-9,7} + c'_{i+m'-7,7} + d'_{i+m'-9,0} + d'_{i+m'-7,0}) & 10-m' \leq i \leq 7; j = 7-n' \\ \frac{1}{4}(a'_{7,7} + b'_{7,0} + c'_{1,7} + d'_{1,0}) & i = 8-m'; j = 7-n' \end{cases}$$ (91)

where $m = 0, 2, 4, 6$ and $m' = 0, 2, 4, 6$

The top half of expression (91) represents the o→o portion of the frame composite macro block e, while the bottom portion of expression (91) represents the e→e portion of the frame composite macro block e.

Using expression (91), expression (92) below is derived in the same manner as expression (47).

$$E_{kl} = \sum_{p=0}^{7}\sum_{q=0}^{7} A_{pq} \left[ \sum_{i=0,2}^{4-m}\sum_{j=0}^{6-n}\left(W\cos\frac{(2i+1)k\pi}{16}\cos\frac{(2k+1)l\pi}{16}\right) + \frac{1}{2}\sum_{j=0}^{6-n}\left(\cos\frac{13p\pi}{16}\cos\frac{q\pi}{16}\cos\frac{(j+n+1)q\pi}{8}\cos\frac{(13-2m)k\pi}{16}\cos\frac{(2j+1)l\pi}{16}\right) + \right.$$

$$\left. \frac{1}{2}\sum_{i=0,2}^{4-m}\left(\cos\frac{(2i+2m+3)p\pi}{16}\cos\frac{p\pi}{8}\cos\frac{15q\pi}{16}\cos\frac{(2i+1)k\pi}{16}\cos\frac{(15-2n)l\pi}{16}\right) + \left(\frac{1}{4}\cos\frac{13p\pi}{16}\cos\frac{15q\pi}{16}\cos\frac{(13-2m)k\pi}{16}\cos\frac{(15-2n)l\pi}{16}\right) \right] +$$ (92)

-continued $$\sum_{p=0}^{7}\sum_{q=0}^{7} B_{pq}\left[\sum_{i=0,2}^{4-m}\sum_{j=-n}^{-1}\left(W\cos\frac{(2i+1)k\pi}{16}\cos\frac{(2j+17)l\pi}{16}\right)+\frac{1}{2}\sum_{j=-n}^{-1}\left(\cos\frac{13p\pi}{16}\cos\frac{q\pi}{16}\cos\frac{(j+n+1)q\pi}{8}\cos\frac{(13-2m)k\pi}{16}\cos\frac{(2j+17)l\pi}{16}\right)+\right.$$

$$\frac{1}{2}\sum_{i=0,2}^{4-m}\left(\cos\frac{(2i+2m+3)p\pi}{16}\cos\frac{p\pi}{8}\cos\frac{q\pi}{16}\cos\frac{(2i+1)k\pi}{16}\cos\frac{(15-2n)l\pi}{16}\right)+\left(\frac{1}{4}\cos\frac{13p\pi}{16}\cos\frac{q\pi}{16}\cos\frac{(13-2m)k\pi}{16}\cos\frac{(15-2n)l\pi}{16}\right)\Big]+$$

$$\sum_{p=0}^{7}\sum_{q=0}^{7} C_{pq}\left[\sum_{i=-m}^{-2}\sum_{j=0}^{6-n}\left(W\cos\frac{(2i+17)k\pi}{16}\cos\frac{(2j+1)l\pi}{16}\right)+\frac{1}{2}\sum_{j=0}^{6-n}\left(\cos\frac{p\pi}{16}\cos\frac{q\pi}{16}\cos\frac{(j+n+1)q\pi}{8}\cos\frac{(13-2m)k\pi}{16}\cos\frac{(2j+1)l\pi}{16}\right)+\right.$$

$$\frac{1}{2}\sum_{i=-m}^{-2}\left(\cos\frac{(2i+2m+3)p\pi}{16}\cos\frac{p\pi}{16}\cos\frac{15q\pi}{16}\cos\frac{(2i+17)k\pi}{16}\cos\frac{(15-2n)l\pi}{16}\right)+\frac{1}{4}\left(\cos\frac{p\pi}{16}\cos\frac{15q\pi}{16}\cos\frac{(13-2m)k\pi}{16}\cos\frac{(15-2n)l\pi}{16}\right)\Big]+$$

$$\sum_{p=0}^{7}\sum_{q=0}^{7} D_{pq}\left[\sum_{i=-m}^{-2}\sum_{j=-n}^{-1}\left(W\cos\frac{(2i+17)k\pi}{16}\cos\frac{(2j+1)l\pi}{16}\right)+\frac{1}{2}\sum_{j=-n}^{-1}\left(\cos\frac{p\pi}{16}\cos\frac{q\pi}{16}\cos\frac{(j+n+1)q\pi}{8}\cos\frac{(13-2m)k\pi}{16}\cos\frac{(2j+17)l\pi}{16}\right)+\right.$$

$$\frac{1}{2}\sum_{i=-m}^{-2}\left(\cos\frac{(2i+2m+3)p\pi}{16}\cos\frac{p\pi}{8}\cos\frac{q\pi}{16}\cos\frac{(2i+17)k\pi}{16}\cos\frac{(15-2n)l\pi}{16}\right)+\left(\frac{1}{4}\cos\frac{p\pi}{16}\cos\frac{q\pi}{16}\cos\frac{(13-2m)k\pi}{16}\cos\frac{(15-2n)l\pi}{16}\right)\Big]+$$

$$\sum_{p=0}^{7}\sum_{q=0}^{7} A'_{pq}\left[\sum_{i=0,2}^{5-m'}\sum_{j=0}^{6-n'}\left(W'\cos\frac{(2i+3)k\pi}{16}\cos\frac{(2j+1)l\pi}{16}\right)+\frac{1}{2}\sum_{j=0}^{6-n'}\left(\cos\frac{15p\pi}{16}\cos\frac{q\pi}{16}\cos\frac{(j+n'+1)q\pi}{8}\cos\frac{(17-2m')k\pi}{16}\cos\frac{(2j+1)l\pi}{16}\right)+\right.$$

$$\frac{1}{2}\sum_{i=0,2}^{5-m'}\left(\cos\frac{(2i+2m'+3)p\pi}{16}\cos\frac{p\pi}{8}\cos\frac{15q\pi}{16}\cos\frac{(2i+3)k\pi}{16}\cos\frac{(15-2n')l\pi}{16}\right)+\frac{1}{4}\left(\cos\frac{13p\pi}{16}\cos\frac{15q\pi}{16}\cos\frac{(17-2m')k\pi}{16}\cos\frac{(15-2n')l\pi}{16}\right)\Big]+$$

$$\sum_{p=0}^{7}\sum_{q=0}^{7} B'_{pq}\left[\sum_{i=0,2}^{5-m'}\sum_{j=-n'}^{-1}\left(W'\cos\frac{(2i+3)k\pi}{16}\cos\frac{(2j+17)l\pi}{16}\right)+\frac{1}{2}\sum_{i=-n'}^{-1}\left(\cos\frac{15p\pi}{16}\cos\frac{q\pi}{16}\cos\frac{(j+n'+1)q\pi}{8}\cos\frac{(17-2m')k\pi}{16}\cos\frac{(2j+17)l\pi}{16}\right)+\right.$$

$$\frac{1}{2}\sum_{i=0,2}^{5-m'}\left(\cos\frac{(2i+2m'+3)p\pi}{16}\cos\frac{p\pi}{8}\cos\frac{q\pi}{16}\cos\frac{(2j+3)k\pi}{16}\cos\frac{(15-2n')l\pi}{16}\right)+\frac{1}{4}\left(\cos\frac{13p\pi}{16}\cos\frac{q\pi}{16}\cos\frac{(17-2m')k\pi}{16}\cos\frac{(15-2n')l\pi}{16}\right)\Big]+$$

$$\sum_{p=0}^{7}\sum_{q=0}^{7} C'_{pq}\left[\sum_{i=-m'+1}^{-2}\sum_{j=0}^{6-n'}\left(W'\cos\frac{(2i+19)k\pi}{16}\cos\frac{(2j+1)l\pi}{16}\right)+\frac{1}{2}\sum_{j=0}^{6-n'}\left(\cos\frac{3p\pi}{16}\cos\frac{q\pi}{16}\cos\frac{(j+n'+1)q\pi}{8}\cos\frac{(17-2m')k\pi}{16}\cos\frac{(2j+1)l\pi}{16}\right)+\right.$$

$$\frac{1}{2}\sum_{i=-m'+1}^{-2}\left(\cos\frac{(2i+2m'+3)p\pi}{16}\cos\frac{p\pi}{8}\cos\frac{15q\pi}{16}\cos\frac{(2i+19)k\pi}{16}\cos\frac{(15-2n')l\pi}{16}\right)+\frac{1}{4}\left(\cos\frac{p\pi}{16}\cos\frac{15q\pi}{16}\cos\frac{(17-2m')k\pi}{16}\cos\frac{(15-2n')l\pi}{16}\right)\Big]+$$

$$\sum_{p=0}^{7}\sum_{q=0}^{7} D'_{pq}\left[\sum_{i=-m'+1}^{-2}\sum_{j=-n'}^{-1}\left(W'\cos\frac{(2i+19)k\pi}{16}\cos\frac{(2j+1)l\pi}{16}\right)+\frac{1}{2}\sum_{j=-n'}^{-1}\left(\cos\frac{3p\pi}{16}\cos\frac{q\pi}{16}\cos\frac{(j+n'+1)q\pi}{8}\cos\frac{(17-2m')k\pi}{16}\cos\frac{(2j+17)l\pi}{16}\right)+\right.$$

$$\frac{1}{2}\sum_{i=-m'+1}^{-2}\left(\cos\frac{(2i+2m'+3)p\pi}{16}\cos\frac{p\pi}{8}\cos\frac{q\pi}{16}\cos\frac{(2i+19)k\pi}{16}\cos\frac{(15-2n')l\pi}{16}\right)+\frac{1}{4}\left(\cos\frac{p\pi}{16}\cos\frac{q\pi}{16}\cos\frac{(17-2m')k\pi}{16}\cos\frac{(15-2n')l\pi}{16}\right)\Big]$$

The summation terms including $A_{pq}$, $B_{pq}$, $C_{pq}$, and $D_{pq}$ in expression (92) represent the o→o portion of the frame composite macro block E, while the summation terms including $A'_{pq}$, $B'_{pq}$, $C'_{pq}$, and $D'_{pq}$ in expression (92) represent the e→e portion of the frame composite macro block E.

Using expression (92), the motion compensated frame macro block E can be derived for diagonal half-pel accuracy when the odd and even fields are encoded based on the odd and even fields, respectively, of the anchor frame.

Case (4) e→o and o→e

Expression (93) below represents the relationship between frame composite macro block e and the macro blocks a–d and a'–d' in the spatial domain when the odd and even fields are encoded based on the even and odd fields, respectively, of the anchor frame.

$$e_{ij} = \begin{cases}
\frac{1}{4}(a_{i+m,j+n} + a_{i+m,j+n+1} + a_{j+m+2,j+n} + a_{i+m+2,j+n+1}) & 0, 2 \le i \le 5-m; 0 \le j \le 6-n \\
\frac{1}{4}(b_{i+m,j+n-8} + b_{i+m,j+n-7} + b_{i+m+2,j+n-8} + b_{i+m+2,j+n-7}) & 0, 2 \le i \le 5-m; 8-n \le j \le 7 \\
\frac{1}{4}(c_{i+m-8,j+n} + c_{i+m-8,j+n+1} + c_{i+m-6,j+n} + c_{i+m-6,j+n+1}) & 9-m \le i \le 6; 0 \le j \le 6-n \\
\frac{1}{4}(d_{i+m-8,j+n-8} + d_{i+m-8,j+n-7} + d_{i+m-6,j+n-8} + d_{i+m-6,j+n-7}) & 9-m \le i \le 6; 8-n \le j \le 7 \\
\frac{1}{4}(a_{6,j+n} + a_{6,j+n+1} + c_{0,j+n} + c_{0,j+n+1}) & i = 7-m; 0 \le j \le 6-n \\
\frac{1}{4}(b_{6,j+n-8} + b_{6,j+n-7} + d_{0,j+n-8} + d_{0,j+n-7}) & i = 7-m; 8-n \le j \le 7 \\
\frac{1}{4}(a_{i+m,7} + a_{i+m+2,7} + b_{i+m,0} + b_{i+m+2,0}) & j = 7-n; 0 \le j \le 5-m \\
\frac{1}{4}(c_{i+m-8,7} + c_{i+m-6,7} + d_{i+m-8,0} + d_{i+m-6,0}) & i = 7-n; 9-m \le i \le 6 \\
\frac{1}{4}(a_{6,7} + b_{6,0} + c_{0,7} + d_{0,0}) & i = 7-m; j = 7-n \\
\frac{1}{4}(a'_{i+m'-1,j+n'} + a'_{i+m'-1,j+n'+1} + a'_{i+m'+1,j+n'} + a'_{i+m'+1,j+n'}) & 1, 3 \le i \le 5-m'; 0 \le j \le 6-n' \\
\frac{1}{4}(b'_{i+m'-1,j+n'-8} + b'_{i+m'-1,j+n'-7} + b'_{i+m'+1,j+n'-8} + b'_{i-m'+1,j+n'-7}) & 1, 3 \le i \le 5-m'; 8-n' \le j \le 7 \\
\frac{1}{4}(c'_{i+m'-9,j+n'} + c'_{i+m'-9,j+n'+1} + c'_{i+m'-7,j+n'} + c'_{i+m'-7,j+n'+1}) & 9-m' \le i \le 7; 0 \le j \le 6-n' \\
\frac{1}{4}(d'_{i+m'-9,j+n'-8} + d'_{i+m'-9,j+n'-7} + d'_{i+m'-7,j+n'-8} + d'_{i+m'-7,j+n'-7}) & 9-m' \le i \le 7; 8-n' \le j \le 7 \\
\frac{1}{4}(a'_{6,j+n'} + a'_{6,j+n'+1} + c'_{0,j+n'} + c_{0,j+n'+1}) & i = 7-m'; 0 \le j \le 6-n' \\
\frac{1}{4}(b'_{6,j+n'-8} + b'_{6,j+n'-7} + d'_{0,j+n'-8} + d'_{0,j+n'-7}) & i = 7-m'; 8-n' \le j \le 7 \\
\frac{1}{4}(a'_{i+m'-1,7} + a'_{i+m'+1,7} + b'_{i+m'-1,0} + b'_{i+m'+1,0}) & 1, 3 \le i \le 5-m'; j = 7-n' \\
\frac{1}{4}(c'_{i+m'-9,7} + c'_{i+m'-7,7} + d'_{i+m'-9,0} + d'_{i+m'-7,0}) & 1, 3 \le i \le 5-m'; j = 7-n' \\
\frac{1}{4}(a'_{6,7} + b'_{6,0} + c'_{0,7} + d'_{0,0}) & i = 7-m'; j = 7-n'
\end{cases} \quad (93)$$

where $m = 1, 3, 5, 7$ and $m' = 0, 2, 4, 6$

The top half of expression (93) represents the e→o portion of the frame composite macro block e, while the bottom portion of expression (93) represents the o→e portion of the frame composite macro block e.

Using expression (93), expression (94) below is derived in the same manner as expression (47).

$$E_{kl} = \sum_{p=0}^{7}\sum_{q=0}^{7} A_{pq} \left[ \sum_{i=0,2}^{5-m}\sum_{j=0}^{6-n} \left( W\cos\frac{(2i+1)k\pi}{16}\cos\frac{(2k+1)l\pi}{16} \right) + \frac{1}{2}\sum_{j=0}^{6-n}\left( \cos\frac{15p\pi}{16}\cos\frac{q\pi}{16}\cos\frac{(j+n+1)q\pi}{8}\cos\frac{(15-2m)k\pi}{16}\cos\frac{(2j+1)l\pi}{16} \right) + \right.$$

$$\frac{1}{2}\sum_{i=0,2}^{5-m}\left( \cos\frac{(2i+2m+3)p\pi}{16}\cos\frac{p\pi}{8}\cos\frac{15q\pi}{16}\cos\frac{(2i+1)k\pi}{16}\cos\frac{(15-2n)l\pi}{16} \right) + \left( \frac{1}{4}\cos\frac{15p\pi}{16}\cos\frac{15q\pi}{16}\cos\frac{(15-2m)k\pi}{16}\cos\frac{(15-2n)l\pi}{16} \right) \right] +$$

$$\sum_{p=0}^{7}\sum_{q=0}^{7} B_{pq} \left[ \sum_{i=0,2}^{5-m}\sum_{j=-n}^{-1} \left( W\cos\frac{(2i+1)k\pi}{16}\cos\frac{(2j+17)l\pi}{16} \right) + \frac{1}{2}\sum_{j=-n}^{-1}\left( \cos\frac{15p\pi}{16}\cos\frac{q\pi}{16}\cos\frac{(j+n+1)q\pi}{8}\cos\frac{(15-2m)k\pi}{16}\cos\frac{(2j+17)l\pi}{16} \right) + \right.$$

$$\frac{1}{2}\sum_{i=0,2}^{5-m}\left( \cos\frac{(2i+2m+3)p\pi}{16}\cos\frac{p\pi}{8}\cos\frac{q\pi}{16}\cos\frac{(2i+1)k\pi}{16}\cos\frac{(15-2n)l\pi}{16} \right) + \left( \frac{1}{4}\cos\frac{15p\pi}{16}\cos\frac{q\pi}{16}\cos\frac{(15-2m)k\pi}{16}\cos\frac{(15-2n)l\pi}{16} \right) \right] +$$

$$\sum_{p=0}^{7}\sum_{q=0}^{7} C_{pq} \left[ \sum_{i=-m+1}^{-2}\sum_{j=0}^{6-n} \left( W\cos\frac{(2i+17)k\pi}{16}\cos\frac{(2j+1)l\pi}{16} \right) + \frac{1}{2}\sum_{j=0}^{6-n}\left( \cos\frac{3p\pi}{16}\cos\frac{q\pi}{16}\cos\frac{(j+n+1)q\pi}{8}\cos\frac{(15-2m)k\pi}{16}\cos\frac{(2j+1)l\pi}{16} \right) + \right.$$

$$\frac{1}{2}\sum_{i=-m+1}^{-2}\left( \cos\frac{(2i+2m+3)p\pi}{16}\cos\frac{p\pi}{16}\cos\frac{15q\pi}{16}\cos\frac{(2i+17)k\pi}{16}\cos\frac{(15-2n)l\pi}{16} \right) + \frac{1}{4}\left( \cos\frac{3p\pi}{16}\cos\frac{15q\pi}{16}\cos\frac{(15-2m)k\pi}{16}\cos\frac{(15-2n)l\pi}{16} \right) \right] +$$

(94)

-continued $$\sum_{p=0}^{7}\sum_{q=0}^{7}D_{pq}\left[\sum_{i=-m+1}^{-2}\sum_{j=-n}^{-1}\left(W\cos\frac{(2i+17)k\pi}{16}\cos\frac{(2j+1)l\pi}{16}\right)+\frac{1}{2}\sum_{j=-n}^{-1}\left(\cos\frac{3p\pi}{16}\cos\frac{q\pi}{16}\cos\frac{(j+n+1)q\pi}{8}\cos\frac{(15-2m)k\pi}{16}\cos\frac{(2j+17)l\pi}{16}\right)+\right.$$

$$\left.\frac{1}{2}\sum_{i=-m+1}^{-2}\left(\cos\frac{(2i+2m+3)p\pi}{16}\cos\frac{p\pi}{8}\cos\frac{q\pi}{16}\cos\frac{(2i+17)k\pi}{16}\cos\frac{(15-2n)l\pi}{16}\right)+\left(\frac{1}{4}\cos\frac{3p\pi}{16}\cos\frac{q\pi}{16}\cos\frac{(15-2m)k\pi}{16}\cos\frac{(15-2n)l\pi}{16}\right)\right]+$$

$$\sum_{p=0}^{7}\sum_{q=0}^{7}A'_{pq}\left[\sum_{i=0,2}^{4-m'}\sum_{j=0}^{6-n'}\left(W'\cos\frac{(2i+3)k\pi}{16}\cos\frac{(2j+1)l\pi}{16}\right)+\frac{1}{2}\sum_{j=0}^{6-n'}\left(\cos\frac{13p\pi}{16}\cos\frac{q\pi}{16}\cos\frac{(j+n'+1)q\pi}{8}\cos\frac{(15-2m')k\pi}{16}\cos\frac{(2j+1)l\pi}{16}\right)+\right.$$

$$\left.\frac{1}{2}\sum_{j=0,2}^{4-m'}\left(\cos\frac{(2i+2m'+3)p\pi}{16}\cos\frac{p\pi}{8}\cos\frac{15q\pi}{16}\cos\frac{(2i+3)k\pi}{16}\cos\frac{(15-2n')l\pi}{16}\right)+\frac{1}{4}\left(\cos\frac{13p\pi}{16}\cos\frac{15q\pi}{16}\cos\frac{(15-2m')k\pi}{16}\cos\frac{(15-2n')l\pi}{16}\right)\right]+$$

$$\sum_{p=0}^{7}\sum_{q=0}^{7}B'_{pq}\left[\sum_{i=0,2}^{4-m'}\sum_{j=-n'}^{-1}\left(W'\cos\frac{(2i+3)k\pi}{16}\cos\frac{(2j+17)l\pi}{16}\right)+\frac{1}{2}\sum_{i=-n'}^{-1}\left(\cos\frac{13p\pi}{16}\cos\frac{q\pi}{16}\cos\frac{(j+n'+1)q\pi}{8}\cos\frac{(15-2m')k\pi}{16}\cos\frac{(2j+17)l\pi}{16}\right)+\right.$$

$$\left.\frac{1}{2}\sum_{i=0,2}^{4-m'}\left(\cos\frac{(2i+2m'+3)p\pi}{16}\cos\frac{p\pi}{8}\cos\frac{q\pi}{16}\cos\frac{(2j+3)k\pi}{16}\cos\frac{(15-2n')l\pi}{16}\right)+\frac{1}{4}\left(\cos\frac{13p\pi}{16}\cos\frac{q\pi}{16}\cos\frac{(15-2m')k\pi}{16}\cos\frac{(15-2n')l\pi}{16}\right)\right]+$$

$$\sum_{p=0}^{7}\sum_{q=0}^{7}C'_{pq}\left[\sum_{i=-m'}^{-2}\sum_{j=0}^{6-n'}\left(W'\cos\frac{(2i+19)k\pi}{16}\cos\frac{(2j+1)l\pi}{16}\right)+\frac{1}{2}\sum_{j=0}^{6-n'}\left(\cos\frac{p\pi}{16}\cos\frac{q\pi}{16}\cos\frac{(j+n'+1)q\pi}{8}\cos\frac{(15-2m')k\pi}{16}\cos\frac{(2j+1)l\pi}{16}\right)+\right.$$

$$\left.\frac{1}{2}\sum_{i=-m'}^{-2}\left(\cos\frac{(2i+2m'+3)p\pi}{16}\cos\frac{p\pi}{8}\cos\frac{15q\pi}{16}\cos\frac{(2i+19)k\pi}{16}\cos\frac{(15-2n')l\pi}{16}\right)+\frac{1}{4}\left(\cos\frac{p\pi}{16}\cos\frac{15q\pi}{16}\cos\frac{(15-2m')k\pi}{16}\cos\frac{(15-2n')l\pi}{16}\right)\right]+$$

$$\sum_{p=0}^{7}\sum_{q=0}^{7}D'_{pq}\left[\sum_{i=-m'}^{-2}\sum_{j=-n'}^{-1}\left(W'\cos\frac{(2i+19)k\pi}{16}\cos\frac{(2j+1)l\pi}{16}\right)+\frac{1}{2}\sum_{j=-n'}^{-1}\left(\cos\frac{p\pi}{16}\cos\frac{q\pi}{16}\cos\frac{(j+n'+1)q\pi}{8}\cos\frac{(15-2m')k\pi}{16}\cos\frac{(2j+17)l\pi}{16}\right)+\right.$$

$$\left.\frac{1}{2}\sum_{i=-m'}^{-2}\left(\cos\frac{(2i+2m'+3)p\pi}{16}\cos\frac{p\pi}{8}\cos\frac{q\pi}{16}\cos\frac{(2i+19)k\pi}{16}\cos\frac{(15-2n')l\pi}{16}\right)+\frac{1}{4}\left(\cos\frac{p\pi}{16}\cos\frac{q\pi}{16}\cos\frac{(15-2m')k\pi}{16}\cos\frac{(15-2n')l\pi}{16}\right)\right]$$

The summation terms including $A_{pq}$, $B_{pq}$, $C_{pq}$, and $D_{pq}$ in expression (94) represent the ego portion of the frame composite macro block E, while the summation terms including $A'_{pq}$, $B'_{pq}$, $C'_{pq}$, and $D'_{pq}$ in expression (94) represent the o→e portion of the frame composite macro block E.

Using expression (94), the motion compensated frame macro block E can be derived for diagonal half-pel accuracy when the odd and even fields are encoded based on the even and odd fields, respectively, of the anchor frame.

With field motion compensation, both motion vectors do not always have the same accuracy, half or full-pel, in the same direction. For instance, the odd field portion vector could have full-pel accuracy, while the even field motion vector has half-pel accuracy in the horizontal direction. As another example, the odd field could have half-pel accuracy in the horizontal direction, while the even field motion vector has half-pel accuracy in the vertical direction.

The composite macro block expressions for these instances can be readily generated from those portions of the previously discussed expressions corresponding to the motion vectors. For instance, if the odd field is encoded based on the previous odd field and the motion vector therefor has half-pel accuracy in the horizontal direction, then the top half of expression (68) represents the first part of the frame composite macro block $e_{ij}$, while the summation terms $A_{pq}$, $B_{pq}$, $C_{pq}$, and $D_{pq}$ from expression (69) are used to generate the first part of the frame composite macro block $E_{kl}$. Next, if the even field is encoded based on the previous even field and the motion vector therefor has half-pel accuracy in the vertical direction, then the bottom half of expression (82) represents the second part of the frame composite macro block $e_{ij}$, while the summation terms $A'_{pq}$, $B'_{pq}$, $C'_{pq}$, and $D'_{pq}$ from expression (83) are used to generate the second part of the frame composite macro block $E_{kl}$.

As discussed above, B-pictures may be bi-directionally encoded. Accordingly, two motion vectors are associated with each field or frame of a bi-directionally encoded B-picture. The motion vector address generator 62 identifies and informs the compositer 68 when a picture is a bi-directionally inter-coded picture. In response, the compositer 68 forms composite anchor frame blocks with respect to each anchor frame pointed to by the motion vectors. The compositer 68 then averages the two composite macro blocks to form a weighted average composite macro block, and outputs the weighted average composite macro block to the adder 74.

The adder 74 adds the composite macro block to the macro block of the picture data currently output by the variable length decoder and dequantizer 58, or optionally the field-to-frame converter 69, to reconstruct a complete macro block. In this manner, both P-pictures and B-pictures are converted into I-pictures.

Of course, if an I-picture is currently being output by the variable length decoder and dequantizer 58, then the adder 74 will not receive anything from the compositer 68 to add thereto. The motion vector address generator 62 will have recognized the I-picture as an I-picture and disabled the compositer 68 from sending output to the adder 74.

The output of the adder 74 is received by a reformatter 78. The reformatter 78 is also connected to the memory 64 via the variable length decoder and dequantizer 66. Because all of the pictures in the HDTV signal are converted into I-pictures, if not already I-pictures, the reformatter 78 restores the order of the pictures in the HDTV signal to the display order.

The reformatter 78 generates output according to the following rules: (1) if the picture received is the first anchor picture received, then no output will be sent as the output of the I-picture converter 76 and the I-picture will be output to the memory 64 for storage; (2) if the picture received is an anchor picture but not the first anchor picture received, then the previously received anchor picture will be obtained from the memory 64 via the variable length decoder 66 and output as the output of the I-picture converter 78, and the current anchor frame will be output to the memory 64 for storage; and (3) if the picture received is a B-picture, then the B-picture will be immediately output.

Therefore, upon receipt of I-picture $I_1$, the reformatter 78 will output the I-picture $I_1$ to the memory 64 for storage via the quantizer 70, the variable length coder 72, and the bit stream parser 59. The next picture output by the adder 74 will be P-picture $P_1$. Since this picture is an anchor picture, the memory 64 will then store the P-picture $P_1$, albeit converted into an I-picture, under the control of the bit stream parser 59. And, the reformatter 78 will send the memory 64 a control signal to output the I-picture $I_1$ (i.e., the previous anchor picture) to the reformatter 78, and the reformatter 78 will output the I-picture $I_1$. The reformatter 78 will then receive and immediately output the B-pictures. Consequently, the output order from the reformatter 78 will be $I_1 B_1 B_2$.

Next, the P-picture $P_2$ is received and processed in the same manner as P-picture Pa. Consequently, the bit stream parser 59 will replace the I-picture $I_1$ with the P-picture $P_2$ in the memory 64. The reformatter 78, according to the rules discussed above, will then receive P-picture $P_1$ from the memory 64, and output P-picture $P_1$. In this manner, the reformatter 78 will output the pictures in the proper display order, and these pictures will all be I-pictures. Therefore, the I-picture converter 76 outputs the HDTV signal comprised entirely of, I-pictures in the display order.

The HDTV signal output by the I-picture converter is then received by a down-converter 12,40. The down-converter 12,40 can be the down-converter 12 disclosed with respect to FIG. 1, or the down-converter 40 disclosed with respect to FIGS. 3A and 3B. As discussed above with respect to FIGS. 1, 3A, and 3B, the down-converter 12,40 down converts the HDTV signal into an SDTV signal, and outputs the SDTV signal in the spatial domain. Consequently, to place the SDTV signal output by the down-converter 12,40 into the format expected by a standard SDTV decoder, the SDTV signal output by the down-converter 12,40 must be converted back into the DCT domain. Therefore, the DCT converter 80 receives the output of the down-converter 12,40, and converts the output of the down-converter 12,40 into the DCT domain.

The output of the DCT converter 80 is then quantized by the quantizer 82, and variable length encoded by the variable length encoder 84. The quantizer 82 requantizes the output of the down-converter 52 in the same manner discussed above with respect to the quantizer 102. The resulting SDTV signal output by the variable length encoder 84 is of the format expected by a standard SDTV decoder.

Because the HDTV converter of FIG. 6 stores anchor frames which are in the DCT domain and which have been variable length encoded and quantized, the HDTV converter of FIG. 6 significantly reduces the amount of memory required to perform down conversion of HDTV signals including inter-coded pictures. The HDTV converter of FIG. 6, however, still requires an additional DCT converter in order to place the SDTV signal in the format expected by a standard SDTV converter.

Figure 7:
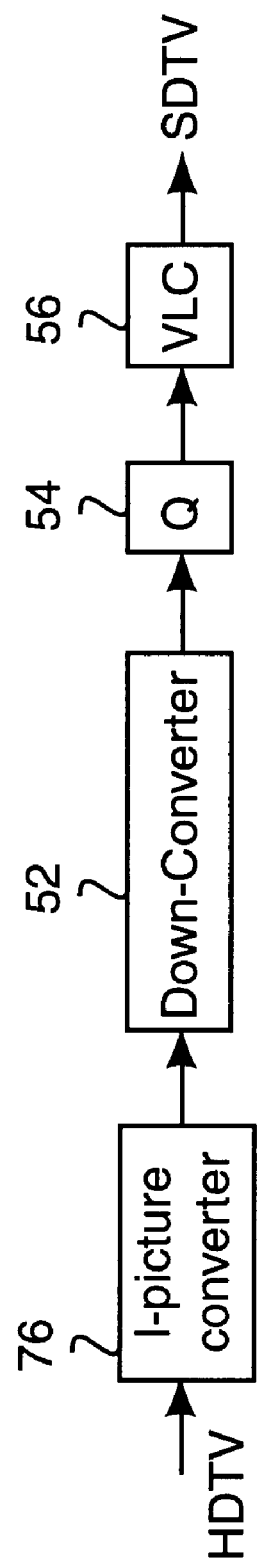
FIG. 7 illustrates yet another embodiment of an HDTV to SDTV converter according to the present invention.

FIG. 7 illustrates another HDTV to SDTV converter according to the present invention. The embodiment of FIG. 7 also provides the advantage provided in the embodiment of FIG. 6 in that the amount of memory required to perform down conversion is seriously reduced. The embodiment of FIG. 7, however, further provides the additional benefit of eliminating the need for DCT converters.

In FIG. 7, the HDTV signal is received by the I-picture converter 76. The output of the I-picture converter 76 is received by the down-converter 52, and the output of the down-converter 52 is quantized by a quantizer 54 and variable length encoded by a variable length encoder 56. The operation of each of these elements has been discussed in detail above. Accordingly, that description will not be repeated for the sake of brevity. It is important to note that the I-picture converter 76 outputs an HDTV signal comprised of I-pictures in the frequency domain, and that the down-converter 52 performs down conversion without having to perform an inverse DCT conversion. Consequently, the output of the down-converter 52 is in SDTV format with the pictures in the frequency domain. Thus, the need for a DCT converter at the output of down-converter has been eliminated. The embodiment of FIG. 7 achieves both the cost and complexity reduction benefits from having reduced the memory requirements for handling an HDTV signal with inter-coded pictures as well as the elimination of inverse DCT and DCT converters.

Each of the above described embodiments may have several different forms of implementation. For instance, each embodiment could be implemented using a programmed microprocessor. Alternatively, each embodiment could be implemented using hard-wired logic.

While the present invention has been described with respect to specific coding sequences, it should be understood that the present invention is not limited to the coding sequences described. Additionally, the present invention is not restricted to use with a particular digital format such as MPEG. Instead, the present invention may be used with any format in any application where down-converting of digital data is desired.

Furthermore, while the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

We claim:

1. An apparatus for down-converting a digital video signal, comprising:

receiving means for receiving an encoded digital video signal, said encoded digital video signal having been previously generated by converting spatial video data into the DCT domain, quantizing DCT domain coefficients, and variable length encoding the quantized DCT domain coefficients;

a variable length decoder for generating variable length decoded DCT data from said received encoded digital video signal;

a dequantizer for dequantizing the variable length decoded DCT coefficients generated by said variable length decoder to generate at least first and second DCT blocks, said first and second DCT blocks each having first dimensions;

converting means for receiving said at least first and second DCT blocks, and for converting said first and second DCT blocks into a single DCT block having dimensions equal to said first dimensions;

a quantizer for re-quantizing the output of said converting means, the quantization scale used by said quantizer for re-quantizing being different than the quantization scale used to generate said encoded digital video signal; and a variable length coder variable length coding output of said quantizer.

2. The apparatus of claim 1, wherein said quantizer re-quantizes said output of said converting means such that distortion is eliminated.

3. A method for down-converting a digital video signal, comprising:

(a) receiving an encoded digital video signal, said encoded digital video signal having been previously generated by converting spatial video data into the DCT domain, quantizing DCT domain coefficients, and variable length encoding the quantized DCT domain coefficients;

(b) variable length decoding said encoded digital video signal to generate variable length decoded DCT data;

(c) dequantizing said variable length decoded DCT data to generate at least first and second DCT blocks, said first and second DCT blocks each having first dimensions;

(d) converting said first and second DCT blocks into a single DCT block having dimensions equal to said first dimensions;

(e) re-quantizing the output of said step (d), the quantization scale used by said quantizer for re-quantizing being different than the quantization scale used to generate said encoded digital video signal; and (f) variable length coding the output of said step (e).

4. The method of claim 3 wherein said step (e) re-quantizes said output of step (d) using a quantization scale which does not cause distortion in the re-quantized data.

* * * * *